US012808840B2

(12) United States Patent
Aran et al.

(10) Patent No.: US 12,808,840 B2
(45) Date of Patent: Nov. 24, 2026

(54) INTEGRATED CIRCUIT CHIP WITH 2D FIELD-EFFECT TRANSISTORS AND ON-CHIP THIN FILM LAYER DEPOSITION WITH ELECTRICAL CHARACTERIZATION

(71) Applicant: Cardea Bio, Inc., San Diego, CA (US)

(72) Inventors: Kiana Aran, Pasadena, CA (US); Brett Goldsmith, San Diego, CA (US); Jeffrey Taulbee, Ontario, CA (US)

(73) Assignee: Paragraf USA Inc., San Diego, CA (US)

( * ) Notice: Subject to any disclaimer, the term of this patent is extended or adjusted under 35 U.S.C. 154(b) by 785 days.

(21) Appl. No.: 18/174,418

(22) Filed: Feb. 24, 2023

(65) Prior Publication Data

US 2023/0273150 A1 Aug. 31, 2023

Related U.S. Application Data

(60) Provisional application No. 63/314,270, filed on Feb. 25, 2022.

(51) Int. Cl.
*G01N 27/414* (2006.01)

(52) U.S. Cl.
CPC ..... *G01N 27/4148* (2013.01); *G01N 27/4145* (2013.01); *G01N 27/4146* (2013.01)

(58) Field of Classification Search
CPC ........... G01N 27/4148; G01N 27/4145; G01N 27/4146
See application file for complete search history.

(56) References Cited

U.S. PATENT DOCUMENTS

| | | | |
|---|---|---|---|
| 4,961,833 | A | 10/1990 | Sakai et al. |
| 5,827,482 | A | 10/1998 | Shieh et al. |

(Continued)

FOREIGN PATENT DOCUMENTS

| | | | |
|---|---|---|---|
| EP | 1843152 | A1 | 10/2007 |
| EP | 1843157 | A1 | 10/2007 |

(Continued)

OTHER PUBLICATIONS

PCT/US2023/013856, "Notification of Transmittal of the International Search Report and the Written Opinion of the International Searching Authority, or the Declaration", International Searching Authority, Jun. 19, 2023, pp. 1-11.

(Continued)

*Primary Examiner* — Richard A Booth
(74) *Attorney, Agent, or Firm* — Kunzler Needham Hilton; Thomas D Briscoe

(57) ABSTRACT

Apparatuses, systems, and methods are disclosed for an integrated circuit with 2D field-effect transistors and on-chip thin film layer deposition with electrical characterization. A corresponding layer structure and manufacturing process are disclosed. The system includes a measurement controller that determines transfer curve information and an analysis module that generates parameters for determining thickness and/or porosity and a thin film deposition controller that controllers thin film deposition using the parameters. Methods include performing liquid mediated deposition of one or more thin film layers on the channel surface and obtaining transfer curve information by generating time dependent measurement vectors for the 2D FETs and controlling and/or performing electrical characterization of the of thin film layers based on the measurement vectors. The disclosed methods may be implemented by the disclosed integrated circuit and the disclosed system.

10 Claims, 17 Drawing Sheets

(56) References Cited

U.S. PATENT DOCUMENTS 6,150,106 A 11/2000 Martin et al.
8,115,198 B2 * 2/2012 Bondavalli ............ B82Y 15/00 257/253
8,421,131 B2 4/2013 Chung et al.
8,445,945 B2 5/2013 Rothberg et al.
8,716,029 B1 5/2014 Kim et al.
8,815,162 B2 8/2014 Vossenaar et al.
8,940,235 B2 1/2015 Wu et al.
9,091,648 B2 7/2015 Afzali-Ardakani et al.
9,281,305 B1 3/2016 Yang et al.
9,339,790 B2 5/2016 Vittadello et al.
9,618,474 B2 4/2017 van Rooyen et al.
9,618,475 B2 4/2017 Rothberg et al.
9,618,476 B2 4/2017 Goldsmith
9,679,104 B2 6/2017 Van Rooyen et al.
9,765,395 B2 9/2017 Goldsmith
9,857,328 B2 1/2018 Hoffman
9,859,394 B2 1/2018 Hoffman et al.
10,006,910 B2 6/2018 Hoffman et al.
10,020,300 B2 7/2018 Hoffman
10,395,928 B2 8/2019 Pan et al.
10,429,342 B2 10/2019 Hoffman
10,429,381 B2 10/2019 Hoffman
10,494,670 B2 12/2019 van Rooyen et al.
10,607,989 B2 3/2020 Hoffman
10,751,986 B2 8/2020 Lerner et al.
10,759,157 B2 9/2020 Lerner et al.
10,811,539 B2 10/2020 van Rooyen et al.
10,903,319 B2 1/2021 Pan et al.
10,968,481 B2 4/2021 van Rooyen et al.
11,016,088 B2 5/2021 Hoffman et al.
11,056,343 B2 7/2021 Pan et al.
11,092,598 B2 8/2021 Goldsmith
11,215,580 B2 1/2022 Goldsmith
11,536,722 B2 12/2022 Goldsmith et al.
11,561,197 B2 1/2023 Aran et al.
2003/0178655 A1 9/2003 Winslow
2004/0238379 A1 12/2004 Lindsay et al.
2005/0051817 A1 3/2005 Morita et al.
2005/0170347 A1 8/2005 Miyahara et al.
2005/0179065 A1 8/2005 Chou et al.
2005/0191683 A1 9/2005 Yoo et al.
2006/0016699 A1 1/2006 Kamahori et al.
2006/0141474 A1 6/2006 Miyahara et al.
2006/0246443 A1 11/2006 Bockelmann et al.
2007/0063304 A1 3/2007 Matsumoto et al.
2007/0138463 A1 6/2007 Herlogsson
2007/0231211 A1 10/2007 Yoo et al.
2007/0232060 A1 10/2007 Niu
2007/0235760 A1 10/2007 Shim et al.
2008/0035494 A1 2/2008 Gomez
2008/0063566 A1 3/2008 Matsumoto et al.
2008/0143389 A1 6/2008 Keshavarzi et al.
2008/0274912 A1 11/2008 Johnson et al.
2008/0283875 A1 11/2008 Mukasa et al.
2009/0008629 A1 1/2009 Matsumoto et al.
2009/0014757 A1 1/2009 Takulapalli
2009/0153130 A1 6/2009 Shim et al.
2009/0162927 A1 6/2009 Naaman et al.
2009/0208922 A1 8/2009 Choi
2009/0278556 A1 11/2009 Man et al.
2010/0025660 A1 2/2010 Jain et al.
2010/0086933 A1 4/2010 Hospach et al.
2010/0088040 A1 4/2010 Johnson, Jr.
2010/0133510 A1 6/2010 Kim et al.
2010/0176463 A1 7/2010 Koizumi et al.
2010/0248209 A1 9/2010 Datta et al.
2010/0255984 A1 10/2010 Sutter et al.
2010/0258787 A1 10/2010 Chae et al.
2010/0279426 A1 11/2010 Tour et al.
2010/0327847 A1 12/2010 Leiber et al.
2011/0042673 A1 2/2011 Yamabayashi et al.
2011/0121273 A1 5/2011 Jo et al.
2011/0159481 A1 6/2011 Liu et al.
2011/0165557 A1 7/2011 Ah et al.
2011/0210314 A1 9/2011 Chung et al.
2011/0217763 A1 9/2011 Rasooly et al.
2011/0227043 A1 9/2011 Guo et al.
2012/0021918 A1 1/2012 Bashir et al.
2012/0028820 A1 2/2012 Rhodes et al.
2012/0127426 A1 5/2012 Backus et al.
2012/0214172 A1 8/2012 Chen et al.
2012/0220053 A1 8/2012 Lee et al.
2012/0286244 A1 11/2012 Chiu et al.
2013/0018599 A1 1/2013 Peng
2013/0037780 A1 2/2013 Kivioja et al.
2013/0056367 A1 3/2013 Martinez et al.
2013/0089932 A1 4/2013 Wu
2013/0140518 A1 6/2013 Jain
2013/0164859 A1 6/2013 Johnson et al.
2013/0190211 A1 7/2013 Bustillo et al.
2013/0204107 A1 8/2013 Lee et al.
2013/0214252 A1 8/2013 Park et al.
2013/0234762 A1 9/2013 Han et al.
2013/0240378 A1 9/2013 Lee et al.
2013/0270521 A1 10/2013 Peng et al.
2013/0307029 A1 11/2013 Xu et al.
2014/0042390 A1 2/2014 Gruner et al.
2014/0061729 A1 3/2014 Koo et al.
2014/0152291 A1 6/2014 Afzali-Ardakani et al.
2014/0162390 A1 6/2014 Afzali-Ardakani et al.
2014/0193938 A1 7/2014 Fife
2014/0200166 A1 7/2014 Van Rooyen et al.
2014/0209982 A1 7/2014 Putnam et al.
2014/0211167 A1 7/2014 Lewis
2014/0236490 A1 8/2014 Van Rooyen et al.
2014/0260547 A1 9/2014 Balandin
2014/0264467 A1 9/2014 Cheng et al.
2014/0264469 A1 9/2014 Fife et al.
2014/0309944 A1 10/2014 van Rooyen et al.
2014/0312879 A1 10/2014 Torsi et al.
2014/0371110 A1 12/2014 Van Rooyen et al.
2015/0038378 A1 2/2015 Cheng et al.
2015/0123080 A1 5/2015 Yamaguchi
2015/0137078 A1 5/2015 Guo et al.
2015/0218094 A1 8/2015 Braunschweig et al.
2015/0233864 A1 8/2015 Shen et al.
2015/0247819 A1 9/2015 Shi et al.
2015/0276709 A1 10/2015 O'Halloran et al.
2015/0280011 A1 10/2015 Cho et al.
2015/0308977 A1 10/2015 Saito et al.
2015/0316523 A1 11/2015 Patolsky et al.
2015/0357504 A1 12/2015 Chen et al.
2016/0004298 A1 1/2016 Mazed
2016/0123919 A1 5/2016 Johnson et al.
2016/0178569 A1 6/2016 Hoffman et al.
2016/0265047 A1 9/2016 van Rooyen et al.
2016/0290955 A1 10/2016 Zhong et al.
2017/0018626 A1 1/2017 Hoffman et al.
2017/0053908 A1 2/2017 Hoffman
2017/0059514 A1 3/2017 Hoffman
2017/0200909 A1 7/2017 Sonkusale et al.
2017/0350882 A1 12/2017 Lin et al.
2018/0116510 A1 5/2018 Freeman et al.
2018/0200142 A1 7/2018 Freeman et al.
2018/0313784 A1 11/2018 White et al.
2019/0112643 A1 4/2019 Aran et al.
2021/0041429 A1 2/2021 Paytavi et al.
2021/0278396 A1 9/2021 Goldsmith et al.
2021/0382045 A1 12/2021 Aran et al.
2021/0382046 A1 12/2021 Goldsmith
2022/0155289 A1 5/2022 Goldsmith et al.
2022/0365024 A1 * 11/2022 Aran .................. G01N 27/4145
2023/0115797 A1 * 4/2023 Goldsmith ......... G01N 27/4146 257/253
2025/0193559 A1 6/2025 Yan Poon et al.

FOREIGN PATENT DOCUMENTS

EP 2947453 A1 11/2015
EP 3235010 A1 10/2017
EP 3268496 A1 1/2018
KR 101798295 B1 11/2017
KR 102059811 B1 12/2019

(56) References Cited

FOREIGN PATENT DOCUMENTS

| | | | |
|---|---|---|---|
| WO | 1998008082 | A1 | 2/1998 |
| WO | 2001013432 | A1 | 2/2001 |
| WO | 2005029059 | A1 | 3/2005 |
| WO | 2005090961 | A1 | 9/2005 |
| WO | 2007066954 | A1 | 6/2007 |
| WO | 2008076406 | A2 | 6/2008 |
| WO | 2011082178 | A1 | 7/2011 |
| WO | 2012050646 | A2 | 4/2012 |
| WO | 2012112746 | A1 | 8/2012 |
| WO | 2013033359 | A1 | 3/2013 |
| WO | 2014024598 | A1 | 2/2014 |
| WO | 2014112199 | A1 | 7/2014 |
| WO | 2014171969 | A1 | 10/2014 |
| WO | 2014176524 | A2 | 10/2014 |
| WO | 2016100049 | A1 | 6/2016 |
| WO | 2016145110 | A1 | 9/2016 |
| WO | 2016205253 | A1 | 12/2016 |
| WO | 2017079620 | A1 | 5/2017 |

OTHER PUBLICATIONS

Afsahi, S. et al., Novel graphene-based biosensor for early detection of Zika virus infection,. Biosensors and Bioelectronics, (2018), 85-88, 100.
Afsahi, S. J. et al., Towards Novel Graphene-Enabled Diagnostic Assays with Improved Signal-to-Noise Ratio, (2017).
Akinwande, D. et al., Graphene and two-dimensional materials for silicon technology,. Nature, (2019), 507-518.
Aran, K. et al., Next Generation Graphene Transistors for Biological Threat Graphene-based biosensor for on-chip detection of bio-orthogonally labeled proteins to identify the circulating biomarkers of aging during heterochronic parabiosis, (2018), 3230-3238, 18.
Balderston, S. et al., Discrimination of single-point mutations in unamplified genomic DNA via Cas9 immobilized on a graphene field-effect transistor,. Nature Biomedical Engineering, (2021), 713-725, 5.
Bergveld, P., The Development and Application of FET-based Biosensors*. Biosensors, (1986), vol. 2.
Bergveld, P., Thirty years of Isfetology What happened in the past 30 years and what may happen in the next 30 years,. Sensors and Actuator B Chemical, (2003), 1-20, 88.
Bruch, R. et al., Unamplified gene sensing via Cas9 on graphene,. Nature Biomedical Engineering, Jun. 1, 2019.
Cheng, Z. et al., Sensitivity limits and scaling of bioelectronic graphene transducers,. Nano Letters, (2013), 2902-2907, 13.
Cheng, Z. et al., Suspended graphene sensors with improved signal and reduced noise,. Nano Letters, (2010), 1864-1868, 10.
Cooper, D. R. et al., Experimental Review of Graphene,. ISRN Condensed Matter Physics, (2012), 1-56, 2012.
Decastro, J. et al., The microfluidic toolbox for analyzing exosome biomarkers of aging,. Molecules, (2021), 26.
Fakih, I. et al., Large area graphene ion sensitive field effect transistors with tantalum pentoxide sensing layers for pH measurement at the Nernstian limit,. Applied Physics Letters, (2014), 105.
Gao, Z. et al., Scalable Production of Sensor Arrays Based on High-Mobility Hybrid Graphene Field Effect Transistors,. ACS Applied Materials and Interfaces, (2016), 27546-27552, 8.
Geim, A. et al., The rise of graphene,. Nature Materials, (2007), 183-191, 6.
Goldsmith, B. R. et al., Temperature dependence of the noise amplitude in graphene and graphene oxide,. Physica Status Solidi—Rapid Research Letters, (2009), 178-180, 3.
Green, N. S. et al., Interactions of DNA with graphene and sensing applications of graphene field-effect transistor devices: A review,. Analytica Chimica Acta, (2015).
Hajian, R. et al., Rapid and Electronic Identification and Quantification of Age-Specific Circulating Exosomes via Biologically Activated Graphene Transistors,. Advanced Biology, (2021), 5.
Kaiser, D. et al., pH sensors based on amino-terminated carbon nanomembrane and single-layer graphene van der Waals heterostructures,. Applied Physics Reviews, (2021), 8.
Kireev, D. et al., Metaplastic and energy-efficient biocompatible graphene artificial synaptic transistors for enhanced accuracy neuromorphic computing,. Nature Communications, (2022), 13.
Kuscu, M. et al., Fabrication and microfluidic analysis of graphene-based molecular communication receiver for Internet of Nano Things (IoNT), Scientific Reports, (2021), 1-20, 11.
Kybert, N. J. et al., Scalable arrays of chemical vapor sensors based on DNA-decorated graphene,. Nano Research, (2014), 95-103, 7.
Lerner, M. B. et al., Large scale commercial fabrication of high quality graphene-based assays for biomolecule detection,. Sensors and Actuators, B: Chemical, (2017), 1261-1267, 239.
Liu, S. et al., Carbon nanomaterials field-effect-transistor-based biosensors,. NPG Asia Materials, Aug. 2012.
Lu, H. W. et al., The promise of graphene-based transistors for democratizing multiomics studies,. Biosensors and Bioelectronics, (2022), 113605, 195.
Luo, Z. et al., Effect of substrate roughness and feedstock concentration on growth of wafer-scale graphene at atmospheric pressure,. Chemistry of Materials, (2011), 1441-1447, 23.
Lo, Z. et al., Large sensor array based on functionalized graphene devices,. INEC 2010—2010 3rd International Nanoelectronics Conference, Proceedings, (2010), pp. 212-213.
Mackin, C. et al., A current-voltage model for graphene electrolyte-gated field-effect transistors,. IEEE Transactions on Electron Devices, (2014), 3971-3977, 61.
Mackin, C. et al., Large-scale sensor systems based on graphene electrolyte-gated field-effect transistors,. Analyst, (2016), 2704-2711, 141.
Merriman, B. et al., Progress in Ion Torrent semiconductor chip based sequencing,. Electrophoresis, (2012), 3397-3417, 33.
Milgrew, M.J. et al., The development of scalable sensor arrays using standard CMOS technology,. Sensors and Actuators B, (2004), 37-42, 103.
Miyakawa, N. et al., Drift suppression of solution-gated graphene field-effect transistors by cation doping for sensing platforms,. Sensors, (2021), 1-11, 21.
Nallon, E. C. et al., Chemical Discrimination with an Unmodified Graphene Chemical Sensor,. ACS Sensors, (2016), 26-31, 1.
Ohno, Y. et al., Electrolyte-gated graphene field-effect transistors for detecting ph and protein adsorption,. Nano Letters, (2009), 3318-3322, 9.
Queralto, N. et al., Detecting cancer by breath volatile organic compound analysis: A review of array-based sensors,. Journal of Breath Research, (2014).
Rai, D. K. et al., Structural determination of Enzyme-Graphene Nanocomposite Sensor Material,. Scientific Reports, (2019), 9.
Sadlowski, C. et al., Graphene-based biosensor for on-chip detection of bio-orthogonally labeled proteins to identify the circulating biomarkers of aging during heterochronic parabiosis,. Lab on a Chip, (2018), 3230-3238, 18.
Schwierz, F., Graphene transistors,. Nature Nanotechnology, (2010).
Sheehan, P. E. et al., Detection limits for nanoscale biosensors,. Nano Letters, (2005), 803-807, 5.
Sheridan, C., COVID-19 spurs wave of innovative diagnostics,. Nature biotechnology, Jul. 1, 2020.
Tulevski, G. S. et al., Toward high-performance digital logic technology with carbon nanotubes,. ACS Nano, Sep. 23, 2014.
Wang, B. et al., Oxide-on-graphene field effect bio-ready sensors,. Nano Research, (2014), 1263-1270, 7.
Wang, H. et al., Compact virtual-source current voltage model for top-and back-gated graphene field-effect transistors,. IEEE Transactions on Electron Devices, (2011), 1523-1533, 58.
Wang, Y. Y. et al., A large-area and contamination-free graphene transistor for liquid-gated sensing applications,. Applied Physics Letters, (2013), 103.
Woo, S. O. et al., Protein Detection using Quadratic Fit Analysis Near Dirac Point of Graphene Field Effect Biosensors,. ACS applied electronic materials, (2020), 913-919, 2.
Wu, D. et al., Dual-Aptamer Modified Graphene Field-Effect Transistor Nanosensor for Label-Free and Specific Detection of Hepatocellular Carcinoma-Derived Microvesicles,. Analytical Chemistry, (2020), 4006-4015, 92.

(56) References Cited

OTHER PUBLICATIONS

Xu, G. et al., Electrophoretic and field-effect graphene for all-electrical DNA array technology,. Nature Communications, (2014), 5.
Xue, M., Chemical and biomedical sensors using two dimensional materials, (2019).
Yang, W. et al., Carbon nanomaterials in biosensors: Should you use nanotubes or graphene,. Angewandte Chemie—International Edition, Mar. 15, 2010.
Zhan, B. et al., Graphene field-effect transistor and its application for electronic sensing,. Small, Oct. 29, 2014.
Zuccaro, L. et al., Real-Time Label-Free Direct Electronic Monitoring of Topoisomerase Enzyme Binding Kinetics on Graphene,. ACS Nano, (2015), 11166-11176, 9.
Zhang, R. et al., Electrolyte-Gated Graphene Field Effect Transistor-Based Ca2+ Detection Aided by Machine Learning, (2023).
U.S. Appl. No. 18/319,347, "Office Action Summary", US Patent and Trademark Office, filed Feb. 18, 2026, pp. 1-61.
G. Cheng et al, "Graphene Field-effect Transistor Modeling Based on Artificial Neural Network", International Conference on Mechatronics, Electronic, Industrial and Control Engineering (MEIC 2015), 2015, pp. 1-5.
B.R. Goldsmith et al, "Digital Biosensing by Foundry-Fabricated Graphene Sensors", Nature.com/Scientificreports Scientific Reports, Jan. 22, 2019, pp. 1-10.

* cited by examiner

Selected Thin Film Parameters / Characteristics

| | |
|---|---|
| Thickness 159 | Porosity 163 |
| Relative Thickness 161 | Relative Porosity 165 |

INTEGRATED CIRCUIT CHIP WITH 2D FIELD-EFFECT TRANSISTORS AND ON-CHIP THIN FILM LAYER DEPOSITION WITH ELECTRICAL CHARACTERIZATION

CROSS-REFERENCES TO RELATED APPLICATIONS

The present application claims priority to U.S. Provisional Patent Application No. 63/314,270 titled "Integrated Circuit Chip With 2D Field-Effect Transistors And On-Chip Thin Film Layer Deposition With Electrical Characterization" filed Feb. 25, 2022, which is by reference to the extent legally permissible under relevant patent laws and rules.

FIELD

The subject matter disclosed herein relates to integrated circuits for electrical measurement and more particularly relates to an integrated circuit with 2D field-effect transistors and on-chip thin film layer deposition with electrical characterization.

BACKGROUND

Transistors and integrated circuits are rarely designed to work within liquid environments, and those that are typically work at very slow speeds. Generally, semiconductors coupled to a liquid environment wait for chemical equilibrium or are performed at a particular single frequency or with a very narrow bandwidth designed to characterize simple chemical interactions. Thin film layers or coatings for sensors such as polymers, nucleic acids, proteins, and other compounds may be deposited on a sensor surface but in various existing systems, electrical characterization of thin film deposition parameters such as thickness and/or porosity for surface chemistry layers or coatings is not performed or is sometimes performed using off-chip direct or indirect optical systems and methods as fluorescence, confocal microscopy, surface plasmon resonance, quartz crystal microbalance. Prior to the integrated circuits, systems, and methods exemplified and described in the present disclosure, integrated circuits with 2D field-effect transistors and on-chip thin film layer deposition with electrical characterization have not been available.

BRIEF SUMMARY

Apparatuses are disclosed that include an integrated circuit with 2D field-effect transistors and on-chip thin film layer deposition with electrical characterization. In one or more examples, an integrated circuit includes a field-effect transistor (FET) array and on-chip thin film layer deposition with electrical characterization. In various examples, the integrated circuit includes a plurality of conductive sources and conductive drains patterned in a metallization layer for the field-effect transistors in the FET array, the metallization layer formed on a dielectric layer deposited on an IC substrate. In certain examples, the integrated circuit includes two or more environmentally non-reactive electrodes in the metallization layer deposited on the dielectric layer, where the two or more environmentally non-reactive electrodes are horizontally offset from the FETs in the array and at least one environmentally non-reactive electrode is configured to impart a counter electrode voltage (VCE) to a liquid received in a gate area such that the counter electrode voltage imparted to the liquid provides a gate voltage for the FETs in the array covered by the liquid and where at least one environmentally non-reactive electrode is configured to enable a reference electrode measurement of a gate voltage (VG) of the liquid to be made.

In various examples, the integrated circuit includes a 2D nanomaterial layer for patterning channels (e.g., 128) of the 2D FETs (110) between the conductive sources and the conductive drains. In certain examples, the integrated circuit includes a temporary etchable inert masking layer on the 2D nanomaterial layer that forms hard masked channel regions over the 2D FET channels to be patterned. In one or more examples, the hard masked channel regions are patterned to temporarily cover channels 128 of the 2D FETs 110 and corresponding regions covered by the etchable metal layer. In further examples, the integrated circuit includes a ceramic coating layer patterned to cover portions of the chip to be electrically insulated from the liquid with openings in the ceramic coating layer corresponding to the hard masked channel regions and corresponding to the regions of the two or more environmentally non-reactive electrodes. In some examples the integrated circuit include an opening etched in the etchable inert masking layer to expose the channels of the 2D FETs to the liquid received in the gate area.

In some examples, the integrated circuit includes one or more thin film layers deposited via liquid mediated deposition on channels of one or more selected instances of the 2D FETs of the FET array. In further examples, the integrated circuit includes integrated circuit connections in the metallization layer that enable on-chip measurements comprising measurement vectors for the one or more selected instances of the 2D FETs of the FET array to be made in connection with the liquid mediated deposition of the one or more thin film layers.

In some examples, the integrated circuit includes the capability to use voltage-assisted deposition, one type of liquid mediated deposition, by application of electrophoretic voltages to both the sources and drains of the 2D FETs of the FET array. This enables use of electrophoretic deposition to create layers on the transistor channel surface. In further examples, electrophoretic and non-electrophoretic voltages can be applied to various 2D FETs in the FET array such that layers can be selectively deposited on a subset of surfaces, enabling multiplex sensor manufacturing via voltage-assisted deposition.

Methods of manufacturing the integrated circuit with 2D field-effect transistors and on-chip thin film layer deposition with electrical characterization are disclosed. One or more implementations of the methods include the following acts: patterning conductive sources and conductive drains in a metallization layer for each transistor in the FET array, the metallization layer formed on substrate comprising a dielectric layer disposed on an IC substrate; patterning two or more environmentally non-reactive electrodes in a metallization layer deposited on the dielectric layer, where the two or more environmentally non-reactive electrodes are horizontally offset from the FETs in the array and at least one environmentally non-reactive electrode is configured to impart a counter electrode voltage to a liquid received in a gate area such that the counter electrode voltage imparted to the liquid provides a gate voltage for the FETs in the array covered by the liquid and wherein at least one environmentally non-reactive electrode is configured to enable a reference electrode gate voltage of the liquid to be measured.

Such methods further include transferring a 2D nanomaterial layer for patterning 2D FET channels between the conductive sources and the conductive drains; depositing an etchable inert masking layer that couples to a top surface of the 2D nanomaterial layer for forming hard masked channel regions over the 2D FET channels to be patterned; patterning hard masked channel regions comprising the 2D FET channels and corresponding regions covered by the etchable inert masking layer; depositing a ceramic coating layer that covers portions of a surface of the integrated circuit to be electrically insulated and removing areas of the ceramic coating layer corresponding to the hard masked channel regions and to the two and corresponding to the regions of the two or more environmental non-reactive environmentally non-reactive electrodes. The one or more methods include etching away areas of the etchable inert masking layer to expose the 2D FET channels to the liquid received in the gate area; performing liquid mediated deposition of one or more thin film layers on channels of one or more selected 2D FETs; and making on-chip measurements comprising measurement vectors for the one or more selected 2D FETs of the FET array in connection with the liquid mediated deposition of the one or more thin film layers.

One or more systems are disclosed for on-chip thin film layer deposition with electrical characterization are disclosed. a plurality of distributed sensor devices, in which the sensor devices individually include a 2D integrated circuit ("IC") with a sensor array that includes 2D field-effect transistors (FETs). The 2D FETs in the array include a channel with 2D nanomaterial between a conductive source and a conductive drain that are disposed on an integrated circuit substrate. The 2D FETs also include: a gate area for receiving a volume of liquid; a conductive source electrically coupled to a first end of the channel; a conductive drain electrically coupled to a second end of the channel; and a ceramic coating layer disposed over the conductive source and the conductive drain. The sensor array further includes two or more environmentally non-reactive electrodes disposed on the substrate for biasing and/or measuring electrical characteristics of the liquid over gate areas of the array.

Various implementations of the system include a measurement controller operable to determine transfer curve information for the 2D FETs of the array by applying bias conditions including a drain-to-source voltage and a gate-to-source voltage, and measuring drain currents for the 2D FETs while varying the gate-to-source voltage.

Such systems may also include an analysis module operable to determine transfer curve information such as a set of parameters for an equation that models a transfer curve. The systems may further include communication circuitry configured to transmit the set of parameters to the data repository and a thin film deposition controller that uses the transfer curve information to determine on-chip measurements of thickness and/or porosity of one or more thin film layers deposited on the channels of the 2D FETs and to control selected characteristics of the one or more thin film layers during deposition by adjusting concentrations and/or incubation times of components used to form individual thin film layers in response to the on-chip measurements based on the on-chip measurements made in connection with the deposition of the individual thin film layers.

Certain Methods are disclosed for excitation and measurement of biochemical interactions. A method, in one or more examples, includes providing a biologically gated transistor comprising a channel. In various examples, a method includes applying a sample fluid to the biologically gated transistor in contact with a surface of the channel. In some examples, a method includes applying one or more excitation conditions to the biologically gated transistor so that one or more output signals of the biologically gated transistor are affected by a biochemical interaction within the sample fluid. In some examples, a method includes obtaining information corresponding to the biochemical interaction by performing a plurality of time-dependent measurements of at least one of the one or more output signals affected by the biochemical interaction, using a predetermined measurement bandwidth corresponding to the one or more measurement distances. In certain examples, a method includes characterizing one or more parameters of the biochemical interaction based on the plurality of time-dependent measurements.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which.

DETAILED DESCRIPTION

Figure 1B:
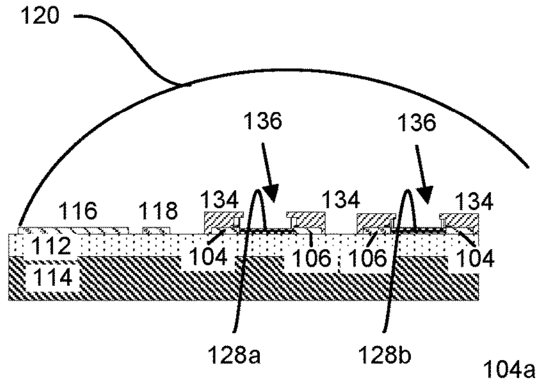
FIG. 1B is a cross-sectional view of an integrated circuit with 2D field-effect transistors and on-chip thin film layer deposition and characterization, in accordance with one or more examples of the present disclosure.

As will be appreciated by one skilled in the art, aspects of the disclosure may be implemented as a system, method, or program product. Accordingly, implementations may take the form of an entirely hardware implementation, an entirely software implementation (including firmware, resident software, micro-code, etc.) or an implementation combining software and hardware aspects that may all generally be referred to herein as a "circuit," "module," or "system." Furthermore, example implementations may take the form of a program product implemented in one or more computer readable storage devices storing machine readable code, computer readable code, and/or program code, referred hereafter as code. The storage devices may be tangible, non-transitory, and/or non-transmission. The storage devices may not embody signals. In certain implementation, the storage devices only employ signals for accessing code.

Certain of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be implemented in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for various example implementations may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain examples, may alternatively be implemented as one or more components.

A circuit, or circuitry, as used herein, comprises a set of one or more electrical and/or electronic components providing one or more pathways for electrical current. In certain examples, circuitry may include a return pathway for electrical current, so that a circuit is a closed loop. In some examples, however, a set of components that does not include a return pathway for electrical current may be referred to as a circuit or as circuitry (e.g., an open loop). For example, an integrated circuit may be referred to as a circuit or as circuitry regardless of whether the integrated circuit is coupled to ground (as a return pathway for electrical current) or not. In various examples, circuitry may include an integrated circuit, a portion of an integrated circuit, a set of integrated circuits, a set of non-integrated electrical and/or electrical components with or without integrated circuit devices, or the like. In various examples, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain examples, may be embodied by or implemented as a circuit.

Reference throughout this specification to "one example," "an example," "one implementation," "an implementation" or similar language means that a particular feature, structure, or characteristic described in connection with the example or implementation is included in at least one example or implementation. Thus, appearances of the phrases "in one example," "in an example," and similar language throughout this specification may, but do not necessarily, all refer to the same example or implementation, but mean "one or more but not all implementations" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the examples or implementations may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that implementation may be practiced without one or more of the specific details, or with other methods, components, materials, and so forth. In other instances, well-known structures, materials, or operations are not shown or described in detail to avoid obscuring aspects of an example implementation.

Aspects of the example implementations are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements.

As used herein, a list with a conjunction of "and/or" includes any single item in the list or a combination of items in the list. For example, a list of A, B, and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Definitions

The term "biomolecule," as used herein, refers to any molecule that is produced by a biological organism or which is synthetically produced to simulate, represent, or work along with molecules produced by biological organisms, including large polymeric molecules such as proteins, polysaccharides, lipids, and nucleic acids (DNA and RNA) as well as small molecules such as primary metabolites, secondary metabolites, and other natural products.

The term "moiety," as used herein, refers to a part of a molecule. For example, a moiety may be an active part of a drug molecule, an inactive part of a drug molecule, a part of an enzyme molecule that binds to the enzyme's substrate, a part of the substrate molecule that binds to the enzyme, another part of an enzyme or substrate, a region of a DNA or RNA molecule, an antigen-binding region (Fab) of an antibody, a crystallizable region (Fc) of an antibody, or the like. In the plural form, the term "moieties" may be used to refer to multiple types of moieties (e.g., an enzyme moiety and a substrate moiety) or to the same type of moiety for multiple molecules (e.g., a moiety of a protein that is present in multiple types or versions of protein). Moieties may be referred to as "within" a fluid if the moieties are in contact with molecules of the fluid. For example, a moiety within a fluid may be dissolved or suspended within the fluid, or may be disposed on the surface of a solid, where the fluid is in contact with that surface so that the moiety on the surface can interact with other molecules within the fluid.

The term "biochemical interaction," as used herein, refers to a chemical or physical interaction of one or more moieties of biomolecules. A biochemical interaction may include an interaction of moieties with other moieties (e.g., an enzyme linking to a substrate), or may include an interaction of moieties with an applied physical condition such as a temperature or electric field (e.g., movement of moieties in a protein in response to temperature).

The term "biologically gated transistor," as used herein, refers to a transistor where current between source and drain terminals, through at least one channel, is capable of being gated, modulated, or affected by a presence of a biomolecule or a biochemical interaction of moieties within a sample fluid in contact with (which may include within measurement distance of) a surface of the channel. In other words, in various examples, the term "in contact with a surface of the channel" can refer both to a substance being in fluid contact with the surface of the channel as well as the substance being within measurement distance of the channel. For example, in certain examples, a surface of the channel may covered by a membrane, a gel, or even a solid state layer, and may, the sample fluid may be understood to be "in contact with the surface of the channel" if relevant analytes within the sample fluid are within measurement distance of the channel whether or not the sample fluid is in fluid contact with the surface of the channel, The term "biologically gated transistor" may be used to refer to such a device in use, with a sample fluid applied to the surface of the channel (or within measurement distance of the channel), or to the same device before the sample fluid has been applied.

The term "two-dimensional field-effect transistor" or its abbreviation "2D FET" as used herein, refers to a transistor in which a two-dimensional nanomaterial such as graphene or molybdenum disulfide, is used to form a channel between a conductive source and a conductive drain.

The term "output signal," as used herein, refers to a measurable or detectable electrical signal from a biologically gated transistor, or to a result that can be calculated based on the measurable or detectable signal. For example, an output signal may be a voltage at one or more terminals of a biologically gated transistor, a current at one or more biologically gated transistor, a capacitance, inductance, or resistance (calculated based on applied and measured voltages and currents), a complex-valued impedance, a complex impedance spectrum, an electrochemical impedance spectrum, a Dirac voltage, a power spectral density, one or more network parameters (such as S-parameters or h-parameters), or the like.

The term "excitation condition," as used herein, refers to a physical, electrical, or chemical condition applied to a biologically gated transistor or to a sample for measurement by a biologically gated transistor. Excitation conditions may affect a biochemical interaction, which in turn may affect one or more output signals from the biologically gated transistor. For example, excitation conditions may include voltages, currents, frequencies, amplitudes, phases, or waveforms of electrical signals applied to a biologically gated transistor, one or more temperatures, one or more fluid flow rates, one or more wavelengths of electromagnetic radiation, or the like.

The term "distance," as used herein with reference to a distance from the surface of a channel in a biologically gated transistor, refers to a distance between a point (e.g., in the sample fluid), and the closest point of the channel surface to that point. For example, the distance from the surface of the channel to a point directly above the channel in the sample fluid is the distance between a point on the channel surface to the point in the sample fluid along a line that is normal (perpendicular) to the channel surface.

The term "measurement distance," as used herein, refers to a distance from the surface of a channel in a biologically gated transistor, such that at least some aspect or portion of a biochemical interaction occurring at the measurement distance affects an output signal in a way that is detectable by a measurement controller. In other words, output signals from a biologically gated transistor are sensitive to biochemical events occurring at or within the measurement distance from the surface of a channel. Whether an effect on an output signal is detectable by a measurement controller may depend on actual sensitivity of the measurement controller, on a noise level for noise in the output signal, the extent to which the output signal is affected by aspects or portion of a biochemical interaction occurring closer to the channel surface, or the like. Whether an effect on an output signal is detectable by a measurement controller may be based on a predetermined threshold for detection or sensitivity, which may be signal to noise ratio, a ratio between effects on the output signal caused by events at a distance from the channel to effects on the output signal caused by events at the channel surface, or the like. In some examples, a measurement distance may depend on excitation conditions, or may be frequency dependent.

The term "electrostatic screening distance" as used herein, refers to a measurement distance for a 2D FET with a liquid gate, (also referred to herein as a biologically gated transistor) for steady state (e.g., constant voltage or direct current) or low-frequency (e.g., less than 10 Hz) excitation conditions and measurements. One or more layers of ions may form near the surface of a channel of a biologically gated transistor when a fluid is applied in contact with the channel surface. For example, a double layer of ions may include a first layer of ions attracted or adsorbed to the channel surface and a second layer of ions attracted to the ions in the first layer. Or, if the channel has been functionalized by depositing one or more thin film layers that include certain molecules or moieties (e.g., proteins, peptides, surfactants, polymers such as polyethylene glycol, or the like) on or above the channel surface, forming an ion-permeable layer with a net charge, then ions from the fluid may diffuse into the ion-permeable layer of immobilized molecules or moieties due to the Gibbs-Donnan effect, forming a Donnan equilibrium region, and creating a measurable Donnan capacitance. In either case, charges near the channel surface may act as a "screen" between the channel and the bulk of the sample fluid. Thus, steady-state, or low-frequency excitation and measurement may result in a measurement controller detecting effects on output signals for only the aspects or portions of a biochemical interaction that occur in or near the double layer, or the Donnan equilibrium region, and the electrostatic screening distance may be based on the thickness (e.g., Debye length) for a double layer and/or a Donnan equilibrium region.

The term "measurement bandwidth" as used herein refers to a band or range of frequencies for which output signals of a biologically gated transistor are measured. For example, where discrete samples of the output signals are measured at a sampling rate, the measurement bandwidth may be a range from 0 Hz to half the sampling rate.

The term "bias" as used herein refers to an electrical signal or waveform applied to an electrode or terminal of a biologically gated transistor, such as a source, drain, counter electrode, or another electrode. The term "programmable bias" is used to refer to a bias that is capable of being changed, varied, or modulated by the circuitry that applies the bias. Examples of programmable biases include a constant voltage or current selected by bias circuitry, a square wave, a sine wave, a more complicated waveform such as a sum of sine waves of various amplitudes, frequencies, and phases (possibly also including a zero-frequency or DC offset component), or the like.

The term "CMOS" as used herein, refers to complementary metal oxide semiconductor technology, devices, and/or processing steps, as well as to certain technologies, devices and/or processing steps separate from a CMOS process, which utilize processing tools usable in the CMOS processing steps. CMOS technology may be used to fabricate digital, analog, or mixed signal circuitry. Furthermore, the term "CMOS under <<other technology>>", as in "CMOS under graphene", indicates that certain circuitry using the "other technology" (e.g., graphene) and CMOS circuitry may be stacked one above the other. In some examples, a first portion of the other technology (e.g., graphene) circuitry and the CMOS circuitry may be stacked one above the other and a second portion of CMOS circuitry may be disposed at a horizontal distance from the other technology (e.g., graphene) circuitry.

The terms "chip scale packaging" (CSP) as used herein, refer to packages for single integrated circuit die, in which package size or footprint may be equal to or greater than 1.0 times the size of the integrated circuit die and being less than 1.2 times a size of the integrated circuit die. Certain CSP chips may be insertable into standard sockets such as microSD socket or similar.

Various methods for investigating and characterizing biomolecules or biomolecular interactions may be expensive or complex. For example, colorimetric assays or PCR-based assays may involve expensive or complex reagents, large testing devices, or the like. Tests based on optical spectroscopy may involve labeling of biological material to differentiate parts of the sample. Labeling may chemically change the sample, and may involve extensive sample purification and processing. The result may be a snapshot in time of the state of the sample, without information about how the biological or chemical aspects of the sample change over time. Optical techniques for real-time monitoring of biological or chemical changes may be difficult and expensive. For example, an optical biomolecule conformational analysis platform that uses femtosecond lasers to drive second harmonic generation on an array of dyes functionalized to a biomolecule may provide real-time information, but may require highly specialized optical equipment, and a deep mastery and understanding of the complete surface chemistry of the biomolecule.

Certain electronic or electrical biosensing methods may similarly provide limited information, or may involve great complexity and expertise. For example, electrical biosensing at a constant voltage or frequency may record one type of information at the expense of ignoring other available information that might be available using optical or mass spectroscopy. More sophisticated electronic biosensing has been carried out in single-molecule experiments performed in nanogaps or on carbon nanotubes, to probe the dynamics (such as activity and conformation) of biomolecules. These techniques for obtaining real-time or dynamic information have involved specialty lab equipment with very low throughput, and skills and knowledge associated with PhD level nanotechnologists.

By contrast, electronic measurement or characterization of biomolecular interactions using biologically gated transistors, as disclosed herein, may provide real-time information about biological and/or chemical dynamics, with low cost and complexity. Sensors including biologically gated transistors may be built using traditional electronics manufacturing techniques, leading to lower costs. Some tests may be label-free, reducing the need for complex or multi-step reactions that change the sample, and the need for certain reagents. Tools for label-free measurements may be capable of performing a wide variety of chemical and biochemical assays, leading to lower overall cost for individual measurements.

A beneficial application of this technique is to monitor the thickness of one or more applied thin film layers, which may also sometimes be referred to as functionalization layers. For example, a polymer with specific binding properties may need to be applied to the surface to create a biosensor with a specific binding response. In another example, a blocking layer of a particular thickness would need to be applied to the surface to effectively prevent binding to any site except the top of the applied target biochemistry.

Figure 1A:
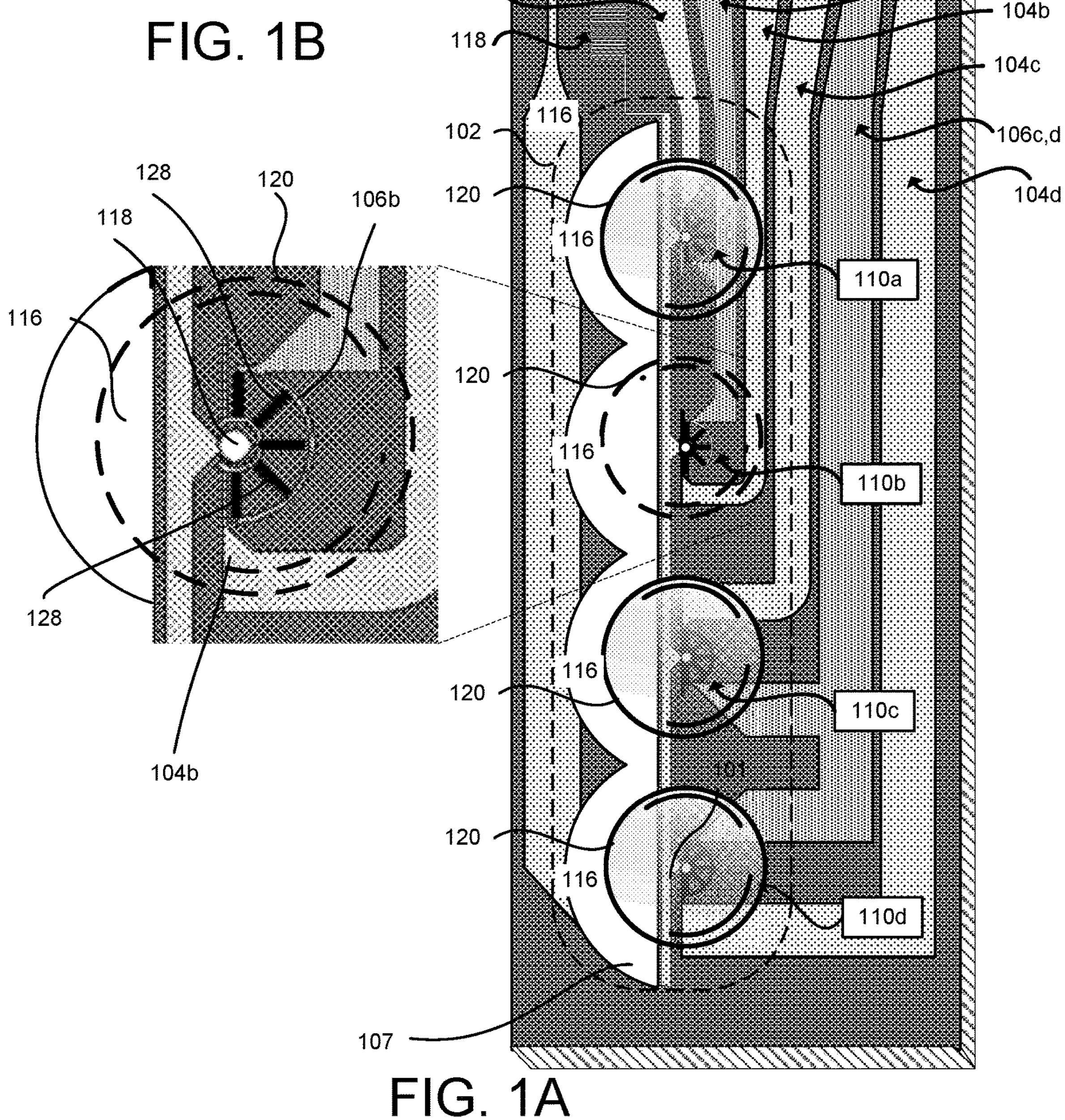
FIG. 1A is a top view and enlarged view inset of an integrated circuit with 2D field-effect transistors and on-chip thin film layer deposition and characterization, in accordance with one or more examples of the present disclosure.

FIG. 1A is a top view and enlarged view inset of an integrated circuit 100 with 2D field-effect transistors 110*a*, 110*b*, 110*c*, and 110*d* and on-chip thin film layer deposition with electrical characterization.

In various examples, the integrated circuit 100 includes conductive sources 104 and conductive drains 106 patterned in a metallization layer 108 for 2D field-effect transistors 110 in a 2D FET array 102 (e.g., as depicted in FIG. 1A), where the metallization layer 108 is formed on a dielectric layer 112, such as an oxide layer, e.g., $SiO_2$ deposited on an IC substrate 114. In certain examples, the IC substrate 114 is a silicon wafer or die that may be p-doped or n-doped in some examples. The metallization layer 108 may be a bilayer that includes a layer of a non-reactive metal such as gold and a thin adhesion layer to enhance adhesion of certain metals such as gold to the dielectric layer 112. Moreover, more that different types of metallization layers 108 may be used for different portions of the IC. In one working example, platinum is advantageously selected for the metallization layer 108 because it is non-reactive with many liquids and is suitable for adhering to the dielectric layer 112 without an adhesion layer.

The integrated circuit 100, in some examples, such as the working example depicted in FIG. 1A, includes two or more environmentally non-reactive electrodes 116,118 in the metallization layer 108 deposited on the dielectric layer 112. In certain examples, the two or more environmentally non-reactive electrodes 116, 118 are horizontally offset from the 2D FETs 110 in the FET array 102. In contrast to top-gated or bottom-gated FET designs where metal gates are disposed above or below the channel of the transistor (separated by a gate dielectric), in various examples disclosed in the present disclosure at least one environmentally non-reactive electrode 116,118 is configured to impart a counter electrode voltage ($V_{CE}$) to a liquid 120 received in a gate area 122 such that the counter electrode voltage imparted to the liquid provides a gate voltage for the 2D FETs 110 in the FET array 102 covered by the liquid 120 so that a target analyte is detectable in response to a binding event within measurement distance of the channel 128. In other words, in such examples there are no metal gate electrodes disposed vertical above or below the channels 128 of the 2D FETs 110.

In one or more examples, at least one environmentally non-reactive electrode 116,118 is configured to enable a reference electrode measurement of a gate voltage (Vg) of the liquid to be made. Beneficially, using a non-reactive electrode 116 (e.g., a counter electrode), that is larger and separate from a different non-reactive electrode 118 (e.g., a reference electrode), enables certain differences in driven liquid gate voltage as compared to measured gate voltage (e.g., $V_{Ref}$) to be compensated for using feedback circuitry 117 which may be implemented using circuitry similar to the circuitry depicted in FIG. 2B.

In various examples, the integrated circuit 100 includes a 2D nanomaterial layer 126 for patterning channels 128 of the 2D FETs 110 between the conductive sources 104 and the conductive drains 106. In certain examples, the integrated circuit 100 include a temporary etchable inert masking layer 130 on the 2D nanomaterial layer 126 that forms hard masked channel regions 132 over the channels 128 of the 2D FETs 110 to be patterned. It may be noted that the channels 128 of the 2D FETs 110 may be unitary or may include multiple parallel elements to improve reliability. For example, the 2D FETs 110 depicted in FIG. 1A are patterned using a radially extending spoke pattern of five rectangular channels 128 patterned in the 2D nanomaterial. In addition to the reliability benefits of using channels that include multiple 2D nanomaterial segments, the spoke pattern also provide efficient electrical coupling with the area of liquid 120 over the 2D FETs (e.g., 110*a*, 110*b*, 110*c*, 110*d*).

In some examples, the integrated circuit 100 includes hard masked channel regions 132 patterned to temporarily cover channels 128 of the 2D FETs and corresponding regions covered by the etchable inert masking layer 130. In certain examples, the inert masking layer 130 comprises an inert metal. For example, gold is an example of an etchable inert metal that when deposited as an inert masking layer provides good temperature and chemical protection for the 2D nanomaterial used to form the channels 128. One benefit of using an inert metal as the inert masking layer 130 is that it is easier to select an etching process for patterning any dielectric layers immediately above or below. In certain examples, the inert masking layer 130 may be a dielectric layer such as an oxide layer or a nitride layer. Aluminum oxide and other oxides or nitride may offer good temperature resistance and sufficient chemical protection for some processes provided that the etching of the inert masking layer can be done without affecting adjacent layers and vice versa. Selection of the inert masking layer should consider that 2D nanomaterials may be contaminated or damaged by etching, heating, cleaning, and/or other semiconduction processes that would not necessarily detrimentally affect silicon based chips.

In certain examples, the integrated circuit 100 includes a ceramic coating layer 134 patterned to cover portions of the chip to be electrically insulated from the liquid with openings 136 in the ceramic coating layer 134 corresponding to the hard masked channel regions 132 and corresponding to the regions of the two or more environmentally non-reactive electrodes 116, 118. In various examples, the integrated circuit 100 include a further opening 136 etched in the etchable inert masking layer to expose the 2D FET channels to the liquid received in the gate area. In the working example depicted in FIG. 1A, the entire top surface of the integrated circuit 100 is covered with a ceramic coating layer such as silicon nitride, aluminum oxide, or other ceramic coating which advantageously provides a protective coating that protects the chip from undesired electrical or chemical contact with the electrically biased liquid environment. Beneficially, the etchable inert masking layer may be used to protect the 2D nanomaterial of the channels of the 2D FETs during the patterning of the ceramic coating layer.

After removal of the etchable inert masking layer, in various examples, one or more thin film layers (e.g., 138, 140, 142, 144 and so forth) are deposited via liquid mediated deposition or voltage-assisted deposition on channels of one or more selected instances of the 2D FETs of the FET array. Additional details of the various types and combinations of thin film layers that may be deposited are provided below with respect to FIGS. 3A, 3B, 3C, 3D, 3E, 4A, and 4B.

Figure 12:
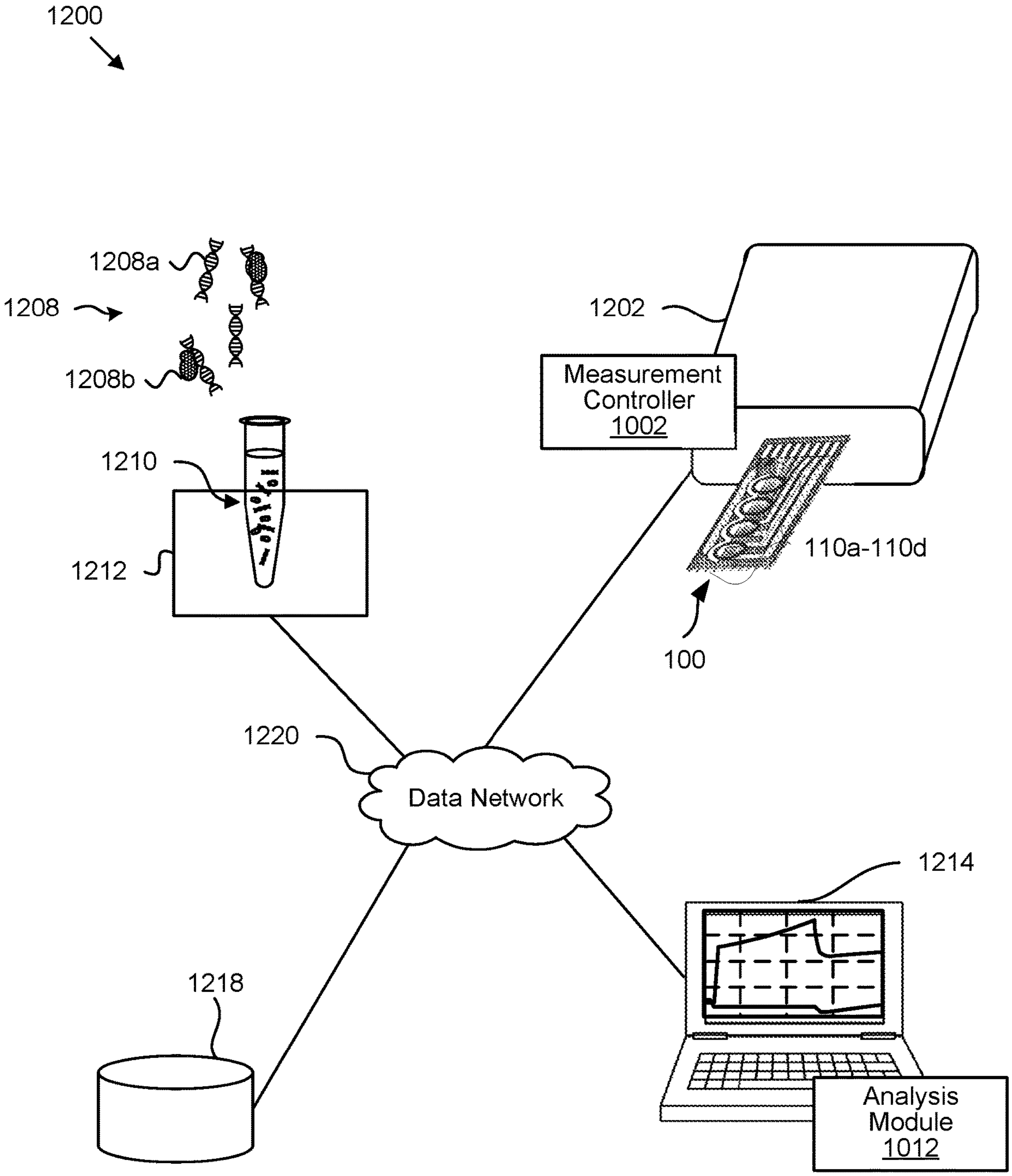
FIG. 12 is a schematic block diagram illustrating a system that includes an integrated circuit with 2D field-effect transistors for performing on-chip thin film layer deposition with electrical characterization, in accordance with one or more examples of the present disclosure.

In various examples, the integrated circuit 100 includes chip connections 115 in the metallization layer that enable on-chip measurements comprising measurement vectors for the one or more selected instances of the 2D FETs of the FET array to be made in connection with the liquid mediated deposition or voltage-assisted deposition of the one or more thin film layers. In certain examples, the integrated circuit is implemented using chip scale packaging with a connector form factor that enables a chip implementing the integrated circuit 100 to be inserted into a socket such as for example a micro SD socket of a measurement controller 1002 that includes a biosignal processing instrument 1202 as depicted in FIG. 12 to communicate via input and output signals to the integrated circuit 100.

Figure 2A:
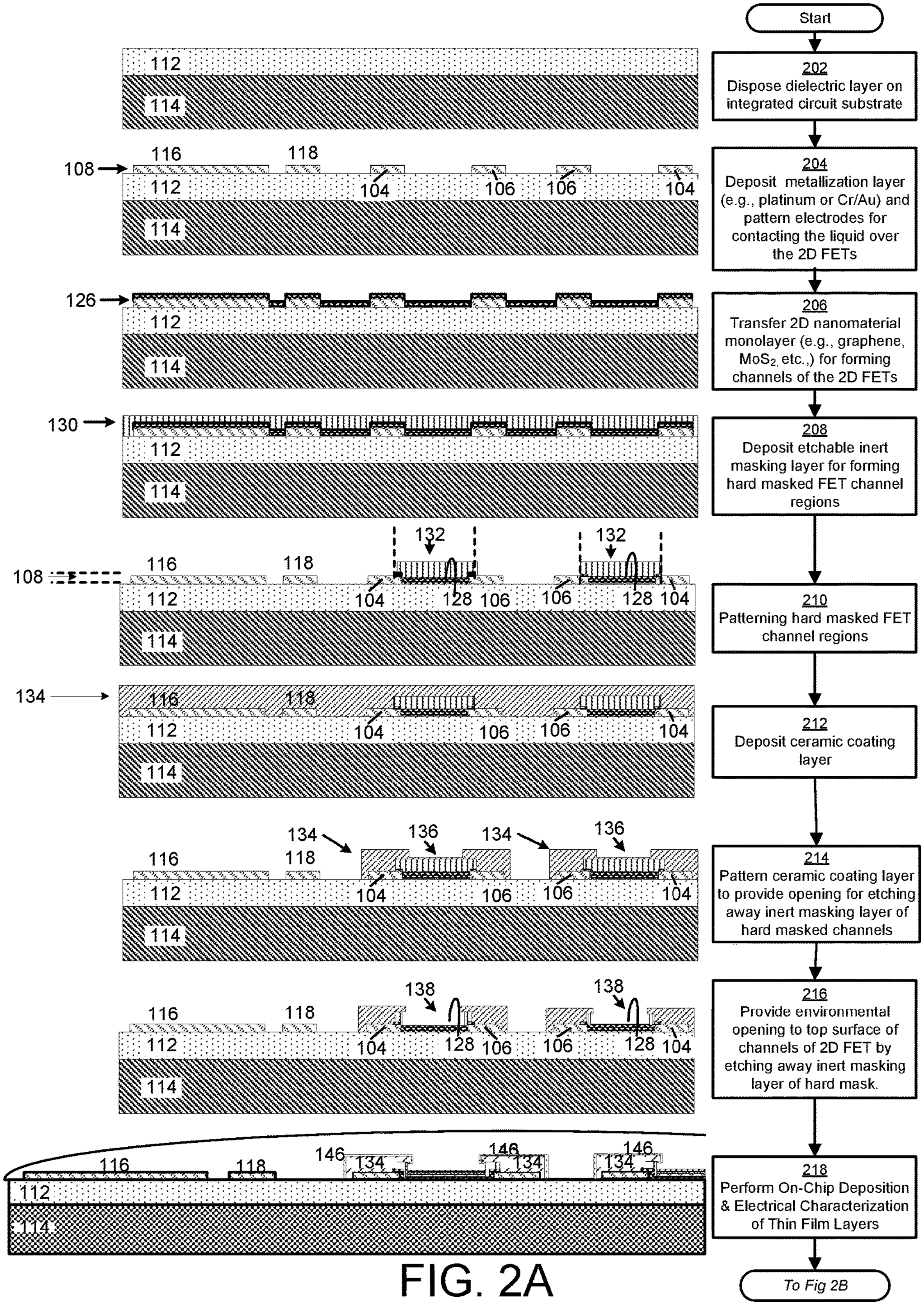
FIG. 2A is an illustration of a flowchart diagram and corresponding cross-sectional view of integrated circuit layers and process steps for manufacturing and/or using an integrated circuit with 2D field-effect transistors and on-chip thin film layer deposition and characterization, in accordance with one or more examples of the present disclosure.

FIG. 2A is an illustration of a flowchart diagram and corresponding cross-sectional view of integrated circuit layers and process steps of a method 200 for manufacturing an integrated circuit with 2D field-effect transistors and on-chip thin film layer deposition and characterization, in accordance with one or more examples of the present disclosure. It may be noted that certain steps of the method 200 may be broken down into further substeps but are listed as shown in FIG. 2A for convenience and to more particularly emphasize certain aspects of the method and integrated circuit process steps.

In various examples, the method 200 of manufacturing thin film layers on channels of a FET array (e.g., 102) of an integrated circuit (e.g., 100) begins and includes 202 disposing a dielectric layer 112 on an integrated circuit substrate 114. In one or more working examples, the dielectric layer 112 comprises a thermal oxide selected from thermal oxides used in standard semiconductors. The integrated circuit substrate 114 may in some implementations be a silicon wafer or die that may be p-doped or n-doped. P-doped silicon wafers are one type of substrate frequently used in various standard semiconductor fab processes. In certain implementations, the integrated circuit substrate 114 is a flexible substrate such as a polyimide film. In such implementations, the dielectric layer 112 may a flexible polymer dielectric.

The method 200 continues and, in certain implementations, includes patterning conductive sources (e.g., 104) and conductive drains (e.g., 106) in a metallization layer (e.g., 108) for each transistor (e.g., 110*a*, 110*b*, 110*c*, 110*d*, and so forth) in the FET array (e.g., 102), the metallization layer formed on substrate comprising a dielectric layer (112) disposed on an IC substrate (114). For example, the metallization layer may comprise platinum or gold or similar metals.

In various implementations, the method 200 continues and includes patterning 204 two or more environmentally non-reactive electrodes (e.g., 116, 118) in the metallization layer deposited on the dielectric layer, where the two or more environmentally non-reactive electrodes are horizontally offset from the FETs in the array and at least one environmentally non-reactive electrode is configured to impart a counter electrode voltage to a liquid received in a gate area such that the counter electrode voltage imparted to the liquid provides a gate voltage for the FETs in the array covered by the liquid and where at least one environmentally non-reactive electrode is configured to enable a reference electrode gate voltage of the liquid to be measured.

In various working examples, the metallization layer used is sometimes referred to as platinum wiring and is patterned to form connections to the transistor channel as well as to the two or more environmentally non-reactive electrodes.

In one or more examples, the method 200 includes transferring 206 a 2D nanomaterial layer for patterning channels (e.g., 128) of the 2D FETs 110 between the conductive sources and the conductive drains. In various working examples, the 2D nanomaterial layer is a single 2D layer of graphene that is patterned to form the channels 128 of the 2D FETs (e.g., 110).

The method 200 continues and includes depositing 208 an etchable inert metal layer that couples to a top surface of the 2D nanomaterial layer for forming hard masked channel regions over the 2D FET channels to be patterned. In one or more working examples, a gold layer is effective as etchable inert metal layer. In various examples, the etchable inert metal layer may be any inert metal that has the characteristic property of being resistant to corrosion and oxidation.

In certain examples, the method 200 further includes patterning hard masked channel regions comprising the 2D FET channels and corresponding regions covered by the etchable inert metal layer (e.g., 130). Such patterning may be performed using a exposed photoresist material such as PMMA over the hard masked channel regions which prevents the inert metal layer over the channel regions from being etched away until later in the process and further permits the etchable inert metal layer in other regions not protect by the photoresist, such as over the non-reactive electrodes 116, 118, to be removed to expose the non-reactive electrodes 116, 118 to permit electrical coupling of the non-reactive electrodes 116, 118 to the liquid 120.

In some examples, after the etchable inert metal layer has been removed from areas outside the masked channel regions over the 2D FET channels, the integrated circuit may be diced and/or packaged either using chip scale packaging or may use conventional packaging processes such as wire bonding, encapsulation, and so forth, provided that the packaging processes used leave an opening to all regions of the chip that need to be environmentally exposed to liquids that facilitate liquid mediated deposition of thin film layers on the channel regions and the also facilitate performing liquid gated measurements using the 2D FETs.

In various examples, the method 200 continues and includes depositing 212 a ceramic coating layer 134 that covers portions of a surface of the integrated circuit to be electrically insulated. In certain examples, the ceramic coating layer may include materials such as silicon nitride, aluminum oxide, silicon oxide, silicon oxynitride, aluminum nitride, aluminum oxynitride or combinations thereof or similar ceramic coating layers which advantageously provides a protective coating that protects the chip from undesired electrical or chemical contact with the electrically biased liquid environment. Such ceramic coatings may also protect surfaces of the integrate circuits from scratches or other mechanical damage.

In one or more examples, the method 200 further includes removing 214 areas of the ceramic coating layer corresponding to the hard masked channel regions and corresponding to the regions of the two or more environmentally non-reactive electrodes. As depicted in FIG. 2A, this patterning of the ceramic coating layer provides openings about the etchable inert metal layer protecting the 2D nanomaterial used to form the 2D FET channels.

The method 200 continues and further includes etching away 216 areas of the etchable inert metal layer to expose the 2D FET channels to the liquid received in the gate area. In other words, this process step provides an environmental opening to a top surface of the channels of the 2D FETs.

In various examples, the method 200 further includes performing 216 liquid mediated on-chip deposition and electrical characterization of one or more thin film layers on channels of one or more selected 2D FETs 110. In certain examples, performing 216 electrical characterizations of the one or more thin film layers includes making on-chip measurements comprising measurement vectors for the one or more selected 2D FETs 110 of the FET array in connection with the liquid mediated deposition of the one or more thin film layers.

The measurement vectors, in certain examples, include one or more transfer curve parameters selected from maximum transconductance magnitudes for p-type and/or n-type branches of a transfer curve, a charge neutrality point voltage of the transfer curve, resistance at the charge neutrality point, curvature of the transfer curve in the region of the charge neutrality point, curvature of the p-type and/or n-type branches of the transfer curve apart from the region of the charge neutrality point.

In certain examples, one or more parameters including parameters selected from capacitance, mobility, charge density, and combinations thereof are extracted from the transfer curves parameters using a physical model of the selected 2D FETs 110.

Figure 2B:
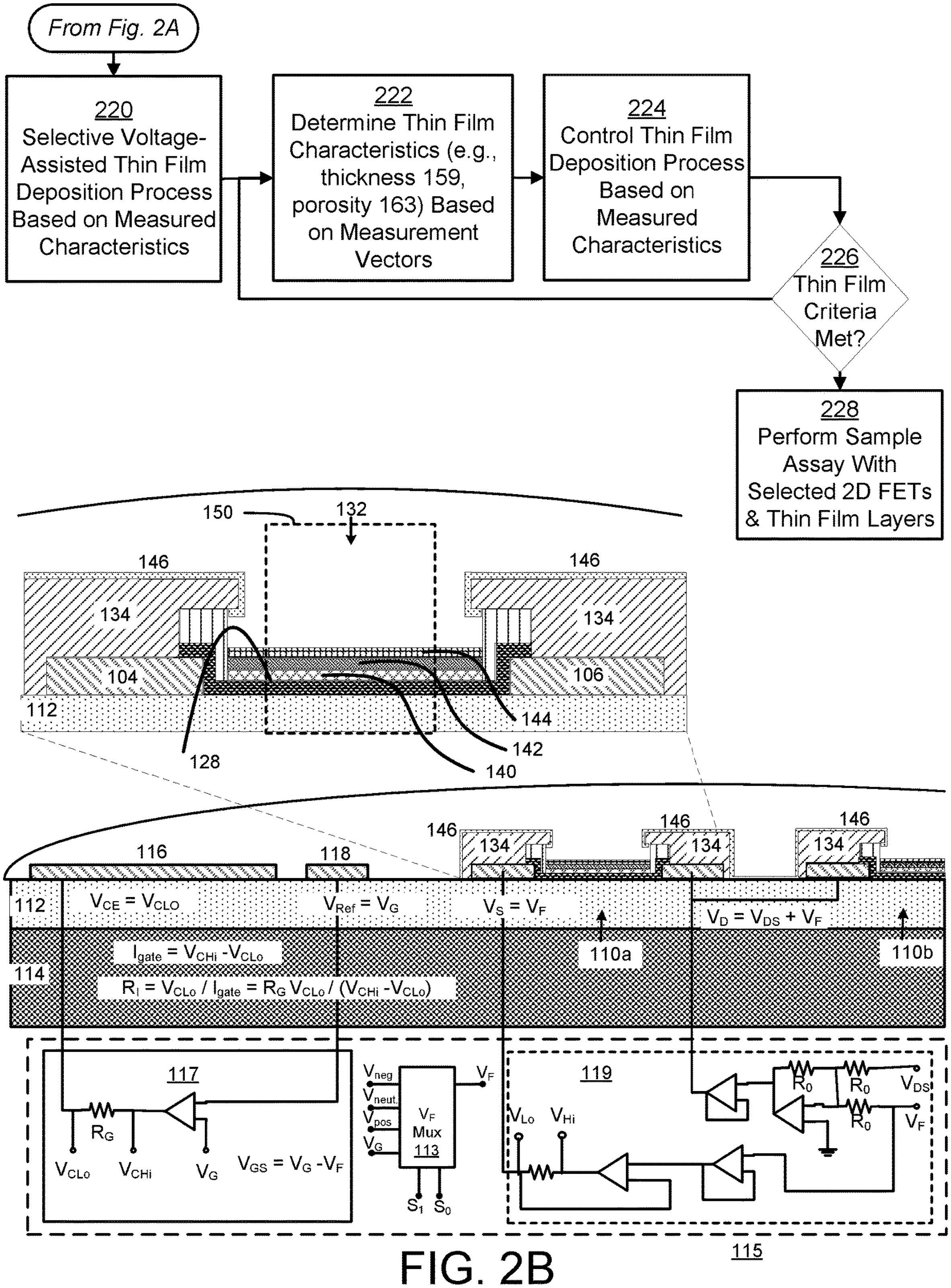
FIG. 2B is an illustration of a flowchart diagram depicting additional process steps for manufacturing and an enlarged inset view of an integrated circuit with 2D field-effect transistors and measurement and excitation circuitry for on-chip thin film layer deposition and characterization, in accordance with one or more examples of the present disclosure.

FIG. 2B is an illustration of a flowchart diagram depicting additional process steps for the method 200 using an integrated circuit with 2D field-effect transistors and on-chip thin film layer deposition and characterization, in accordance with one or more examples of the present disclosure. FIG. 2B is also an illustration of a cross-sectional view and an enlarged inset view of an integrated circuit with 2D field-effect transistors and measurement and excitation circuitry 115 for on-chip thin flayer deposition and characterization, in accordance with one or more examples of the present disclosure.

As depicted in FIG. 2B, the method 200, further includes, in one or more examples, selectively performing 220 deposition (voltage-assisted) of the one or more thin film layers that includes performing one or more of the following actions: applying an electrophoretic voltage to both the conductive source and the conductive drain of the 2D FETs selected to receive the deposition of a predetermined thin film layer, the electrophoretic voltage configured to move components for forming the thin film layer closer to the channel of the selected 2D FETs 110; applying a repelling voltage to both the conductive source and the conductive drain of the 2D FETs selected to not receive the deposition of the predetermined thin film layer, the repelling voltage configured to move components for forming the thin film layer further from the channel of the selected 2D FETs 110, and combinations thereof.

Inputs to circuitry 115 include $V_{SD}$, $V_F$, and $V_G$. The voltage that determines the state of the 2D FET is the gate-source voltage VGS. In this design, a float voltage, $V_F$ modifies $V_{GS}$ for an individual 2D FET. Each 2D FET 110*a*, 110*b* may have its own $V_F$, allowing the integrated circuit 100 to selectively turn on and off 2D FET, even when only a single liquid gate $V_G$ is used. This vastly simplifies multiplex sensing designs that rely on multiple separated droplets or wells.

In addition, the ability, in certain implementations, to set $V_{GS}$ independently for each 2D FET enables independently controlled functionalization of individual 2D FET channels. The advantageously enables large scale multiplexing without reliance on microfluidics, spotting, or similar techniques that handle small amounts of liquid.

In some implementations, the outputs of the circuitry 115 (e.g., including 117 and 119) include the voltage drops across resistors from which the current through the channel and gate can be calculated. The channel current (IDs may calculated as $(V_{HI}-V_{LO})/R_I$, while the gate current may be calculated as $(V_{CHi}-V_{CLo})/R_G$. From these values, and with control of $V_G$, a transfer curve can be recorded and the transfer curve processing as disclosed herein is enabled.

From these values, and with control of $V_G$, a transfer curve can be recorded and the transfer curve processing described elsewhere is enabled.

In various examples, the bias circuitry may include a mux 113 that enables each 2D FET to use an independent float voltage $V_F$ applied for providing independent gate voltages $V_G$. In some examples, an analog voltage control may be provided for each 2D FET. However, in certain implementations it may be beneficial to use something other than an analog voltage control for each 2D FET. For example, as depicted in FIG. 2B, it may be advantageous to provide a set of selectable inputs for the float voltage selected from $V_{neg}$, $V_{neutral}$, $V_{pos}$, and $V_G$, where $V_{neg}$ is a voltage selectable to produce a large negative shift in $V_{GS}$, such as for example 600 mV. $V_{neutral}$ is a voltage selectable to not adjust $V_{GS}$, such as 0 mV. $V_{pos}$ is a voltage electable to produce a large positive shift in $V_{GS}$, such as for example negative 600 mV. $V_G$ is a copy of the applied gate voltage such that $V_{GS}$ is kept close to 0 V no matter the $V_G$ setpoint is. The mux 113 includes two mux select bits $S_1$, $S_0$ for selecting which of the four input voltages $V_{neg}$, $V_{neutral}$, $V_{pos}$, and $V_G$ is provided as the $V_F$ output to the 2D FET.

Figure 10:
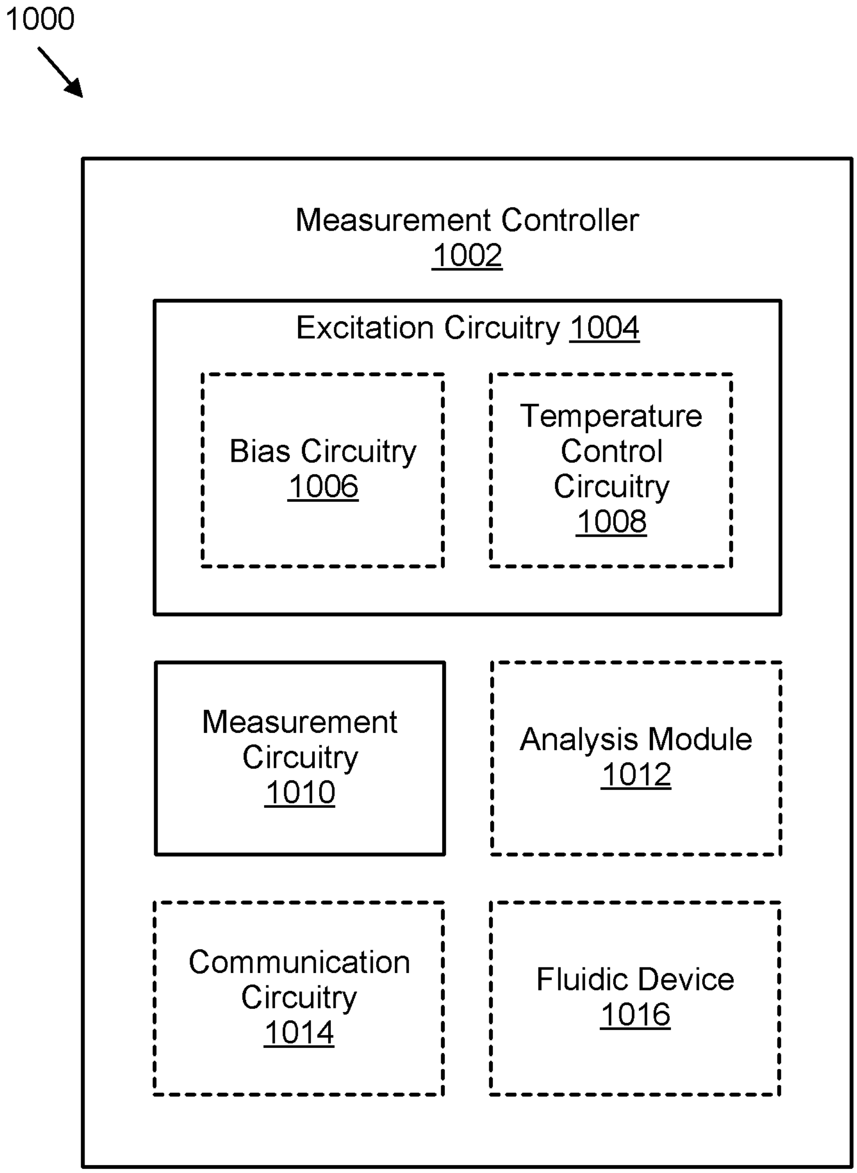
FIG. 10 is a schematic block diagram illustrating a measurement controller, in accordance with one or more examples of the present disclosure.

In various examples, voltage-assisted deposition may be performed on chip using bias circuitry 119 as illustrated in FIG. 2B and FIG. 10. A liquid gate voltage may be applied using bias circuitry 117 where bias circuitry 117 and bias circuitry 119 provide the voltage, current, and resistance shown in FIG. 2B for performing on-chip voltage assisted thin film deposition and/or electrical characterization which may be performed using the methods, structures, and/or systems disclosed and described herein or portions or combinations thereof.

In certain examples, the method 200 further includes determining 222 based on the on-chip measurements, one or more thin film characteristics selected from thickness 159, relative thickness 161, porosity 163, relative porosity 165, and combinations thereof, for selected thin film layers of the one or more thin film layers.

In certain examples, determining the thickness of the thin film layer includes determining a ratio of a maximum transconductance measurement of a predeposition transfer curve to a maximum transconductance measurement of a deposition transfer curve. For example, on plots of transfer curves generated on-chip during or after deposition of each thin film layer, the maximum transconductance measurements may be thought of as the maximum slope of transfer curves (e.g., I-Vg curves) as further disclosed herein.

In various examples, determining a relative porosity 165 of the thin film layer by comparing a first deposition measurement vector generated using a full strength buffer with a second deposition measurement vector generated using a diluted buffer.

In some examples, the method 200 includes controlling 224 selected characteristics of the thin film by adjusting concentrations and/or incubation times of components used to form individual thin films of the one or more thin film layers based on the on-chip measurements made in connection with the liquid mediated deposition of the individual thin films.

In various examples, determining the measurement vectors includes determining a predeposition measurement vector for the one or more selected 2D FETs 110 generated at a predeposition time period prior to deposition of a selected thin film layer of the one or more thin film layers as a reference for comparison with a deposition measurement vector for the one or more selected 2D FETs 110 generated at a deposition time period during or after deposition of the selected thin film layer. In various examples, determining predeposition measurement vectors for one or more selected 2D FETs 110 includes determining values for the measurement vectors for unmodified 2D nanomaterial that forms the channels of the one or more selected 2D FETs 110.

It may be noted that both predeposition thickness measurements and deposition thickness measurements are both affected by a length referred to as the Debye length. In an electrolytic solution, the Debye Length (K−1 [m]) is the measure of a charge carrier's net electrostatic effect in the solution in terms of the distance at which it persists. Thus, this metric gives a good approximation of the electric double layer thickness. The double layer thickness can be electrically measured for the 2D FETs 110 in both predeposition and deposition states and should be included in the thickness calculations.

Figure 3A:
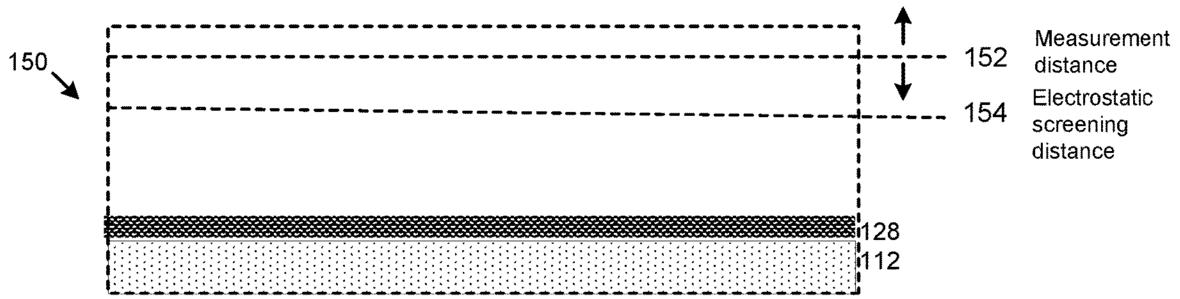
FIG. 3A is an illustration of a cross-sectional view of a channel region of a 2D FET with a channel in a predeposition state, in accordance with one or more examples of the present disclosure.

FIG. 3A is an illustration of a cross-sectional view of a channel region 150 of a 2D FET 110 with a channel 128 in a predeposition state, in accordance with one or more examples of the present disclosure. It may be noted that both predeposition thickness measurements and deposition thickness measurements are both affected by a length referred to as the Debye length. In an electrolytic solution, the Debye Length (K−1 [m]) is the measure of a charge carrier's net electrostatic effect in the solution in terms of the distance at which it persists. Thus, this metric gives a good approximation of the electric double layer thickness. The double layer thickness can be electrically measured for the 2D FETs 110 in both predeposition and deposition states and should be included in the thickness calculations.

Figure 3B:
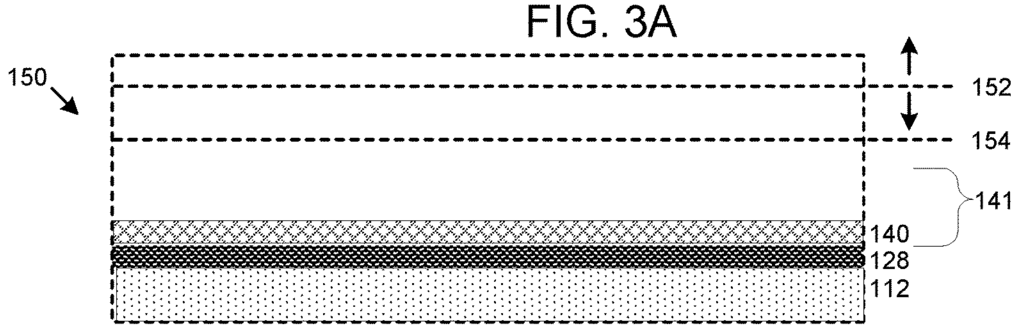
FIG. 3B is an illustration of a cross-sectional view of a channel region 150 of a 2D FET 110 with an immobilization layer 140 deposited on the channel 128, in accordance with one or more examples of the present disclosure.

FIG. 3B is an illustration of a cross-sectional view of a channel region 150 of a 2D FET 110 with an immobilization layer 140 deposited on the channel 128, in accordance with one or more examples of the present disclosure. In certain examples, the immobilization layer 140 includes a first moiety that binds to a top surface of the channels 128 of the selected 2D FETs 110. In such examples, the immobilization layer 140 may include a second moiety selected to bind to an analyte sensitization layer (e.g., 142). For example, the immobilization layer 140 may include a linker such as PBASE which is a linker that includes a pyrene group that stacks with graphene by π-π binding. Various characteristics of the immobilization layer 140 may be electrically characterized on-chip and may also be monitored and/or controlled using the measurement methods described herein, thus providing advantages of consistency of measurement, reliability of biosensing, selection of preferred immobilization layers, and so forth.

Figure 3C:
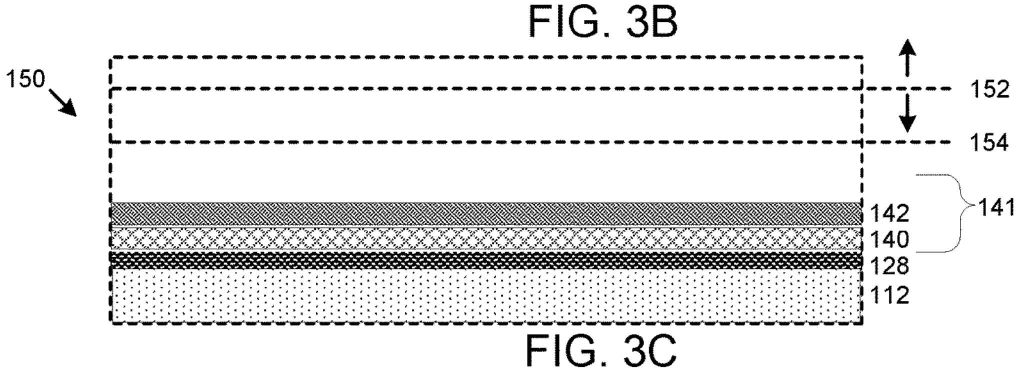
FIG. 3C is an illustration of a cross-sectional view of a channel region 150 of a 2D FET 110 with an analyte sensitization layer 142*a* deposited on the channel 128, in accordance with one or more examples of the present disclosure.

FIG. 3C is an illustration of a cross-sectional view of a channel region 150 of a 2D FET 110 with an analyte sensitization layer 142 deposited on the channel 128, in accordance with one or more examples of the present disclosure. In some examples, analyte sensitization layers 142 (also known as capture layers) may include antibodies, antigens, ribonucleoproteins, peptides, streptavidin, DNA, RNA, peptide nucleic acids, small molecules, fragments thereof, combinations thereof, and so forth.

It may be noted that different analyte sensitization layers 142 may be deposited on different 2D FETs of the same chip or of different chips for purposes of performing multiplexed assays in which a sample liquid is analyzed for multiple parameters using differently functionalized 2D FETs 110. Certain characteristics of the analyte sensitization layer 142 may be electrically characterized on-chip and may also be monitored and/or controlled using the measurement methods described herein, thus providing advantages of consistency of measurement, reliability of biosensing, selection of preferred analyte sensitization layers, and so forth.

Figure 3D:
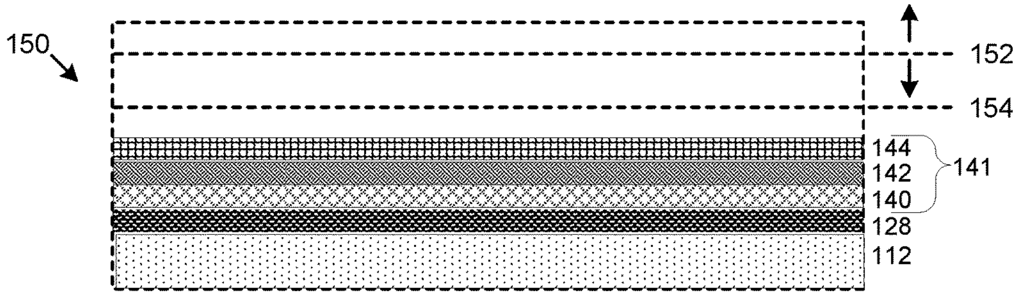
FIG. 3D is an illustration of a cross-sectional view of a channel region 150 of a 2D FET 110 with a blocking layer 144 deposited on the channel 128, in accordance with one or more examples of the present disclosure.

FIG. 3D is an illustration of a cross-sectional view of a channel region 150 of a 2D FET 110 with a blocking layer 144 deposited on the channel 128, in accordance with one or more examples of the present disclosure. In various examples, the blocking layer 144 acts as a blocker for nonspecific binding e.g., to prevent unintended chemical interactions with the 2D FET channels. Examples of protein blockers that may be used to form suitable blocking layers may include bovine serum albumin (BSA), fish skin gelatin (FSG), bovine gamma globulin (BGG), lysozyme, casein, peptidase, components thereof, combinations thereof, etc. Examples of polymer blockers that may be suitable to form blocking layers may include polyethylene glycol, polysorbate surfactants, polypropylene glycol, poloxamers, components thereof, combinations thereof, and so forth. In some examples, protein blockers may be used in combination with polymer blockers to form a blocking layer 144. One or more characteristics of the blocking layer 144 may be electrically characterized on-chip and may also be monitored and/or controlled using the measurement methods described herein, thus providing advantages of consistency of measurement, reliability of biosensing, selection of preferred blocking layers, and for other purposes.

Figure 3E:
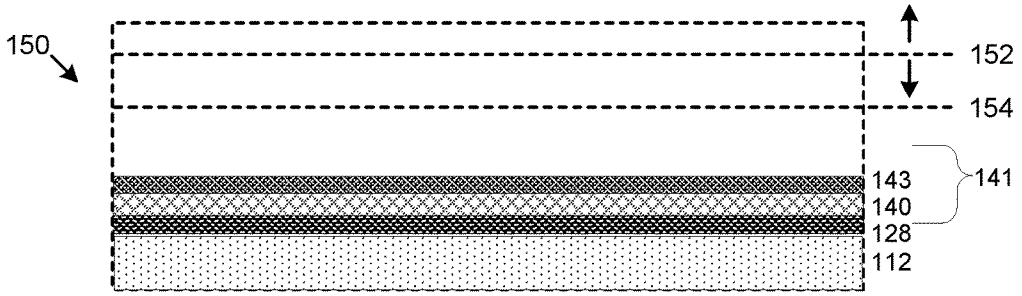
FIG. 3E is an illustration of a cross-sectional view of a channel region 150 of a 2D FET (e.g., 110) with a thin film layer 143 comprising a biofilm and/or a polymer deposited on the channel 128, in accordance with one or more examples of the present disclosure.

FIG. 3E is an illustration of a cross-sectional view of a channel region 150 of a 2D FET (e.g., 110) with a thin film layer 143 comprising a biofilm and/or a polymer deposited on the channel 128, in accordance with one or more examples of the present disclosure. In certain examples, the sample liquid includes components such as bacteria and media that stimulate formation of a biofilm. In such examples, a beneficial result of performing on-chip characterization of the thin film layer 143 is that the growth rates, eventual thickness, 167 and porosity 163 of the biofilm may be determined at various stages of bio film growth. Furthermore, excitation circuitry may apply an AC signal to the liquid to determine which signal parameters have a beneficial and/or a detrimental effect on biofilm growth. Other types of biofilms that may be characterized on-chip using the 2D FETs include protein biofilms such as silk fibroin from silkworms, or recombinant spider silk protein.

In certain examples, the thin film layer 143 may include cellular structures such as naturally grown or engineered tissue. In some examples, the thin film layer 143 may include self-assembling monolayers. Various characteristics of the thin film 143 may be electrically characterized on-chip and may also be monitored and/or controlled using the measurement methods described herein, thus providing advantages of discovery of new information about the grown thin film, more rapid and more precise information regarding thin film growth, selection of preferred types of grown thin film, and so on.

Figure 4A:
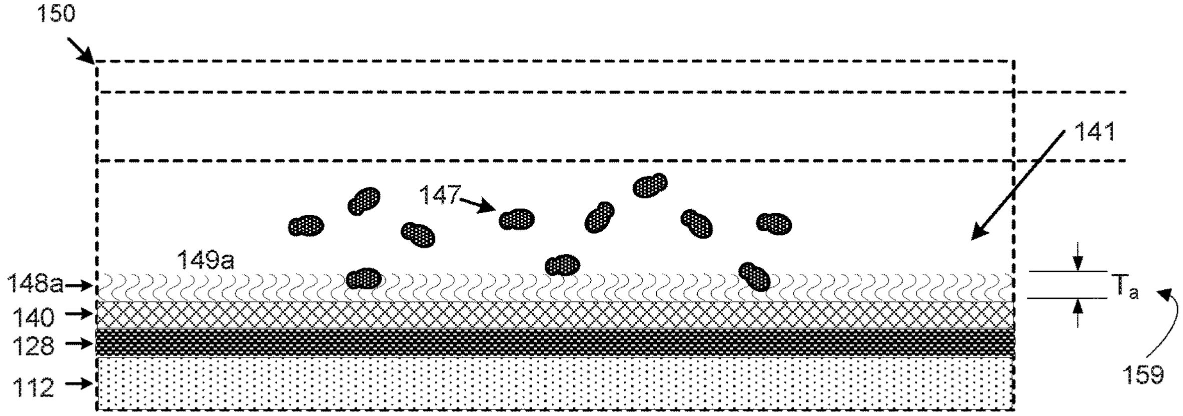
FIG. 4A is an illustration of a cross-sectional view of a channel region of a 2D FET with one or more thin film layers that include immobilized nucleic acid strands, in accordance with one or more examples of the present disclosure.

FIG. 4A is an illustration of a cross-sectional view of a channel region 150 of a 2D FET (e.g., 110) with one or more thin film layers 141 that include immobilized nucleic acid strands 149*a*, in accordance with one or more examples of the present disclosure. In various examples, the one or more thin film layers 141 include an immobilization layer 140 with a first moiety that binds to a top surface of the channels 128 of the selected 2D FETs 110. The one or more thin film layers 141 further include a nucleic acid layer 148*a* that include nucleic acid strands 149*a* immobilized to the channels of the selected 2D FETs by the immobilization layer 140, wherein the nucleic acid strands 149*a* includes a target site comprising a predetermined nucleotide sequence.

Figure 11:
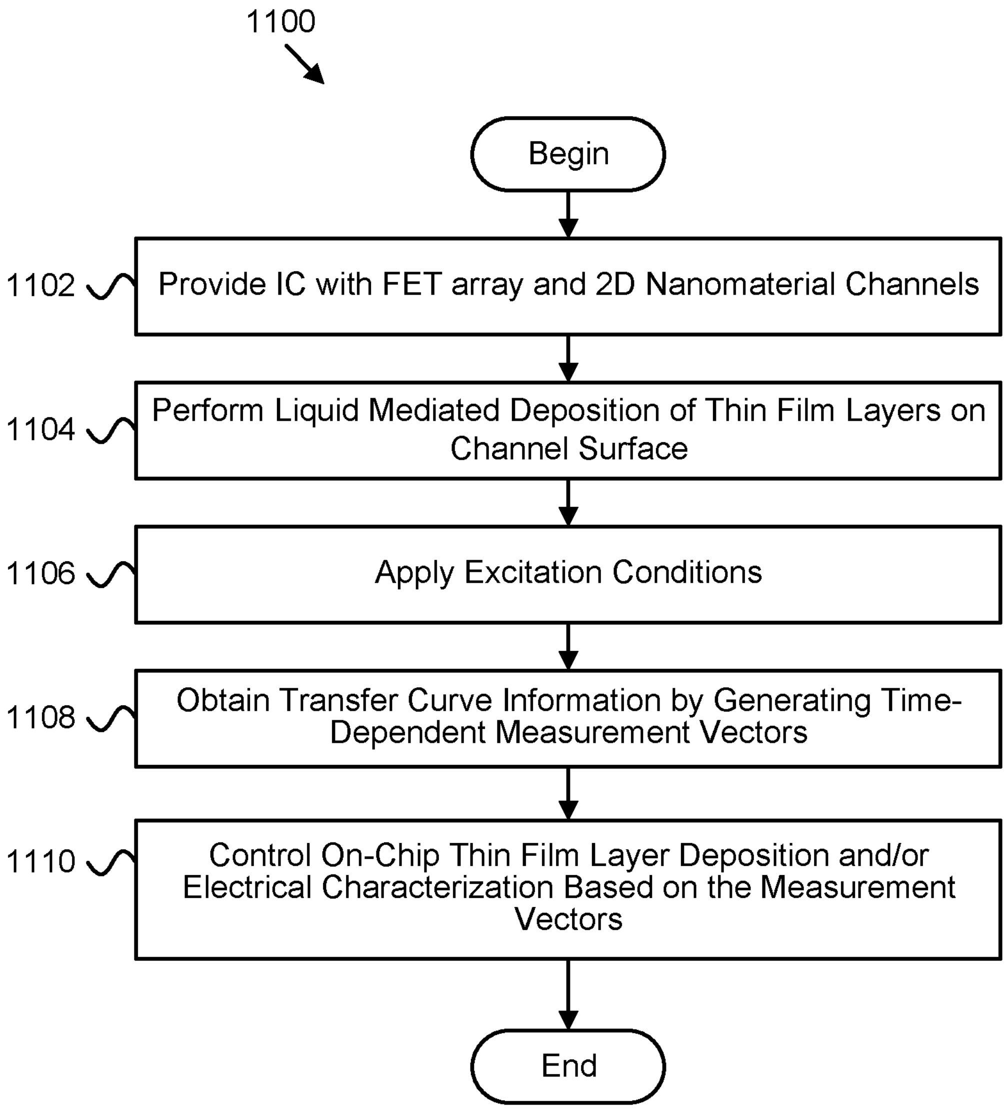
FIG. 11 is a flow chart diagram illustrating a method for on-chip thin film layer deposition and characterization, in accordance with one or more examples of the present disclosure.

In certain examples, the thickness 159, relative thickness 161, porosity 163, relative porosity 165 and/or other thin film characteristics are determined using one or more methods or steps or combinations of steps thereof as disclosed herein, such as for example the method 200 or method 1100 depicted in FIGS. 2A, 2B, 11, and/or with respect to FIGS. 5, 6A-6E, 7A-7I, 8, 9.

In some examples, the integrated circuit (e.g., 100) is configured to detect a sequence-specific interaction between the nucleic acid 149*a* and a ribonucleoprotein 147 in a sample liquid based on a reduction in thickness of the nucleic acid layer 148*b* in response to cleavage of the nucleic acid 148*a* at the target site by the ribonucleoprotein 147 in the sample liquid.

In one or more examples, the immobilized nucleic acid layer is a reporter DNA that contains sites for ribonucleases to bind to, but without sequences specifically designed or expected to trigger enzyme activity. The reporter DNA is linked to the channel 128 via an immobilization layer 140. A target for detection such as a DNA sequence indicating cancer is used to select a guide RNA for the ribonucleoprotein complex where the ribonucleoprotein includes a Cas enzyme such as for example Cas14 that is selected to cleave the reporter DNA after recognition of the target DNA.

Figure 4B:
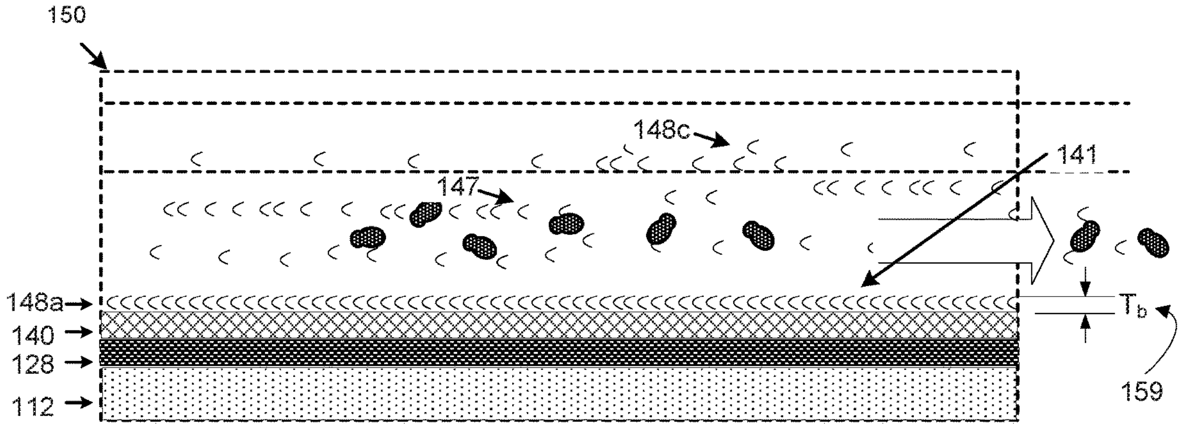
FIG. 4B is an illustration of a cross-sectional view of a channel region of a 2D FET with one or more thin film layers that include immobilized nucleic acid strands that are cleaved in the presence of a sample including a ribonucleoprotein targeted at a selected sequence, in accordance with one or more examples of the present disclosure.

FIG. 4B is an illustration of a cross-sectional view of the channel region 150 of the 2D FET 110 with one or more thin film layers 141 that include immobilized nucleic acid strands 149*a* that are cleaved in the presence of a sample including the ribonucleoprotein 147 targeted at a selected sequence, in accordance with one or more examples of the present disclosure. In various examples, the Cas enzyme in the ribonucleoprotein cleaves the RNA at the selected target site and the cleaved fragments 148*c* are washed away, thus enabling detection of the recognition interaction (e.g., cleavage interaction) of the ribonucleoprotein 147 with the immobilized RNA strands 148*a* by measuring the reduced thickness 159 of the remaining nucleic acid layer 148*b*.

The applied nucleic acid layer may also incorporate material targeted for detection directly. In one or more examples, the immobilized nucleic acid layer is an RNA, such as for example a coronavirus RNA or another RNA of interest where the RNA is linked to the channel 128 via an immobilization layer 140. A target site for the RNA is used to select a guide RNA for the ribonucleoprotein complex where the ribonucleoprotein includes a Cas enzyme, such as for example Cas13, that is selected to cleave the RNA at the selected target site.

Comparing the magnitude of the measured change in layer thicknesses of the remaining nucleic acid layers 148*b* with selected RNAs provides a rapid and highly sensitive tool for comparing the efficacy of the guide RNAs. It should be noted that although the assay uses cleavage, using the disclosed 2D IC chip and methods to measure the layer thickness for determining efficacy and other parameters of guide RNAs is a significant improvement in genome manipulating technology for a wide range of cleavage and non-cleavage type applications.

Figure 5:
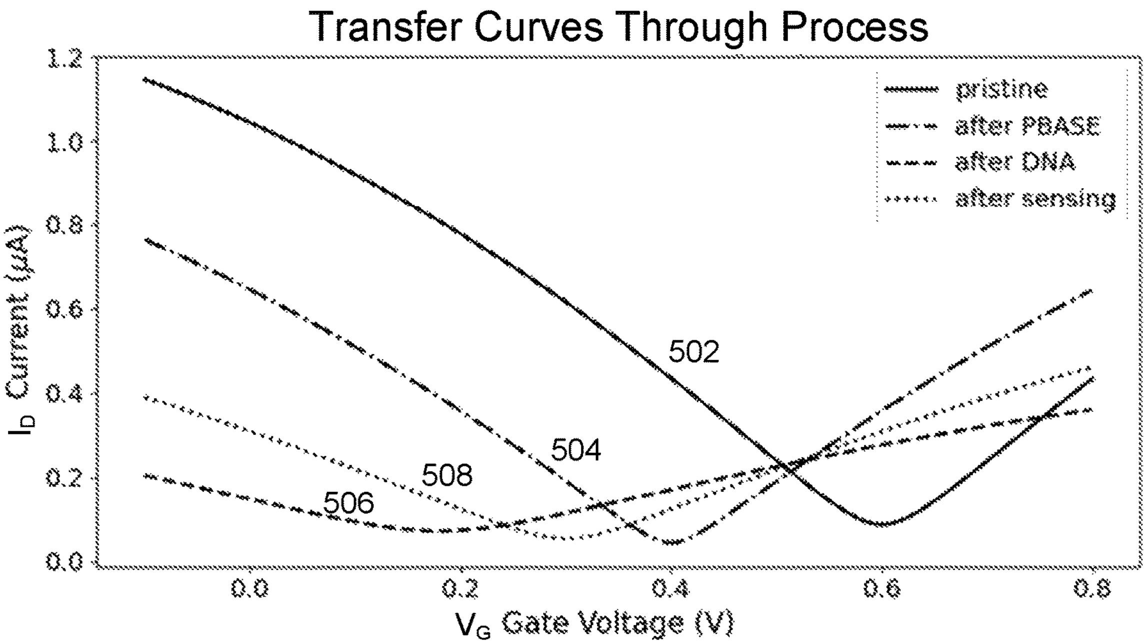
FIG. 5 is a chart of results showing transfer curves (output current to liquid gate voltage) for a 2D FET in a predeposition pristine states and after deposition of selected thin film layers, in accordance with one or more examples of the present disclosure.

FIG. 5 is a chart of results showing transfer curves (output current to liquid gate voltage) for a 2D FET in a predeposition pristine 2D nanomaterials (e.g., graphene) state and after deposition of selected thin film layers, in accordance with one or more examples of the present disclosure.

Looking only at the individual transfer curves depicted on FIG. 5 in isolation without taking into account the apparatuses systems and methods disclosed herein for on-chip thin film layer deposition with electrical characterization and in particular for determining and controlling the thickness of each surface chemistry thin film layer before and after it is deposited a skilled artisan might notice the differences in Dirac voltage of the thin film surface chemistry module that is being built layer by layer without fully appreciating that it is the effective thickness of each layer that enables distinct sensing events to be quantitatively characterized with greater repeatability measurement to measurement and IC to IC and that this greater repeatability enables accurate biological assays to be performed with superior speed and precision.

For example, a skilled person may appreciate that for pristine graphene, although no thin film layers have been deposited on the graphene channel, it nevertheless has capacitance which means that is has a thickness 159 (e.g., an effective layer thickness). The capacitance between the liquid gate and the graphene channel is a combination of the electrolytic capacitance and the quantum capacitance. At the Dirac voltage (the charge neutrality point), the quantum capacitance contribution should be minimized. At that voltage, the effective thickness of the electrolytic double layer between the bulk solution and the graphene can be calculated analytically by one skilled in the art. This calculated value can be used to calibrate the thickness calculation as additional layers are deposited. In this way, difficult to ascertain values such as the exact surface structure of the graphene can be ignored during thickness measurement.

Therefore, the I-Vg transfer curve the pristine graphene layer 502 (where may also be considered to be a layer 0 because serves as a baseline substrate upon which thin film surface chemistry layers are deposited.

The I-Vg transfer curve after PBASE, curve 504, is the measured value for the first deposited layer. PBASE is 1-pyrenebutanoic acid succinimidyl ester, a linker molecule that can be used as a linker layer with graphene. After deposition of PBASE, the most easily noticed change from curve 502 is the shift in the Dirac voltage (the voltage at which the current is minimized, also the charge neutrality point). This large change indicates a significant shift in the surface potential of the transistor. However, a change in surface potential is neither necessary nor sufficient to indicate deposition of a material. There are several other parameters that have changed in this curve that are not easily visible by eye. For example, the resistance of the graphene channel has changed. This is difficult to see by eye, but still visible as a small downward overall shift in the curve. There are several other changes to the curve that can only be quantified using more complex computational methods.

The I-Vg transfer curve after deposition of DNA on the surface of this sensor is shown as curve 506 (which is the second thin film deposited but surprisingly appears to be the third curve below the baseline curve 502 for the pristine graphene rather than the second curve). The after DNA curve 506 shows a significant shift in Dirac voltage, as well as a large change in transconductance (the derivative of the I-Vg curve which is visible as a decrease in slope) and a decrease in the curvature (the second derivative of the I-Vg curve) near the Dirac voltage. In addition, there is a slight, but noticeable, decrease in resistance. Parameters (which in this context refer to the measured values or values derived therefrom for Dirac voltage, transconductance, curvature, resistance, and other 2D FET physical model based parameters) such as these bring additional information about the character and amount of material deposited on the surface. Combinations of factors such as these can be collected into a measurement vector.

A measurement vector such as this can give a more complete indication of chemical changes to the surface. Application of such a measurement vector to a physical model can be used to extract values for the thin film layer being measured of a set of parameters such as capacitance, mobility, resistance, and charge density. These physical model-based parameters can be used to determine application specific values such as thickness and porosity for a thin film layer created on the surface. In this case, showing successful immobilization of the DNA layer. Accordingly, depending on the context, the terms "parameters" "application-specific parameters", and/or "set of application-specific parameters" may be used to refer to both the property being measured, the value of the measurement, the desired value of the thing being measured.

For example, in certain implementations a system is disclosed with an analysis module operable to generate a set of application specific layer parameters for determining thin film layer thickness and/or porosity based on transfer curve information from the measurement controller fitted to a physical model of corresponding 2D FETs. In this context, the set of application specific layer parameters may be useful both for measuring and the thickness of the thin film layers as they are being deposited.

The I-Vg transfer curve after sensing is shown in curve 506. This curve shows removal of DNA material after a sensing event, as described elsewhere in this document. In addition to the change in Dirac voltage, there is an increase in slope, a decrease in resistance, and an increase in curvature. Parameters such as this bring additional information about the character and amount of material deposited on (or in this instance removed from) the surface. Combinations of factors such as this can be collected into a measurement vector. A measurement vector such as this can give a more complete indication of chemical changes to the surface. Application of such a measurement vector to a physical model can be used to extract values such as capacitance, and charge density. These terms can be used to calculate values such as thickness and porosity of the layer created on the surface. In this case, showing the decrease in the layer thickness of the attached DNA layer after sensing.

In many applications, determining and/or controlling thickness of various surface chemistry thin film layers is important for repeatability/consistency of measurements. Similarly, in various applications, insufficient thickness or excessive thickness of surface chemistry thin film layers may increase sensor failure rate thus reducing reliability. Furthermore, for certain assays, determining layer thickness is a quantitative parameter of the assay.

For example, as depicted in FIG. 5, a selected working example in which thin film layer thickness is quantitative parameter of an assay in which a ssDNA sensitization layer is applied to the surface and then a Cas enzyme in a sample liquid may be selected to digest a portion of that ssDNA sensitization layer away when a sensing event such as an interaction between the sensitization layer and an analyte in a sample liquid occurs. In such applications, detecting the timing and magnitude of a change in layer thickness, enables the sensing event to be quantitatively characterized. It may be noted that many of the process steps described in the example may be used and/or combined in multiple ways with other assays on the same chip or on multiple chips to generate different combinations of individual or multiplexed assay results.

Accordingly, the integrated circuit chip with 2D field-effect transistors and on-chip thin film layer deposition with electrical characterization and methods disclosed herein represent a significant advancement in mass scale biosensor production testing technology by enabling layer thickness measurements to be taken and used as reference standards for automated thin film layer deposition, quality control, and other mass scale process steps where the repeatable production and preparation of biosensor chips significantly decrease sensor to sensor variance due to variance in surface chemistry thickness and the associated impact on the biosensing assays.

In certain examples, including the example depicted in FIG. 5, a biosensor with 2D FETs (such as a graphene FET biosensor), which is also known under the Cardea Bio Inc., trademark as "Biosignal Processing Unit"™ is prepared and characterized in a baseline state or pristine state in the assay buffer, e.g., prior to deposition of various thin film layers on the surface of the 2D nanomaterial the forms the channels of the 2D FETs (e.g., a surface of a pristine graphene channel). In some examples the 2D FETs have graphene channels, but other two dimensional nanomaterials such as molybdenum disulfide ($MoS_2$). Then as successive thin film layers are deposited on the channel surfaces of 2D FETs, the thickness, porosity, and or other parameters of the deposited thin film layers may be determined and/or controlled.

the charge neutrality point, curvature of the p-type and/or n-type branches of the transfer curve apart from the region of the charge neutrality point.

Accordingly, by plotting the output current versus measured liquid gate voltage, transfer curves are produced from which measurement vector of responses that may include orthogonal or analytically useful values such as the gate voltage Vg at the charge neutrality point ($V_{NP}$) also referred to as the Dirac Point voltage $V_{Dirac}$, the resistance at the charge neutrality point $R_{CNP}$ or $R_{Dirac}$, the maximum transconductance magnitudes for both n and p type branches of the transfer curve, and the curvature of the transfer curve near the charge neutrality as well as far from the charge neutrality point. A set of measurement vector values such as these can be used to generally describes the complete shape of the transfer curve.

Using a physical model of the device, relevant parameters such as the mobility, gate capacitance, and charge density of the graphene biosensor may be extracted from the transfer curve values. A physical model is an expression for the current related to the applied voltages and physical parameters. An example is $$I = \frac{1}{R_{CNP}} V_{DS} \sqrt{\left(1 + skew\left(\frac{|V_G - V_{CNP}|}{2(V_G - V_{CNP})} - \frac{1}{2}\right)\left(C_{CNP} + C_{VG}(V_G - V_{CNP})^2\right)(V_G - V_{CNP})^2 + 1\right.}.$$

In certain implementations, characterization of the 2D FETs with pristine 2D channels and with one or more thin film layers deposited on the 2D channels is performed using an AC coupled method. An AC coupled method may be performed by application of a bias to the gate or across the source and drain of the channel that can be described as a waveform. Some examples may be a square wave, a sine wave, and a more complicated waveform such as a sum of sine waves of various amplitudes, frequencies and phases. In this context, a DC offset may also be applied, but the amplitude of the AC coupled method would be insufficient to map out the entire transfer curve, instead focusing just on either the p-type branch, the n-type branch, or the region around the charge neutrality point.

An advantage of using an AC coupled method is that evaluation of the data in frequency space via Fast Fourier Transform and similar techniques to determine the slope and curvature of the transfer curve in that region is significantly simpler than calculations of derivatives otherwise used to measure the slope and curvature of the transfer curve.

In some implementations, on-chip electrical characterization of thin film layer depositions is performed by evaluating the entire transfer curve. In certain implementations, on-chip electrical characterization of thin film layer depositions is performed using data from transfer curve measurements that have been fit to 2D FET physical model-based parameters for determining thin film layer thickness and/or porosity.

In various examples, integrated circuit connections in a metallization layer of the integrate circuit chips disclosed herein enable on-chip measurements comprising measurement vectors for the one or more selected instances of the 2D FETs of the FET array to be made in connection with the liquid mediated deposition of one or more thin film layers. In some examples, the measurement vectors include one or more transfer curve parameters selected from maximum transconductance magnitudes for p-type and/or n-type branches of a transfer curve, a charge neutrality point voltage of the transfer curve, resistance at the charge neutrality point, curvature of the transfer curve in the region of In this model, $$\frac{1}{R_{CNP}} = \frac{2q\mu W n_0}{L} \text{ and } n^* \propto \frac{C_{CNP}}{C_{VG}}.$$

This model gives the current (I) for the transistor width (W), length (L), capacitance ($C_{CNP}$), mobility (μ), total carrier density ($n_0$), effective charge density (n*), applied drain-source voltage ($V_{DS}$), applied gate voltage ($V_G$), charge neutrality voltage ($V_{CNP}$), the charge constant (q), skew between N and P branches, and the correction to the capacitance and mobility due to the gate voltage away from the charge neutrality point ($C_{VG}$).

Terms such as the mobility, capacitance, and effective charge density can vary significantly throughout the transfer curve in more complex variations of this model. For a model such as this, terms such as the capacitance, mobility, and effective charge density can be calculated for each transfer curve measured by performing a fit of the current-gate voltage transfer curve. Moreover, transfer curves may be measured continuously throughout the process. Among the advantages of the disclosed integrated circuit and thin film monitoring methods is that because the disclosed integrated circuits are suitable for chip scale packaging, on-chip thin film layer deposition and electrical characterization can be performed using various test equipment including semiconductor probe stations at the various die contacts or using chip readers.

In various examples, the channel surface of the selected 2D FETs 110 may be functionalized by depositing a thin film comprising an immobilization layer, such as for example, a pyrene-NHS, or a PBASE chemical. Due to its hexagonal structure, pyrene in these types of molecules will bind via 7C— 7C stacking on the surface of the graphene and an NHS functional group will react with a free amine. This allows linking of other thin film layers that have molecules with a free amine to the surface of the graphene. In other examples, various types of covalently and/or non-covalently binding may be performed by selecting suitable immobilization layers for immobilizing an analyte capture layer also sometimes referred to as a sensitization layer to the top surface of the 2D nanomaterial used to form the channels of the 2D FETs 110 in an array.

These various type of binding interactions, may cause different transfer curve measurement vectors to undergo measurable combinations of parameter changes. For example, a binding interaction between the thin film immobilization layer and the 2D nanomaterial of the FET channel may cause a slight and measurable decrease in the capacitance, a slight and measurable increase in resistance, and a large measurable change in the charge neutrality point voltage.

To act as a biosensor for detection of predetermined analytes in a sample liquid, on-chip deposition and electrical characterization of a thin film layer that serves as a capture layer e.g., an analyte sensitization layer may be included on or within the immobilization layer. For example, a capture/sensitization layer that includes strands of nucleic acid with an amine, such as a ssDNA-amine or RNA-amine can be deposited and electrically characterized on-chip. For example, the length of a selected type of ssDNA strand may be about 15 nanometers. Measurement vectors that include transfer curve parameters may be performed using the chip on which the ssDNA is deposited capacitance can be extracted from the measurement vectors to monitor the overall thickness of the ssDNA layer on the surface. The capacitance decreases again due to the added ssDNA between the graphene channel and the gate liquid. The charge neutrality point voltage may have a large change again as well.

In certain examples, a Cas14 enzyme may be used to test for presence of a particular DNA sequence. Cas14 is a nuclease that digests single stranded DNA when it is triggered by finding its programmed binding target. A triggered Cas14 will then begin to remove the ssDNA from the surface of the graphene sensor.

In one or more examples, after determining baseline transfer curves for selected 2D FETs 110 of the integrated circuit 100 (e.g., chip), a test sample that includes the ssDNA is applied to the selected 2D FETs and allowed to equilibrate. Then a known amount of Cas14 is added to the test sample. The rate of removal of the ssDNA on the surface of the chip can then be correlated to the concentration of the target DNA in the sample.

As may be noted in the transfer curve labelled "after sensing," removing the ssDNA from the surface may not result in a large shift in the charge neutrality point voltage. As may be further noted, a change in the capacitance between the graphene channel and the sample may be observed as indicated by flatter more spread out transfer curves.

Thus, as each thin film layer is deposited and transfer curves are plotted, various changes in Dirac Voltage, capacitance, and resistance of the sensor with the deposition or removal of each thin film layer may be observed throughout the entire experiment process.

In certain implementations, capacitance is modeled as a parallel plate capacitor having a fixed area and a distance between plates varying from about 0.2 nm to 1000 nm. This approach to understanding the capacitance treats layers on the surface of the transistor as the material in between conductive plates in a parallel plate capacitor. The area of such a capacitor is equal to the area of the 2D nanomaterial channel, with the bulk solution playing the role of the opposite parallel plate. The range of layer thicknesses that can be addressed with this method are limited by the smallest electrolytic double layer that can reasonably be created and on the larger end by the smallest lateral dimension of the transistor channel.

Although to some extent, this basic understanding is a substantial simplification because it does not consider many factors such as layer uniformity, realistic electrolytic capacitance, the quantum capacitance of 2D nanomaterial such as graphene, and so on, the parallel plate capacitor model is suitable to establish certain patterns of signals that can be detected. At a high level, it may be noted that capacitance increases as more material is added, and the capacitance increase tends to scale monotonically with the amount of material added.

Accordingly, in various applications, it is practical to use the transfer curve as a whole, the vector of calculated values from the transfer curve, or the extracted capacitance value alone to characterize the thickness of the ssDNA during digestion by Cas14.

Figure 6A:
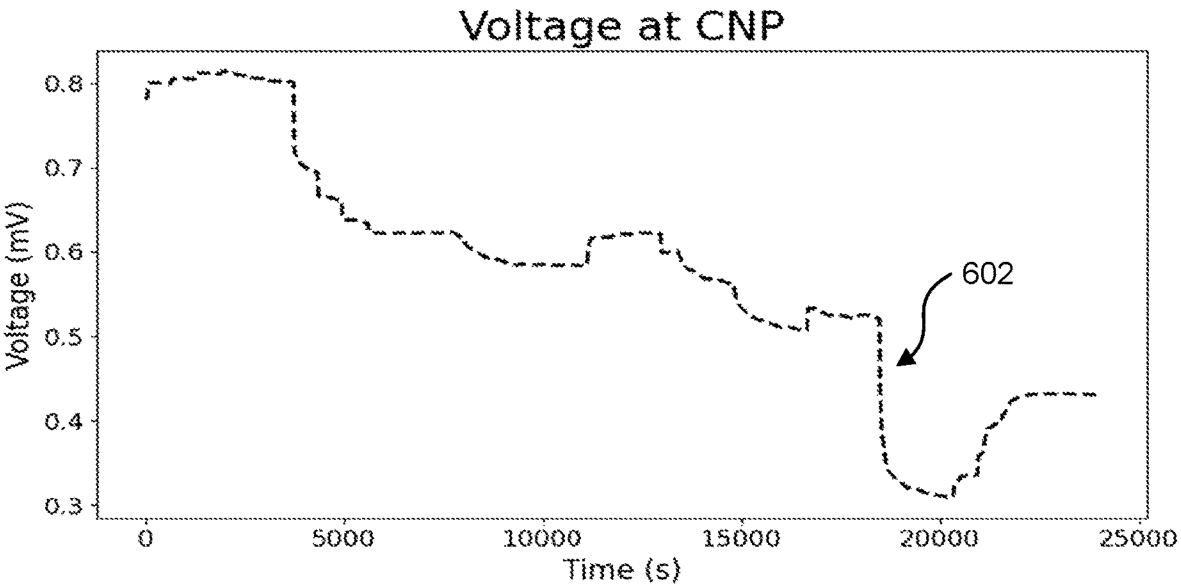
FIG. 6A is s chart of results showing change in the CNP voltage as different layers are added to and removed from the surface by application and removal of various solutions, in accordance with one or more examples of the present disclosure.

FIG. 6A is an example of a typical measurement using the "Dirac voltage" or gate voltage at which the current is minimized. The Dirac voltage is also the voltage at the "charge neutrality point" or CNP. FIG. 6A shows the change in the CNP voltage as different layers are added to and removed from the 2D channel surface by application and removal of various solutions. In the depicted example, the large vertical voltage transition at 602 comes from a large change in pH.

Figure 6B:
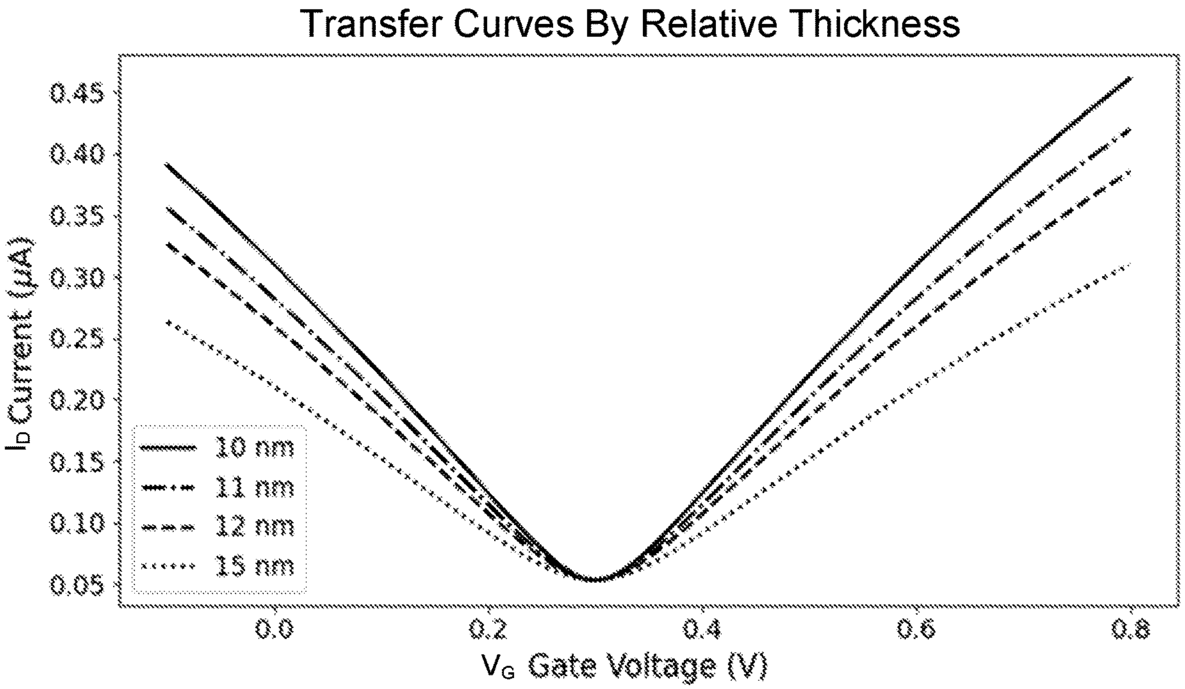
FIG. 6B is a chart of results showing transfer curves (output current to liquid gate voltage) for a 2D FET after deposition of selected thin film layers with selected thicknesses, in accordance with one or more examples of the present disclosure.

FIG. 6B is a chart of plotted results showing transfer curves (output current to liquid gate voltage) for a 2D FET after deposition of selected thin film layers with selected thicknesses, in accordance with one or more examples of the present disclosure.

The measurement vectors for the 2D FETs enable the chip to produce signals that consider all of the changes to the transfer curves that can occur when material is added to or removed from the surface. Because it can be observed that capacitance decreases as a thickness of an adsorbed layer on the surface of the channel (e.g., graphene) is increased, it might be tempting to presume that the only effect or dominant effect is for the capacitance to decrease.

For example, a set of modeled transfer curves showing this most simple effect of thickness change is shown in FIG. 6B. More specifically, the plots of FIG. 6B show a modeled graphene sensor with deposition of thin film layer of a charge neutral, nonreactive polymer such as PEG where the thicknesses range from 10 nm to 15 nm. As may be noted, one readily observable difference between the transfer curves is that thicker layers have wider, more open transfer curves (reduce maximum transconductance slope) than thinner layers, which is indicative of the reduced relative capacitance and accordingly also indicative of the greater relative thickness. However, it may be noted in examples describe below, with other types of thin film layers, different changes in transfer curve parameters may be determined.

Figure 6C:
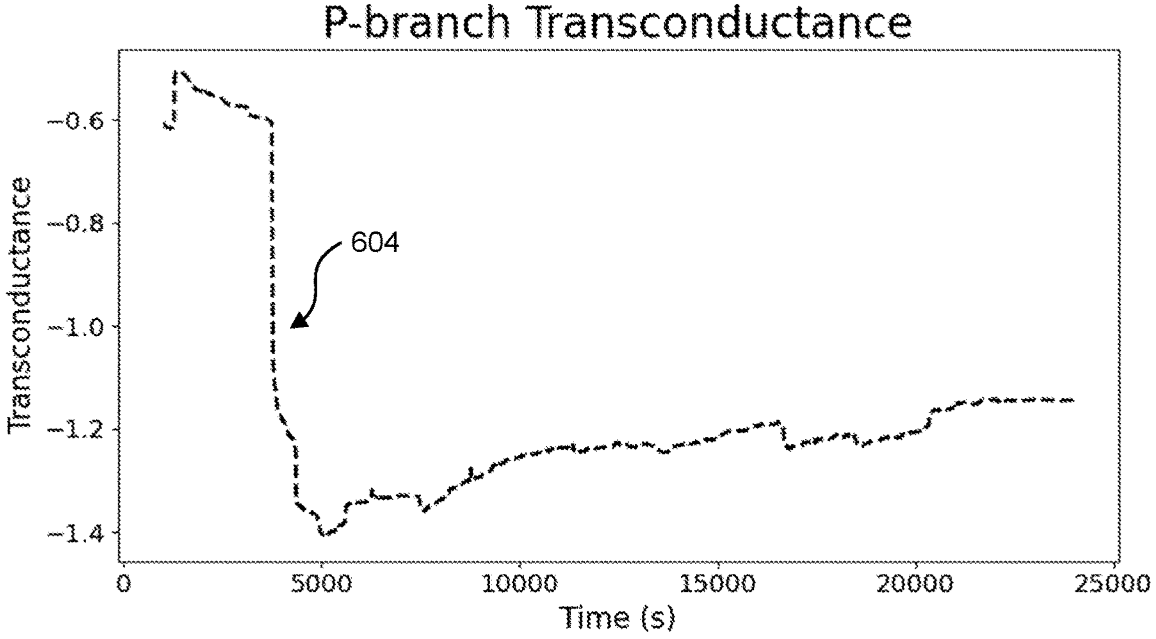
FIG. 6C is an illustration of measuring the transconductance of 2D FET transfer curves, in accordance with one or more examples of the present disclosure.

FIG. 6C is an illustration of measuring the transconductance (e.g., the slope) of $I_D$-$V_G$ transfer curves such as depicted in FIG. 6B as an assay measurement parameter. In FIG. 6C, the maximum p-type gate transconductance of the resistance scaled transfer curve is plotted as various liquids are applied using the same data shown in FIG. 6A using the techniques described in this disclosure. A large transition 604 in maximum p-type gate transconductance is due to a large change in salinity as one of the liquids is applied.

Figure 6D:
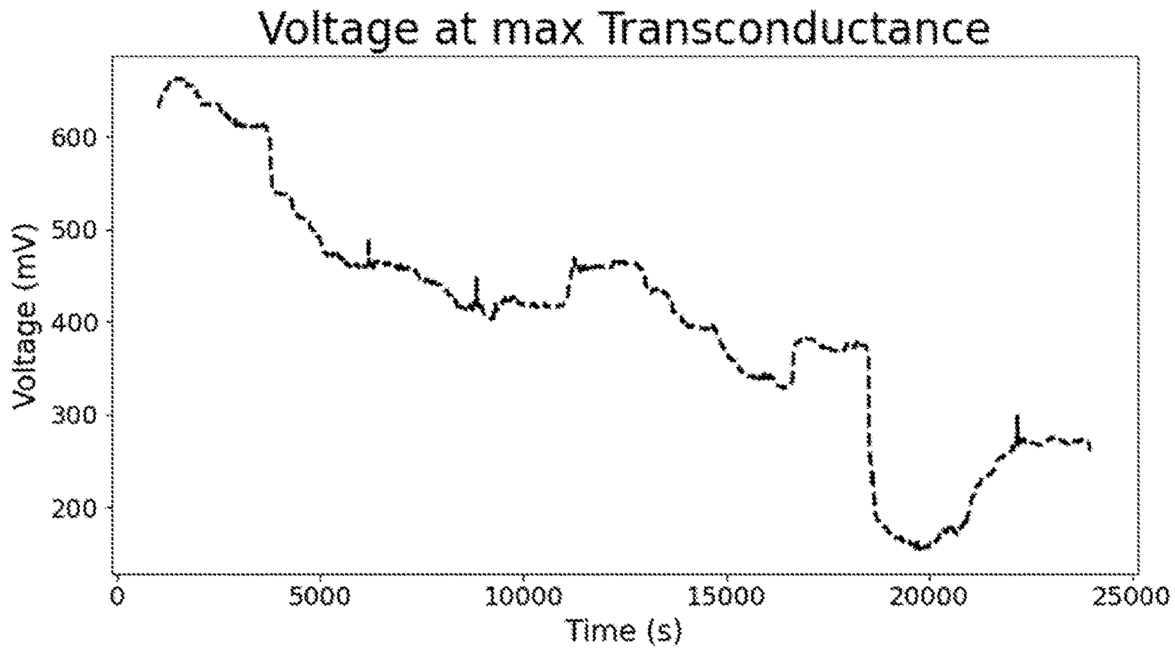
FIG. 6D is an illustration of measuring the gate voltage at which the p-type gate transconductance is maximized (the gmp_max voltage), in accordance with one or more examples of the present disclosure.

FIG. 6D is an illustration of measuring the gate voltage at which the p-type gate transconductance is maximized (the gmp_max voltage). The curve depicted FIG. 6D is extracted from the same data shown in FIG. 6A using the techniques described in this disclosure.

Figure 6E:
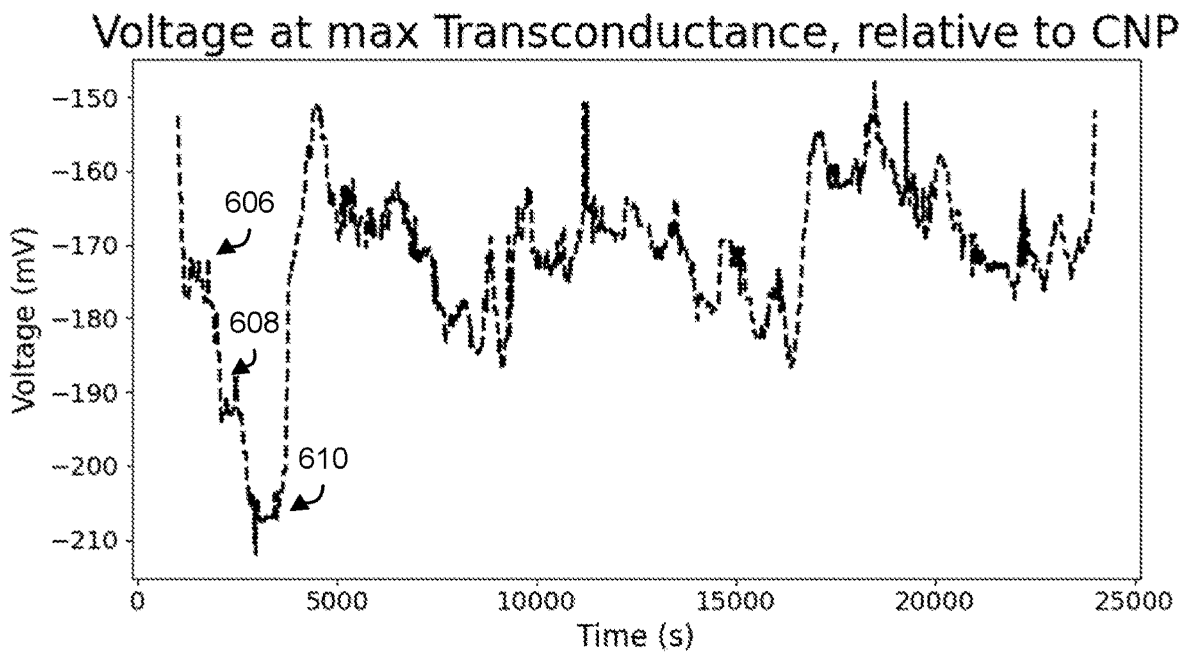
FIG. 6E is an illustration of measuring the difference between the CNP Voltage and the gmp_max voltage. in accordance with one or more examples of the present disclosure.

FIG. 6E is an illustration of measuring the difference between the CNP Voltage and the gmp_max voltage. This value can be useful in showing small changes in the solution composition. Where the CNP voltage and the gmp_max voltage show large sensitivity to pH, and the transconductance shows large sensitivity to salinity, this difference in voltages shows a small change for each liquid handling step. This curve is calculated from the same data shown in FIG. 6A using the techniques described in this disclosure. The three steps 606, 608, 610 at approximately 2, 3 and 4 seconds indicate that the same solution was applied to and removed from the chip three times.

Figure 7A:
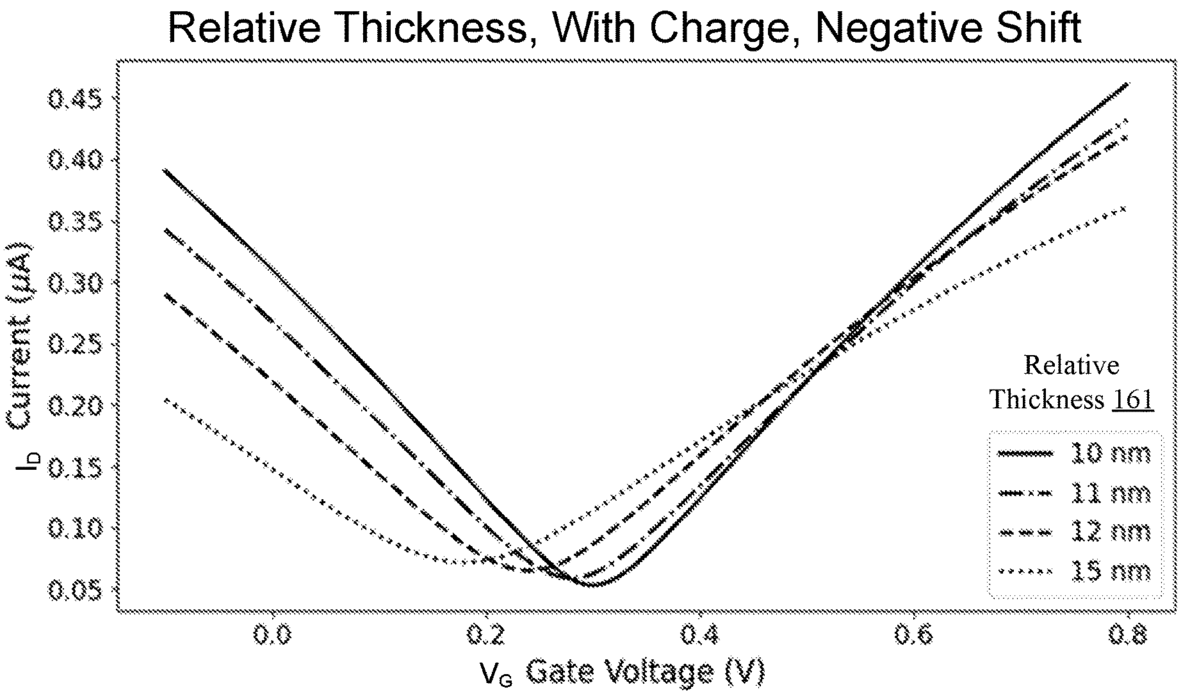
FIG. 7A is a chart of results showing transfer curves (output current to liquid gate voltage) for a 2D FET after deposition of selected thin film layers with selected thicknesses, in accordance with one or more examples of the present disclosure.

FIG. 7A is also a chart of results showing transfer curves (output current to liquid gate voltage) for a 2D FET after deposition of selected thin film layers with selected thicknesses, in accordance with one or more examples of the present disclosure. However, in FIG. 7A, in addition to changing the gate capacitance of the device, a charged and reactive polymer such as DNA exhibits a shift the Dirac Voltage and resistance of the transistor, which leads to a complex transfer curve response.

The plot of FIG. 7A shows a modeled graphene sensor with depositions of thin film layers of a negatively charged, reactive polymer such as ssDNA where the layer thicknesses range from 10 nm to 15 nm. As can be seen in FIG. 7A, deposition of a thin film layer of DNA causes a negative shift in the Dirac Voltage, and a pattern of response such as illustrated in FIG. 7A. Notably the transfer curve responses are visibly different in the n-type portion of the transfer curves as compared to the p-type portion of the transfer curves.

In some cases, shifts in the Dirac voltage of transfer curves for different layers cannot be predicted based merely on electrical attributes of the layer components alone. However, when on-chip deposition and electrical characterizations have been performed for the selected thin film layers, various elements of the measurement vectors for the transfer curves (including Dirac voltage can be determined. For example, even though DNA molecules are generally describe as negatively charged due to presence of phosphate groups, in a sample liquid, presence of salts that counter DNA's generally negative render the DNA in that salt solution locally neutral. In other words, because naked charges do not exist in salt solutions, charges that would otherwise be detectable are screened. Accordingly, a shift in Dirac voltage in the presence of salts may be less than expected, nonexistent, or even opposite of what would have been expected in the absences of such salts. Thus, selected buffers and surface chemistries used also contribute to the behavior of the 2D FET transfer curves.

Figure 7B:
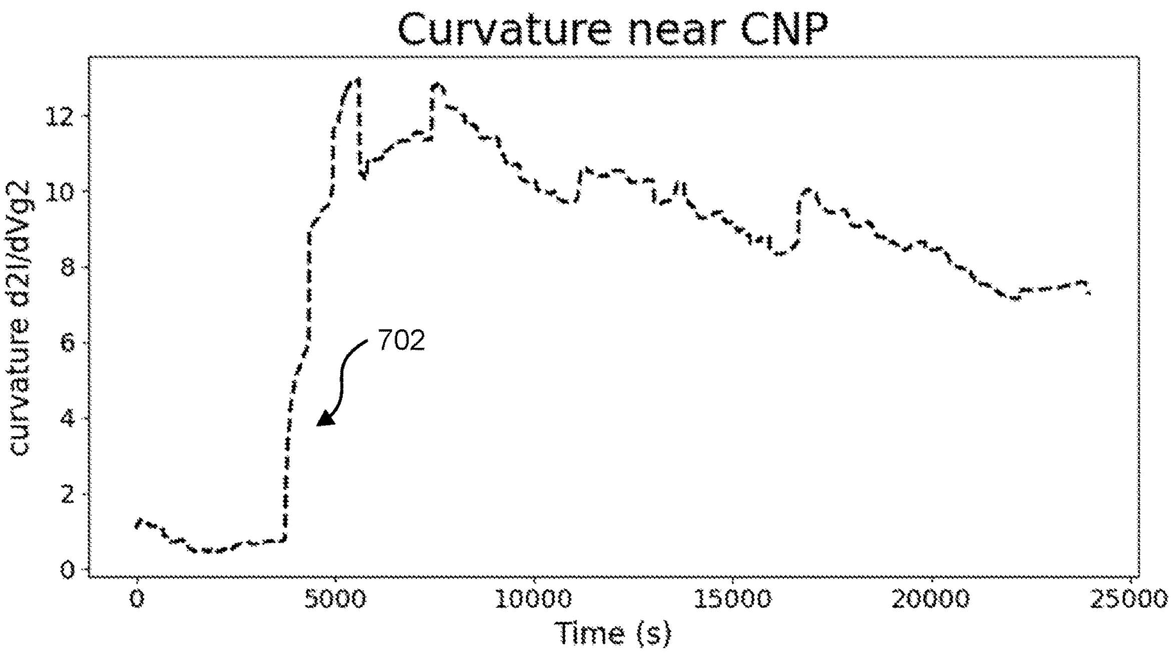
FIG. 7B is an example of measuring the curvature of the transfer curve near the charge neutrality point, in accordance with one or more examples of the present disclosure.

FIG. 7B is an example of measuring the curvature of the transfer curve near the charge neutrality point. This measurement is sensitive mainly to the absolute value of the charge concentration near the surface of the transistor. This curve is calculated from the same data shown in FIG. 6A using the techniques described in this disclosure. A large transition at 702 is due to a large change in salinity.

Figure 7C:
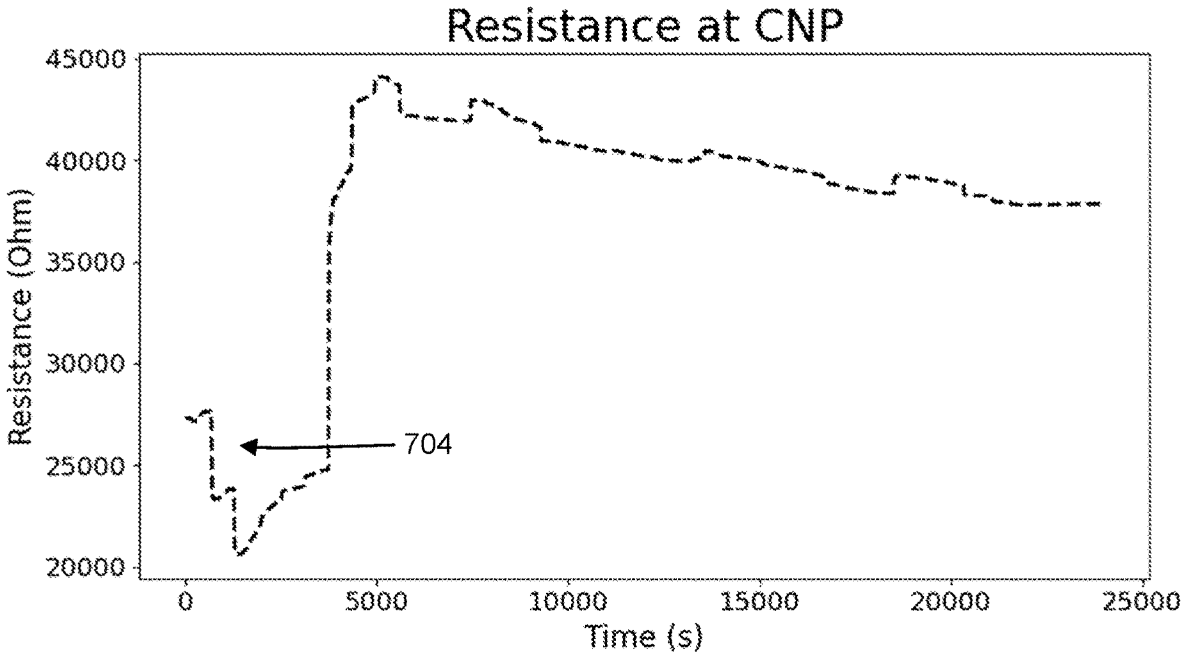
FIG. 7C is an example of measuring the resistance at the charge neutrality point as various liquids are applied to the surface, in accordance with one or more examples of the present disclosure.

FIG. 7C is an example of measuring the resistance at the charge neutrality point as various liquids are applied to the surface. The resistance changes due to additional charges near the surface of the transistor but shouldn't change due to simply increasing the thickness of an applied layer. This chart is calculated from the same data shown in FIG. 6A using the techniques described in this disclosure. Unlike the plot of curvature shown in FIG. 7B, the resistance plot in FIG. 7C shows a change due to repeated application of the same liquid.

Figure 7D:
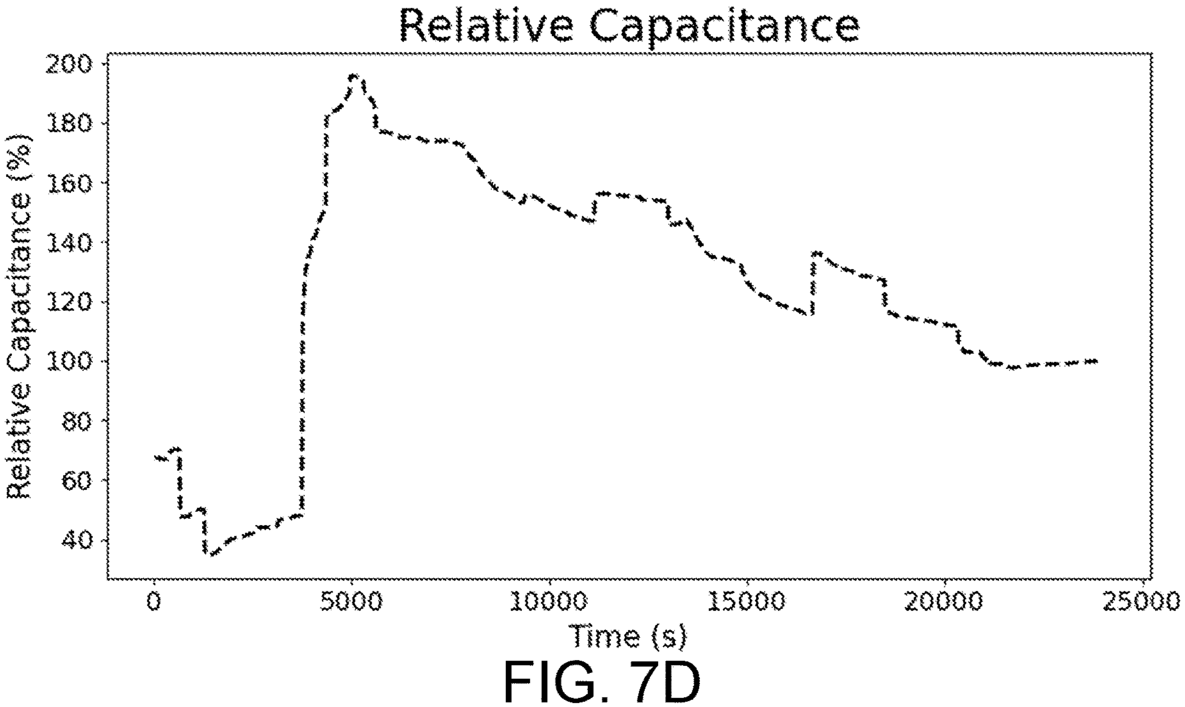
FIG. 7D is an example of using the physical model described in the disclosure to extract the capacitance at the charge neutrality point and use that as a sensing parameter, in accordance with one or more examples of the present disclosure.

FIG. 7D is an example of using the physical model described in the disclosure to extract the capacitance at the charge neutrality point and use that as a sensing parameter. The relative capacitance provides information about the thickness of the applied material. This data is calculated from the same set shown in FIG. 6A.

Figure 7E:
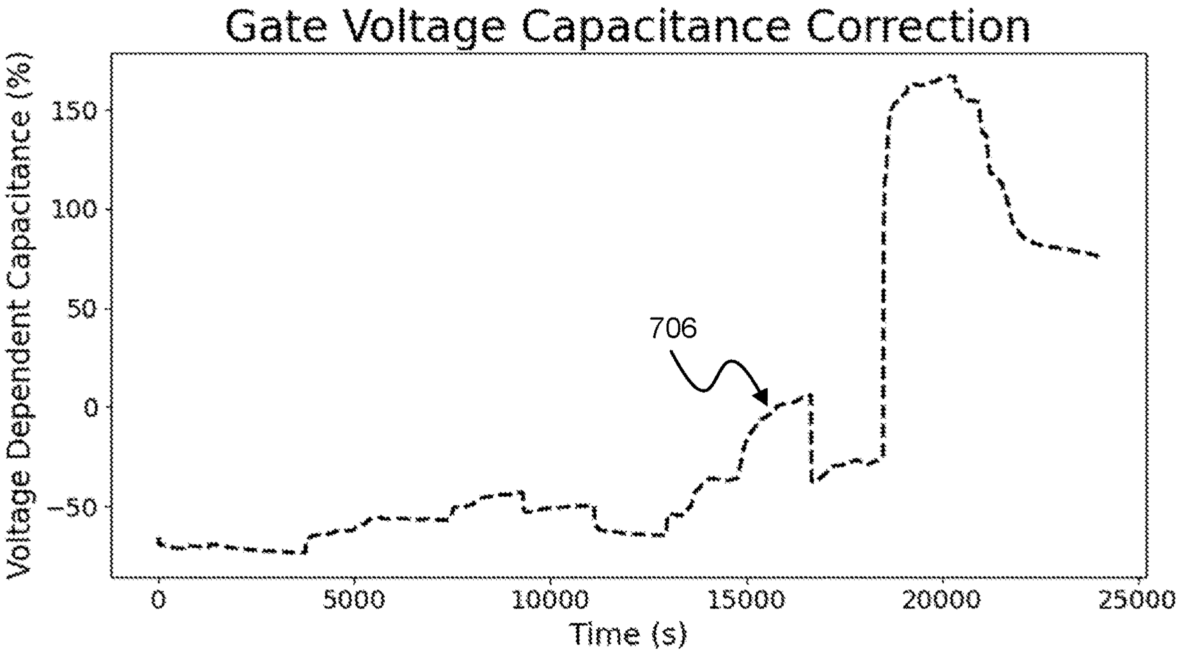
FIG. 7E is an example of using the physical model described in the disclosure to extract the correction to the capacitance due to application of the gate voltage away from the charge neutrality point, and use that as a sensing parameter, in accordance with one or more examples of the present disclosure.

FIG. 7E is an example of using the physical model described in the disclosure to extract the correction to the capacitance due to application of the gate voltage away from the charge neutrality point, and use that as a sensing parameter. The relative capacitance provides information about the thickness of the applied material. This data is calculated from the same set shown in FIG. 6A. The correction 704 to the capacitance shows large signals when pH and salinity remain the same, but the specific organic and ionic components that make up the surface layer change.

Figure 7F:
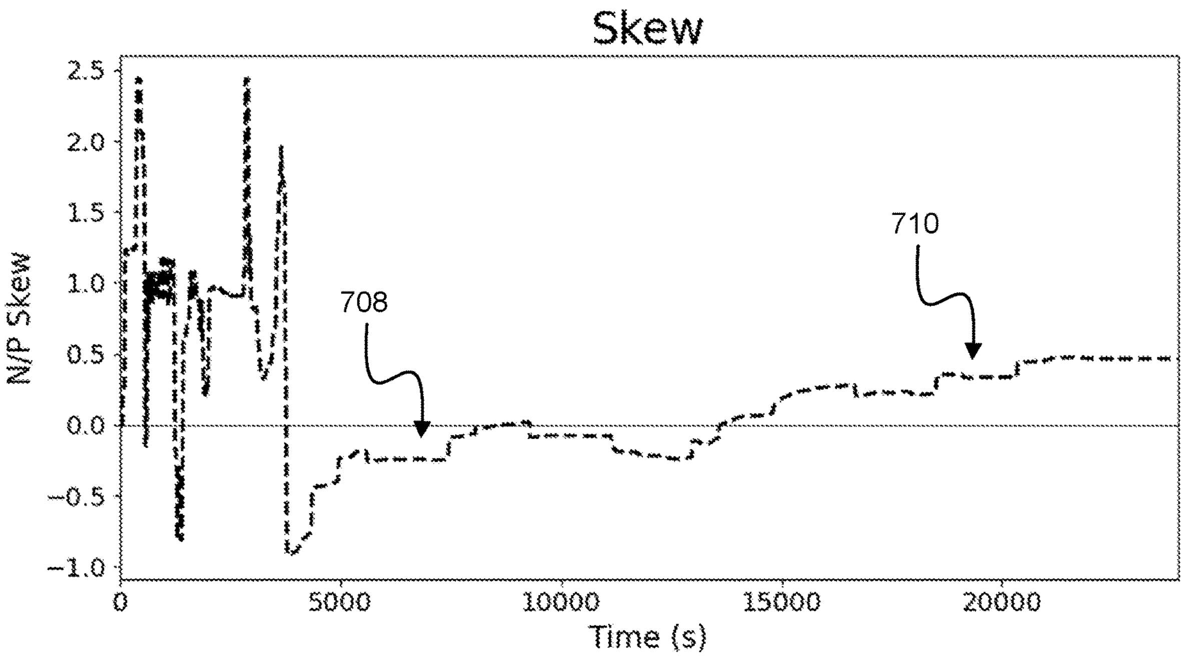
FIG. 7F is an example of using the physical model described in the disclosure to extract the skew between the N and P branches of the "V-shaped" transfer curve and use that as a sensing parameter, in accordance with one or more examples of the present disclosure.

FIG. 7F is an example of using the physical model described in the disclosure to extract the skew between the N and P branches of the "V-shaped" transfer curve and use that as a sensing parameter. The "skew" is the relative slope between the two sides. This provides information regarding the more mobile charge at the surface of the transistor. This can provide useful information on the charge state of attached biomolecules, such as whether positive or negative salts are more tightly or loosely bound to the biomolecule. This data is calculated from the same set shown in FIG. 6A. The region 708 has a negative value indicating that the N-type slope is steeper than P-type slope, which indicates that positive charges are more mobile at the surface. The region 710 has a positive value P-type slope is steeper than N-type slope, indicating that negative charges are more mobile at the surface.

Figure 7G:
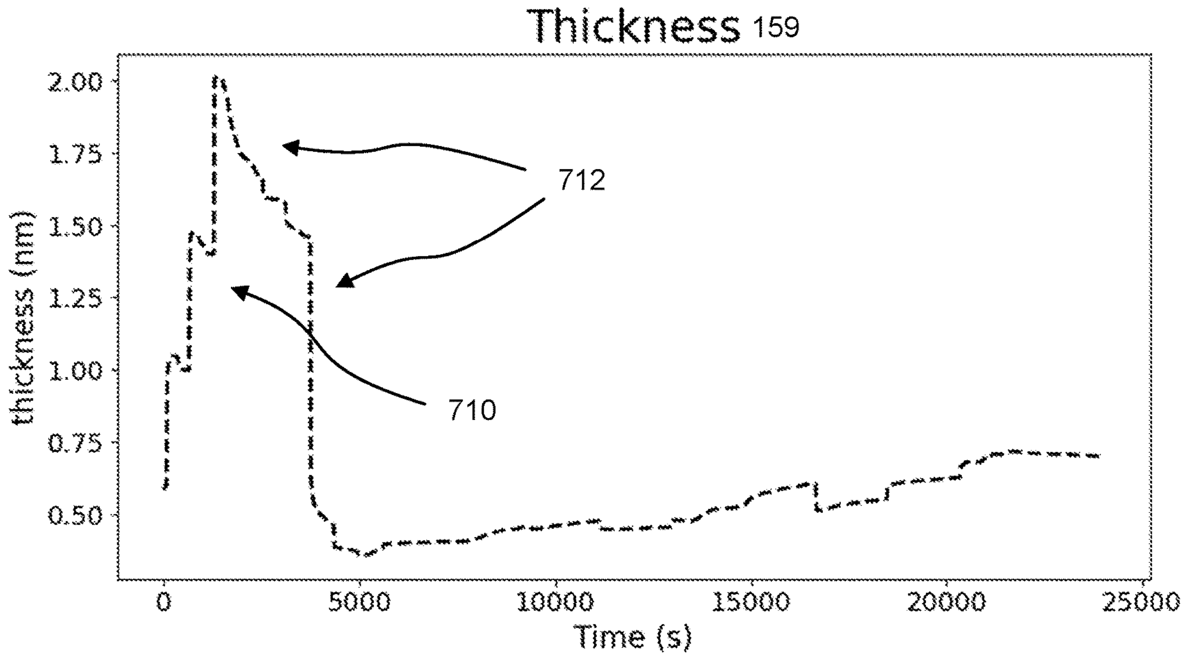
FIG. 7G is example of using the values extracted from the data via the physical model to calculate the thickness of layers applied to and removed from the surface, in accordance with one or more examples of the present disclosure.

FIG. 7G is example of using the values extracted from the data via the physical model to calculate the thickness 159 of layers applied to and removed from the surface. This data is calculated from the same set shown in FIG. 6A. In the example, steps in thickness measurements indicate repeated applications of the same liquid additively build a 2 nm layer of material on the surface.

Figure 7H:
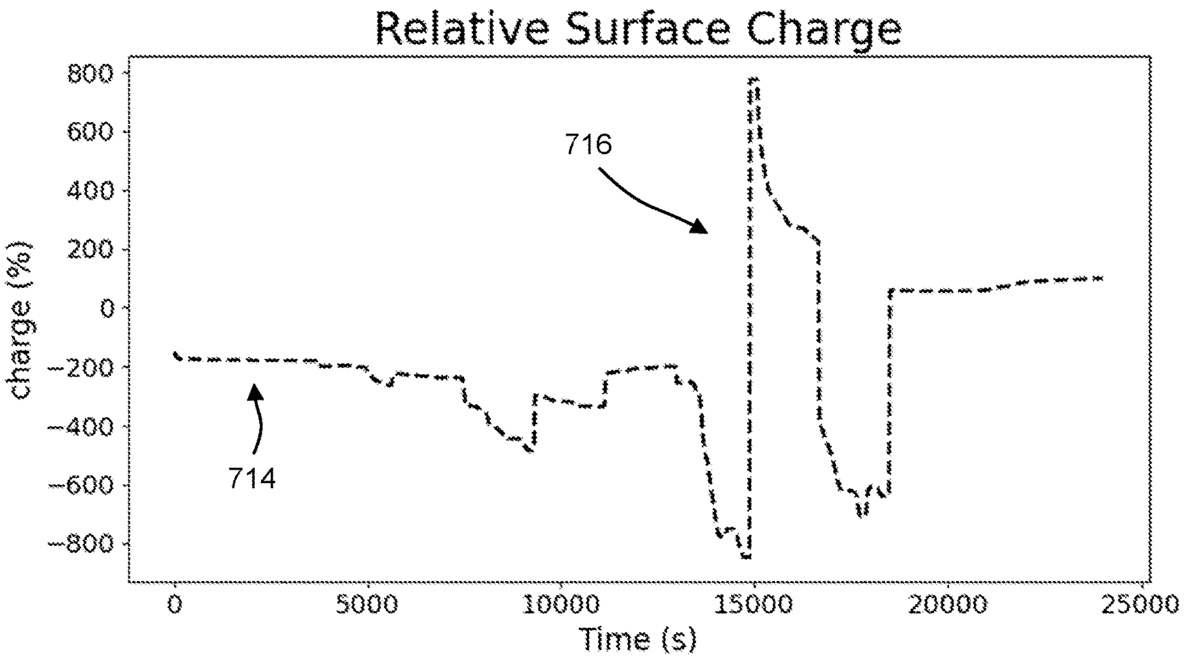
FIG. 7H is an example of using the values extracted from the data via the physical model to calculate the relative surface charge of material deposited on the surface, in accordance with one or more examples of the present disclosure.

FIG. 7H is an example of using the values extracted from the data via the physical model to calculate the relative surface charge of material deposited on the surface. This data is calculated from the same set shown in FIG. 6A. As indicated at 714, multiple layers adding to the thickness do not change the surface charge. Variations in components of the solution change the sign of the surface charge, even though the pH is largely the same.

Figure 7I:
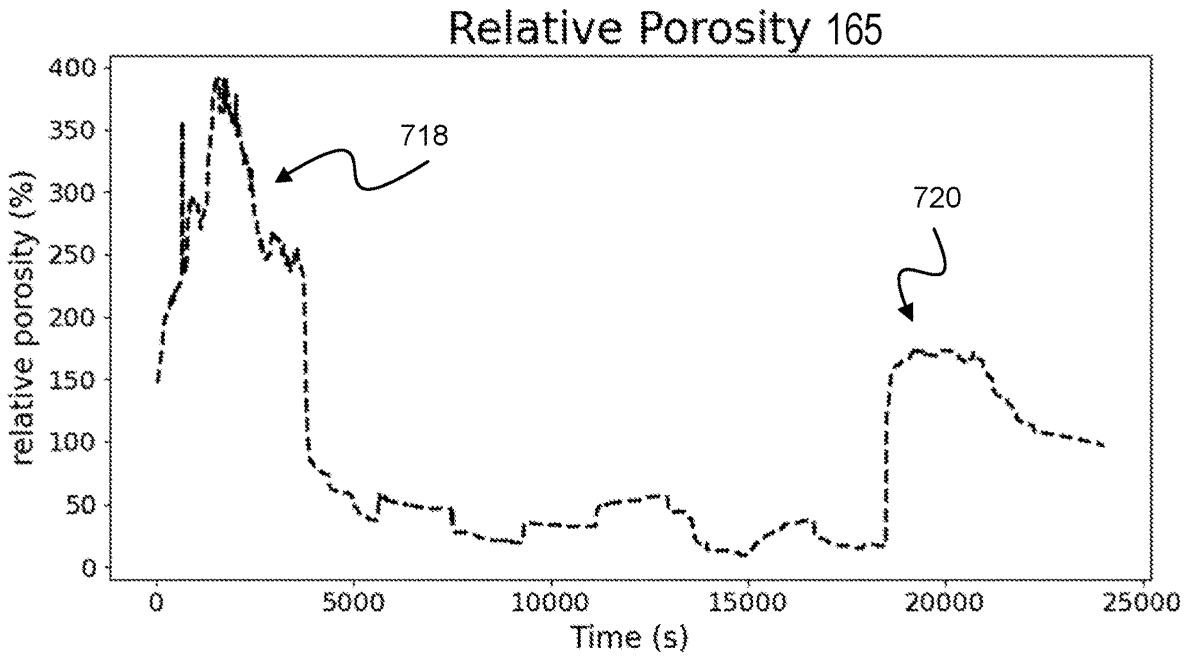
FIG. 7I is an example of using the values extracted from the data via the physical model to calculate the relative porosity of material deposited on the surface, in accordance with one or more examples of the present disclosure.

FIG. 7I is an example of using the values extracted from the data via the physical model to calculate the relative porosity 165 of material deposited on the surface. This data is calculated from the same set shown in FIG. 6A. The plot at 718 shows the relative porosity of a thick a porous layer of material. The plot at 720 shows a thin as porous layer of material.

Figure 8:
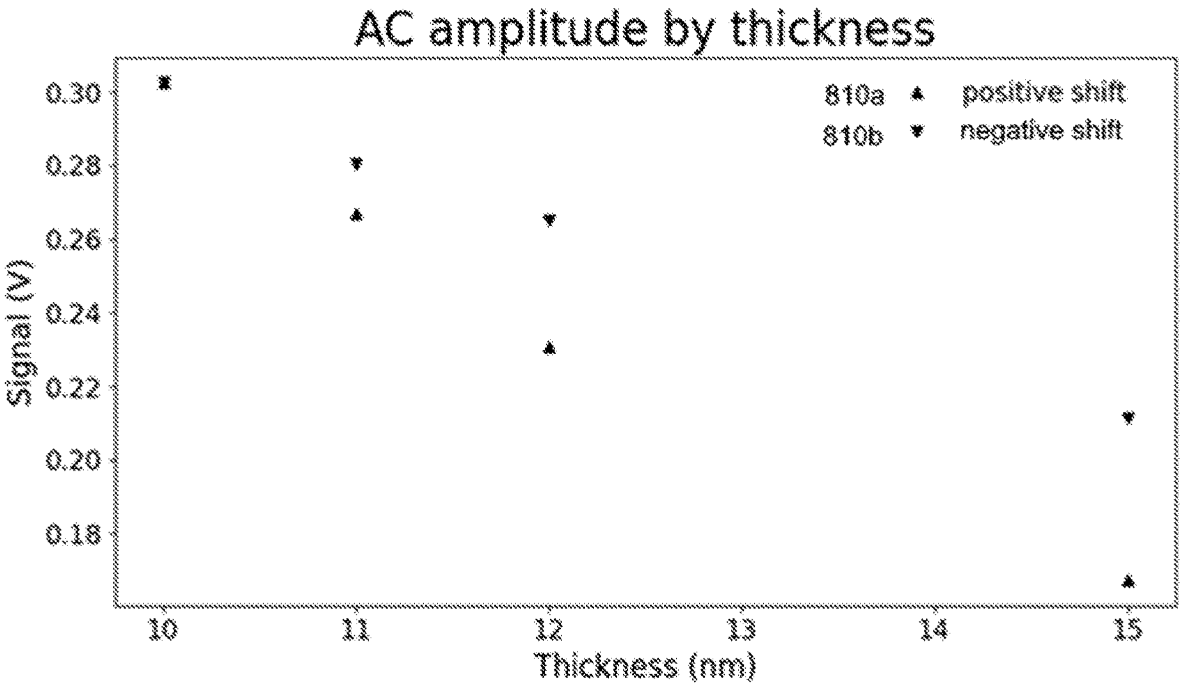
FIG. 8 is a chart of results showing output AC signal voltages amplitudes measured on-chip using an AC coupled method for a 2D FET after deposition of selected thin film layers with selected thicknesses, in accordance with one or more examples of the present disclosure.
Figure 9:
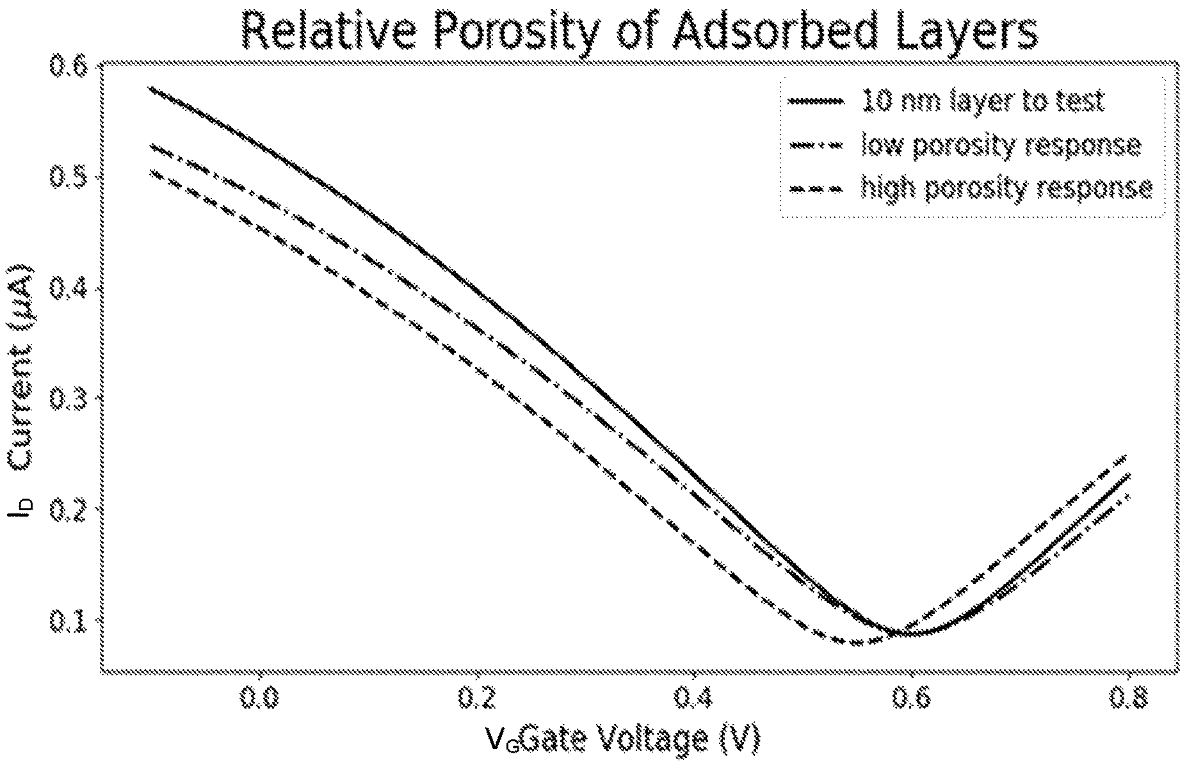
FIG. 9 is a chart of results showing transfer curves (output current to liquid gate voltage) for a 2D FET after deposition of selected thin film layers with selected thicknesses, in accordance with one or more examples of the present disclosure.

FIG. 8 is a chart of results showing output AC signal voltages amplitudes measured on-chip using an AC coupled method for a 2D FET after deposition of selected thin film layers with selected thicknesses, in accordance with one or more examples of the present disclosure.

In various examples, an AC coupled signal may be used to evaluate the thickness of a DNA layer on the surface of the graphene. However, very different responses are calculated based on whether a positive or negative Dirac Voltage shift was caused by the addition of material to the surface, as shown in FIG. 8.

The plot in FIG. 8 shows modeled results of two 2D FET sensors (e.g., 810*a*, 810*b*) on to which thin film layers with thicknesses ranging from 10 nm to 15 nm. The output signals of one sensor 810*a* are plotted for range of thin film layers with the indicated thickness of a material that causes a positive Dirac Voltage shift and the output signals for the other sensor 810*b* are plotted for a range of thin film layers of a different material that causes a negative Dirac Voltage shift. The signal recorded for each of the measurements is the coupling to the channel of a small magnitude (e.g., 100 mV) AC voltage applied to the gate via an electrode such as counter electrode 116. It may be noted a plot connecting the signal voltage response of sensors 810*a*, 810*b* across the range of thickness may not necessarily be linear, and should be generally proportional to 1/thickness because the current is generally proportional to the capacitance and the capacitance is generally proportional to 1/thickness. In addition to a change in thickness, a change in the thin film on the surface of the channel may result in either a positive or negative shift in the charge neutrality voltage $V_{CNP}$.

For an AC voltage that is applied at a gate voltage less than the gate voltage at which the transconductance is maximized, a further positive shift in $V_{CNP}$ will result in a decrease in the transconductance. This will make the resulting AC current in the channel decrease quickly with added thickness, adding to the signal. In the opposite case, a decrease in $V_{CNP}$, causes an increase in the AC current as the transconductance increases. This increase in AC current will oppose the decrease in AC current caused by increased thickness, leading to a lower overall signal. With this in mind, it is important to consider the entire transfer curve, even when performing an AC coupled measurement as the shift in the $V_{CNP}$ and locations of maximum transconductance will impact and complicate the thickness measurement.

The thickness of a layer can be calculated from transfer curve data in a few ways depending on the complexity of the system. In the simplest case, that which is described in paragraph 13 and 14, the current can be measured at around 0 gate voltage and compared at different thicknesses. This measurement is relative, meaning that an initial "calibration measurement" is made before the change to the surface you'd like to measure. In the absence of any electrical charge effects, the ratio of the currents recorded at the same gate voltage will be equal to the inverse of the thicknesses of layers on the surface. The double layer thickness should be included in the thickness calculations.

$$\text{thickness}_2 = \text{thickness}_1 \frac{I_1}{I_2}$$

In practice, it's very difficult to find a chemical system for which there are no electrical charge effects. To calculate the thickness of a realistic system, additional effects must be considered. First, the shift in the charge neutrality point (also known as the Dirac Point) must be considered. Determining the charge neutrality point may be done by measuring the gate voltage at which the channel current Id is minimized. The second element that should be considered is the change in available trap states or defects around the channel. This is seen in the transfer curve as a change in the minimum current value. These values can be incorporated into a thickness measurement in a simple way by the following equation where $V_G$ is the gate voltage at which the current I is measured, while VCNP is gate voltage at which the minimum current is reached and ICNP is the minimum current reached. Evaluating only the current though the channel at a set gate voltage, without measuring the shift in the Charge Neutrality Point, will result in unclear thickness measurements as shown in paragraph 20.

$$\text{thickness}_2 = \text{thickness}_1 \frac{|V_{G2} - V_{CNP_2}|}{|V_{G1} - V_{CNP_1}|} \sqrt{\frac{I_1^2 - I_{CNP1}^2}{I_2^2 - I_{CNP2}^2}}$$

More complex or complete analysis can be done to calculate the thickness following this general model by performing a fit or average incorporating all of the currents measured at each gate voltage applied.

An alternative way to measure the thickness without directly measuring the charge neutrality point is to evaluate the slope, called the transconductance, of the transfer curve between the channel current and gate voltage in a gate voltage region far from the Charge Neutrality Point. In this case, a general idea of the gate voltage range of the Charge Neutrality Point is needed, but precise measurement is not required. The second condition that must be satisfied for this technique to work is that the slope of the curve must be linear, or the curvature off the transfer curve must be corrected for. Curvature in the transfer curve is pronounced near the Charge Neutrality Point, but is also present where various effects lead to effective current saturation. In the case of measurements in liquids, the "various effects" referred to include the gate voltage dependence of the quantum capacitance of the graphene and the gate voltage driven changes to ions and molecules attracted to the graphene channel. In the case that the transconductance (gm) is used to measure the thickness, the following equation can be used:

$$\text{thickness}_2 = \text{thickness}_1 \frac{g_{m1}}{g_{m2}}$$

This is the preferred method of measuring the thickness, as the charge based effects of material adsorption can be more easily separated from the thickness measurement. Just as with the direct current measurement, fitting the derivative of the entire transfer curve or calculating the calculated thickness throughout the whole transfer curve will give a more complete result.

These two approaches can be combined to measure the effective thickness of the material added to the surface in addition to the porosity of the material. This measurement requires performing a change in the salinity of the liquid on top of the sensor. The purpose of this salinity change is to alter the double layer thickness on the surface of the graphene channel. In addition, any ions that are incorporated into the applied material on the graphene channel will be exchanged with the bulk liquid. These two processes will have different speeds. The liquid exchange will alter the double layer thickness in less than one second, while it may take several seconds for the ions to exchange. Performing the comparison of transfer curves quickly will focus on measuring the large scale porosity of the layer, those pores which are large enough to facilitate physical liquid exchange and for which diffusion is less important. Performing the comparison at a later stage will focus on the overall porosity of the layer, and evaluate the capability of the layer to prevent or suppress diffusion of ions. Examples of expected responses are shown in paragraph 32. This plot shows a 10 nm thick layer being measured in a full strength buffer such as PBS as the "10 nm layer to test". Then, the full strength PBS is replaced with PBS diluted by a factor of two with water is added. This second buffer is the "low strength" buffer, and could even be water or another non-buffered liquid. The resulting shift in the transfer curve is used to evaluate the porosity of the layer.

To measure the relative porosity of a layer, the entire transfer curve should be measured in the full strength buffer and in the low strength buffer. The low strength buffer may be less effective at maintaining a pH on the surface of the chip and so a shift in the Charge Neutrality Point may happen. In addition, the low strength buffer may alter the overall resistance of the transistor by altering the density of charges adjacent to the graphene channel. Both of these effects will be suppressed by a layer with low porosity. This describes a qualitative evaluation of the porosity of the layer. A quantitative approach requires performing multiple measurements over time and combining the data with a more complex model of diffusion, or creating a calibration curve of responses using layers with known porosity to compare against. In most cases, a practical measurement of relative porosity is sufficient.

In an extreme case in which there is no ion exchange between the bulk buffers and the material adjacent to the graphene channel, the only effect of adding a dilute buffer will be an apparent thickening of the layer on the surface of the graphene. This apparent increase in the thickness of the layer is due to an increase in the double layer thickness, which is incorporated into the overall thickness measurement. As the change in salinity between the buffers is known and the double layer thickness scales with the square root of the salinity of the buffer, this alteration in double layer thickness can be calculated and corrected for.

In the case the salinity of the buffers is not controlled or known as experimental inputs, a split gate structure can be used to measure the salinity. The split gate structure refers to the use of a driving gate electrode, which is also referred to herein as a counter electrode, and a measurement electrode, which is also referred to herein as the reference electrode. The current input required to the counter electrode to control the voltage scales with the salinity of the buffer. Along with the voltages applied, this can be used to calculate the conductivity (inverse resistance) of the liquid. The precise measurements depend strongly on the geometry of the electrodes used as well as the temperature.

As depicted in FIG. 1A, in certain IC chip examples, several counter electrodes 116 are patterned as overlapping semicircular platinum areas which beneficially provide a large driving gate area suitable for driving a liquid gate voltage for a corresponding number of sample liquid receiving regions. A calibration curve is taken and used as a reference when this technique is used to measure the salinity, e.g., for on-chip electrical characterization of thin film layer porosities. It may be noted that advantageously the geometries of the driving gate connector and connected counter electrodes 116 depicted in FIG. 1A are patterned to minimize differences in liquid gate voltage driven by the counter electrodes 116 and the liquid gate voltage measuring connector and connected reference electrodes 118 are patterned to minimize differences in measured liquid gate voltage.

In some examples, a channel for a 2D FET (also sometimes described as biologically gated transistors) may be rectangular, as depicted in FIG. 1A.

FIG. 11 is a flow chart diagram illustrating a method 1100 for on-chip thin film layer deposition and characterization, in accordance with one or more examples of the present disclosure. In one or more embodiments, the method 1100 begins and includes providing 1102 an integrated circuit with a field effect transistor array where the FET channels are formed with 2D nanomaterials, such as graphene, molybdenum disulfide, two-dimensional transition metal dichalcogenides, and so forth, that is formed as a monolayer and transferred to an integrated circuit substrate such as a silicon wafer or a flexible integrated circuit substrate such as a polyimide substrate configured such that no metal gate or metal gate oxide is disposed vertically above or below the 2D nanomaterial channel but that two or more nonreactive electrodes are horizontally offset from the 2D FETs.

In some examples, the method 1100 continues and includes performing 1104 liquid mediated deposition of one or more thin film layers on or above the channels of selected 2D FETs 110. In certain examples, the thin film layers may include immobilization layer such as covalently bonded linkers, π-π bonded linkers, hydrogels, and combinations thereof, and so forth, analyte sensitization layers (also known as capture layers) which may include antibodies, antigens, ribonucleoproteins, peptides, streptavidin, DNA, RNA, peptide nucleic acids, small molecules, fragments thereof, combinations thereof, and so forth. It may be noted that different analyte sensitization layers may be deposited on different 2D FETs of the same chip or of different chips for purposes of performing multiplexed assays in which a sample liquid is analyzed for multiple parameters using differently functionalized 2D FETs 110.

In various examples, the thin film layers 141 may include a blocking layer 144 that act as a blocker for nonspecific binding e.g., to prevent unintended chemical interactions with the 2D FET channels. Examples of protein blockers that may be used to form suitable blocking layers may include bovine serum albumin (BSA), fish skin gelatin (FSG), bovine gamma globulin (BGG), lysozyme, casein, peptidase, components thereof, combinations thereof, and so forth. Examples of polymer blockers that may be suitable to form blocking layers may include polyethylene glycol, polysorbate surfactants, polypropylene glycol, poloxamers, components thereof, combinations thereof, and so forth. In some examples, protein blockers may be used in combination with polymer blockers to form blocking layers.

In one or more examples, the thin film layers may include non-ceramic passivation layers that coat exposed ceramic layer such as oxides and nitrates and that may be washed away from conductive surfaces such as the 2D nano material channels and the nonreactive electrodes used to drive and/or measure the liquid gate voltage.

In certain examples, the method 1100 continues and includes applying 1106 excitation conditions to the 2D FETs either directly in the case of source or drain voltages or indirectly applied as a liquid gate voltage through the nonreactive counter electrodes. In some examples, the excitation conditions may be low-frequency. In certain examples, measurement distances may be extended beyond the electrostatic screening distance by applying higher frequency excitation conditions.

In various examples, the method 1100 includes obtaining 1108 transfer curve information for selected 2D FETs during or after deposition of the selected one or more thin film layers by generating time-dependent measurement vectors as described above.

In some examples, the method 1100 includes controlling 1110 on-chip thin film layer deposition an electrical characterization based on the measurement vectors. In some examples, the thin film layers are deposited conventionally and electrical characterization of the thin film layers is performed to determine whether the deposit thin film layers meet predetermined criteria. In other examples, the process of depositing the thin film layers is controlled in line based on feedback derived from the measurement vectors.

In various examples, the method 1100 may be performed using the integrated circuit, structures, components, and/or portions or combinations thereof, that are disclosed with respect to FIGS. 1A, 2A, 3A, 3B, 3C, 3D, 3E, 4A, 4B, 10, and/or 12. In certain examples, the method 1100 may be performed using any of the techniques disclosed with respect to FIGS. 2B, 5, 6A-6E, 7A-7I, 8, 9 and/or portions or combinations thereof.

In various examples, the method 1100 and other methods described herein advantageously enable the manufacturer and use of more reliable and more sensitive, integrated circuits with 2D FET array for biosignal processing with on-chip thin film deposition and electrical characterization.

FIG. 12 is a schematic block diagram illustrating a system 1200 for on-chip thin film deposition and electrical characterization, in accordance with one or more examples of the present disclosure. The system 1200, in the depicted example, includes, one or more integrated circuit with 2D field effect transistors 110, a biosignal processing instrument 1202, a sample prep apparatus 1212, a computing device 1214, a remote data repository 1218, and a data network 1220.

An integrated circuit with 2D field effect transistors 110, in the depicted example, includes one or more 2D FETs 110 (e.g., biologically gated/liquid gated), which are described in further detail below. In various examples, an integrated circuit with 2D field effect transistors 110 is a device including one or more FETs with channels formed using 2D nanomaterials (such as biologically gated/liquid gate 2D FETs 110 and/or other sensor elements) arranged on a solid support. The sensor elements may respond directly or indirectly to the presence of a proximate biochemical or biomolecular analyte or interaction, or both, in a sample on or sufficiently proximate to the sensor elements to produce an electrical or electromagnetic response signal suitable for amplification, filtering, digitization, and other analog and digital signal processing operations.

In some examples, an integrated circuit with 2D field effect transistors 110 may include a plurality of transistors and a plurality of detection moieties where at least one of the transistors is a biologically gated/liquid gate 2D FET 110. In certain examples, an integrated circuit with 2D field effect transistors 110 may include one or more additional sensors alongside biologically gated/liquid gate 2D FETs 110. For example, various types of sensors may be included that use terahertz spectroscopy, surface-enhanced spectroscopy, quartz crystal microbalance, grating-coupled interferometry, and so forth. In some examples, an integrated circuit with 2D field effect transistors 110 may include further components such as a flow cell or fluid propulsion mechanism.

In the depicted example, the biosignal processing instrument 1202 includes circuitry for communicating with (e.g., sending electrical signals to or receiving electrical signals from) components of the integrated circuit with 2D field effect transistors 110. For example, an integrated circuit with 2D field effect transistors 110 may include a chip or integrated circuit with one or more 2D FETs 110 (e.g., biologically gated/liquid gated field effect transistors), the integrated circuit 100 may optionally be mounted to a printed circuit board with electrical contacts at one edge or may include electrical contacts in chip scale packaging. A socket in the biosignal processing instruments 1202 may include matching contacts, so that the integrated circuit with 2D field effect transistors 110 can be plugged into or removed from the biosignal processing instruments 1202. Various other or further types of connectors may be used to provide a detachable coupling between an integrated circuit with 2D field effect transistors 110 and a biosignal processing instruments 1202.

In a further example, the biosignal processing instruments 1202 may include circuitry for communicating via the data network 1220. For example, the biosignal processing instruments 1202 may communicate information about measurements performed using the integrated circuit with 2D field effect transistors 110 to the computing device 1214 and/or to a remote data repository 1218, over the data network. The data network 1220, in various examples, may be the Internet, or may be another network such as a wide area network, metropolitan area network, local area network, virtual private network, or the like. In another example, the biosignal processing instruments 1202 may communicate information in another way, in addition to or in place of communicating over a data network 1220. For example, the biosignal processing instruments 1202 may display or print information, save information to a removable data storage device, or the like.

In the depicted example, a measurement controller 1002 is implemented by the integrated circuit with 2D field effect transistors 110 and/or the biosignal processing instruments 1202. In various examples, a measurement controller 1002 may include excitation circuitry to apply excitation conditions to a biologically gated/liquid gate 2D FET 110. Output signals from the biologically gated/liquid gated 2D FETs 110 (such as electrical currents, voltages, capacitances, impedances, or the like) may be affected by the excitations and by a biochemical interaction within a sample fluid 1210 applied to the biologically gated/liquid gate 2D FET 110. The measurement controller 1002 may include measurement circuitry to obtain information about or corresponding to the biochemical interaction. The measurement circuitry may perform a plurality of time-dependent measurements of at least one of the output signals that are affected by the excitation conditions and the biochemical interaction with one or more thin film layers.

A measurement bandwidth may be based on a sample rate for performing the time-dependent measurements. For example, a measurement controller 1002 may be capable of "seeing" (e.g., observing or detecting information about) real-time information about the biochemical interaction for aspects or characteristics of the interaction with frequencies in a measurement bandwidth between 0 Hz and a frequency of half the sample rate. In various examples, wide-bandwidth sampling (e.g., with a predetermined measurement bandwidth) may provide real-time information that cannot be obtained by making constant-voltage or single-frequency (narrowband) measurements. In some examples, the information thus obtained may be comparable to real-time information obtained by using optical spectroscopy or mass spectroscopy, but without the high cost and complexity associated with optical or mass spectroscopy.

In some examples, an integrated circuit with 2D field effect transistors 110 may include the measurement controller 1002. For example, excitation circuitry and/or measurement circuitry may be provided on the same chip as a biologically gated/liquid gate 2D FET 110, or on the same package, on the same printed circuit board, or the like, as part of an integrated circuit with 2D field effect transistors 110. In another example, the biosignal processing instruments 1202 may include the measurement controller 1002. For example, excitation circuitry and/or measurement circuitry may be provided in a biosignal processing instruments 1202 so that the excitation circuitry and/or measurement circuitry is reusable with multiple integrated circuits with 2D field effect transistors 110.

In another example, an integrated circuit with 2D field effect transistors 110 and a biosignal processing instruments 1202 may both include portions of a measurement controller 1002. For example, the integrated circuit with 2D field effect transistors 110 may include portions of the excitation circuitry, such as a resistive heater for temperature control of the biologically gated/liquid gated 2D FETs 110, and the biosignal processing instruments 1202 may include other portions of the excitation circuitry such as a voltage or current source. In various examples, excitation circuitry, measurement circuitry and/or other components of a measurement controller 1002 may be disposed between an integrated circuit with 2D field effect transistors 110 and a biosignal processing instruments 1202 in various other or further ways.

Additionally, although the system 1200 in the depicted example includes an integrated circuit with 2D field effect transistors 110 that may be coupled to or removed from a biosignal processing instruments 1202, the functions and/or components of an integrated circuit with 2D field effect transistors 110 and a biosignal processing instruments 1202 may be integrated into a single device in another example. Conversely, in some examples, a system may include multiple devices rather than a single biosignal processing instruments 1202. For example, excitation circuitry and/or measurement circuitry for a measurement controller 1002 may include lab bench hardware such as source measure units, function generators, bias tees, chemical impedance analyzers, lock-in amplifiers, data acquisition devices, or the like, which may be coupled to an integrated circuit with 2D field effect transistors 110.

The sample prep apparatus 1212, in the depicted example, is configured to automatically or semi-automatically prepare the sample fluid 1210. In some examples, a sample prep apparatus 1212 may include automated dispensing equipment such as a dispensing robot and/or a fluidic system. In some examples, a sample prep apparatus 1212 may include its own controller and user interface for setting sample prep parameters such as incubation time and temperature for the sample fluid 1210. In some examples, a sample prep apparatus 1212 may be controlled via the data network 1220. For example, the computing device 1214 or the measurement controller 1002 may control the sample prep apparatus 1212.

In another example, a system 1200 may omit a sample prep apparatus 1212, and a sample fluid 1210 may be manually prepared. In some examples, preparing a sample fluid 1210 may include obtaining or preparing a sample of a fluid in which a biochemical interaction may be observed (or the absence of a biochemical interaction may be detected). In some examples, a sample fluid 1210 once obtained may be applied directly to the integrated circuit with 2D field effect transistors 110. For example, in some examples, the integrated circuit with 2D field effect transistors 110 may be used to characterize or measure a biochemical interaction in blood, and the blood may be applied to the integrated circuit with 2D field effect transistors 110 as the sample fluid 1210. In another example, further sample prep steps to prepare a sample fluid 1210 may include the addition of reagents, concentration or dilution, heating or cooling, centrifuging, or the like. Various other or further preparation techniques may be used to prepare a sample fluid 1210 for use with a measurement controller 1002.

The sample fluid 1210, in various examples, may include one or more types of biomolecules 1208. Biomolecules 1208, in various examples, may be any molecules that are produced by a biological organism, including large polymeric molecules such as proteins, polysaccharides, lipids, and nucleic acids (DNA and RNA) as well as small molecules such as primary metabolites, secondary metabolites, and other natural products. For example, in the depicted example, the sample fluid 1210 includes DNA molecules 1208*a* and enzymes 108*b* that interact with the DNA molecules 1208*a*. In various examples, a sample fluid 1210 may include various types of biomolecules 1208. Moieties of the biomolecules may interact in a biochemical interaction, and aspects, characteristics, or parameters of the biochemical interaction may be determined using an integrated circuit with 2D field effect transistors 110.

The computing device 1214, in the depicted example, implements an analysis module 1012. In various examples, a computing device 1214 may be a laptop computer, a desktop computer, a smartphone, a handheld computing device, a tablet computing device, a virtual computer, an embedded computing device integrated into an instrument, or the like. In further example, a computing device 1214 may communicate with the measurement controller 1002 via the data network 1220. The analysis module 1012, in certain examples, is configured to characterize one or more parameters of a biochemical interaction based on measurements of output signals from a biologically gated/liquid gate 2D FET 110, where the measurements are taken by the measurement controller 1002.

In the depicted example, the analysis module 1012 is separate from the measurement controller 1002, and is implemented by a computing device 1214 separate from the measurement controller 1002. In another example, the analysis module 1012 may be partially or fully integrated with the measurement controller 1002. For example, the measurement controller 1002 may include special-purpose logic hardware and/or a processor executing code stored in memory to implement all or part of the analysis module 1012. In some examples, the analysis module 1012 may be implemented as an embedded processor system or other integrated circuits that form part of an integrated circuit with 2D field effect transistors 110 and/or part of a biosignal processing instruments 1202. In some examples, where an analysis module 1012 is integrated with the measurement controller 1002, a system 1200 may omit a separate computing device 1214.

In certain examples, the measurement controller 1002 and/or the analysis module 1012 may include a set of hardware circuits, a set of programmable logic, executable code stored on a set of non-transitory computer-readable storage media, and/or a processor to execute stored code. The analysis module 1012, in certain examples, is operable to determine a set of parameters for an equation that models a first derivative of a transfer curve. A first derivative of a transfer curve may be a rate of change of the dependent or measured variable (e.g., a drain-to-source current) with respect to the independent or applied variable (e.g., a gate-to-source voltage).

Where the transfer curve information determined by the measurement controller includes discrete data points, values for the first derivative may be interpolated or estimated from the data points. An equation may be said to model the first derivative of the transfer curve based on the equation fitting interpolated or estimated data points, or based on an integral of the equation fitting the original transfer curve data points.

A first derivative of a transfer curve for a 2D FET with a graphene channel (e.g., a gFET) has the following equation $$dI \big/ d_{V_G} = k_{V_G} + B + \frac{A}{1 + e^{-wV_G}}$$

and is derived from a physical model. In the equation, Vg is the applied gate voltage, and I is the drain current. In the depicted example, the gFET first derivative equation models the first derivative of the gFET transfer curve using a linear term kVg, a constant term B, and a logistic function term A/(1+e−wVg), which is referred to as a logistic function term due to its similarity to the standard logistic function 1/(1+e−x) that produces a sigmoid curve from 0 to 1. The parameters of this gFET first derivative equation are k, B, A, and w, where the A, B, and w parameters stretch or shift the standard logistic function, and the k parameter affects the slope of the "arms" further away from the midpoint.

Parameters for an equation, in various examples, may be coefficients or other constants of the equation. For example, in an equation for a line, coefficients may include a slope, and an intercept. Where a transfer curve is more complex than a line, an equation to model the first derivative of a transfer curve may have more parameters than a linear equation.

In the depicted example, the analysis module 1012 is separate from the measurement controller 1002. In one or more examples, the analysis module 1012 may be partially or fully integrated with the measurement controller 1002. For example, the measurement controller 1002 may include special-purpose logic hardware and/or a processor executing code stored in memory to implement all or part of the analysis module 1012. In some examples, the analysis module 1012 may be implemented as an embedded processor system or other integrated circuits that form part of an integrated circuit (e.g., 100).

The remote data repository 1218, in various examples, may be a device or set of devices remote from the measurement controller 1002 and capable of storing data. For example, the remote data repository 1218 may be, or may include, a hard disk drive, a solid-state drive, a drive array, or the like. In some examples, the remote data repository 1218 may be a data storage device within the computing device 1214. In some examples, a remote data repository 1218 may be network attached storage, a storage area network, or the like.

In some examples, the measurement controller 1002 (e.g., an integrated circuit with 2D field effect transistors 110 and/or a biosignal processing instruments 1202) may include communication circuitry that transmits measurement information to the remote data repository 1218. Measurement information may be measurements from biologically gated/liquid gate 2D FETs 110, or information about the measurements, such as calculated quantities based on the raw measurements. The analysis module 1012 may communicate with the remote data repository 1218 to characterize one or more parameters of a biochemical interaction based on the information stored by the remote data repository 1218. In further examples, the analysis module 1012 may store analysis results to the remote data repository 1218. In another example, however, the analysis module 1012 may receive measurement information from the measurement controller 1002 directly or over the data network 1220, and a remote data repository 1218 may be omitted (e.g., in favor of local data storage).

In various examples, the system 1200 includes a data repository 1218 and one or more biosignal processing instruments, each biosignal processing instruments including an integrated circuit ("IC") with a 2D FET array, each 2D FET in the array including: a channel comprising 2D nanomaterial between a conductive source and a conductive drain, each disposed on an integrated circuit substrate; a gate area for receiving a volume of liquid; and a ceramic coating layer disposed over the conductive source and the conductive drain. In some examples, the integrated circuit 100 further includes two or more environmentally non-reactive electrodes disposed on the substrate for biasing and/or measuring electrical characteristics of the liquid over gate areas of the array. In certain examples, the system 1200 includes a measurement controller operable to determine transfer curve information for the 2D FETs of the array by applying bias conditions including a drain-to-source voltage and a gate-to-source voltage, and measuring drain currents for the 2D FETs while varying the gate-to-source voltage. The system 1200 further includes in various examples, an analysis module operable to determine a set of parameters for an equation that models a first derivative of a transfer curve, by applying a machine learning model to the transfer curve information from the measurement controller, wherein the machine learning model is trained to associate transfer curve information with parameters. In some examples, the system 1200 includes communication circuitry configured to transmit the set of parameters to the data repository. In certain examples, the system includes a thin film deposition controller that uses the transfer curve information to determine on-chip measurements of thickness and/or porosity of one or more thin film layers deposited on the channels of the 2D FETs and to control selected characteristics of the one or more thin film layers during deposition by adjusting concentrations and/or incubation times of components used to form individual thin film layers based on the on-chip measurements made in connection with the deposition of the individual thin film layers.

Examples and implementations may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

Various embodiments of present disclosure are described in the following clauses:

1. An integrated circuit (IC) chip with a field-effect transistor (FET) array and on-chip thin film deposition and electrical characterization, the IC comprising: a plurality of conductive sources and conductive drains patterned in a metallization layer for the field-effect transistors in the FET array, the metallization layer formed on a dielectric layer deposited on an IC substrate; two or more environmentally non-reactive electrodes in the metallization layer deposited on the dielectric layer, wherein the two or more environmentally non-reactive electrodes are horizontally offset from the FETs in the array and at least one environmentally non-reactive electrode is configured to impart a counter electrode voltage ($V_{CE}$) to a liquid received in a gate area such that the counter electrode voltage imparted to the liquid provides a gate voltage for the FETs in the array covered by the liquid and wherein at least one environmentally non-reactive electrode is configured to enable a reference electrode measurement of a gate voltage ($V_G$) of the liquid to be made; a 2D nanomaterial layer for patterning 2D FET channels between the conductive sources and the conductive drains; a temporary etchable inert masking layer on the 2D nanomaterial layer that forms hard masked channel regions over the 2D FET channels to be patterned; hard masked channel regions patterned to temporarily cover 2D FET channels and corresponding regions covered by the etchable inert masking layer; a ceramic coating layer patterned to cover portions of the chip to be electrically insulated from the liquid with openings in the ceramic coating layer corresponding to the hard masked channel regions and corresponding to the regions of the two or more environmentally non-reactive electrodes; one or more openings etched in the etchable inert masking layer to expose the 2D FET channels to the liquid received in the gate area; one or more thin film layers deposited via liquid mediated deposition on channels of one or more selected instances of the 2D FETs of the FET array; and integrated circuit connections in the metallization layer that enable on-chip measurements comprising measurement vectors for the one or more selected instances of the 2D FETs of the FET array to be made in connection with the liquid mediated deposition of the one or more thin film layers.

2. The integrated circuit of clause 1, wherein the measurement vectors comprise transfer curve parameters that enable on-chip electrical measurements to be made of thin film characteristics selected from thickness, relative thickness, porosity, relative porosity, and combinations thereof, for selected thin film layers of the one or more thin film layers.

3. The integrated circuit of clause 1, wherein thickness and/or porosity of individual thin film layers are controllably determined based on concentrations and/or incubation times of components used to form the individual thin films being set based on the on-chip measurements made in connection with the liquid mediated deposition of the individual thin films.

4. The integrated circuit of clause 1, wherein the one or more thin film layers are selectively deposited using voltage-assisted deposition comprising one or more of the following actions: applying an electrophoretic voltage to both the conductive source and the conductive drain of 2D FETs selected to receive the deposition of a predetermined thin film layer, the electrophoretic voltage configured to move components for forming the thin film layer closer to the channel of the 2D FETs selected to receive the deposition of the predetermined thin film layer; applying a repelling voltage to both the conductive source and the conductive drain of the 2D FETs selected to not receive the deposition of the predetermined thin film layer, the repelling voltage configured to move components for forming the thin film layer further from the channel of the 2D FETs selected to not receive the deposition of the predetermined thin film layer; and combinations thereof.

5. The integrated circuit of clause 1, wherein the measurement vectors comprise one or more transfer curve parameters selected from maximum transconductance magnitudes for p-type and/or n-type branches of a transfer curve, a charge neutrality point voltage of the transfer curve, resistance at the charge neutrality point, curvature of the transfer curve in the region of the charge neutrality point, curvature of the p-type and/or n-type branches of the transfer curve apart from the region of the charge neutrality point.

6. The integrated circuit of clause 5, wherein one or more 2D FET physical model-based parameters comprising capacitance, mobility, charge density, resistance and combinations thereof are extracted from the transfer curves parameters using a physical model of selected 2D FETs.

7. The integrated circuit of clause 1, wherein a predeposition measurement vector for the one or more selected 2D FETs is generated at a predeposition time period prior to deposition of a selected thin film layer of the one or more thin film layers as a reference for comparison with a deposition measurement vector for the one or more selected 2D FETs generated at a deposition time period during or after deposition of the selected thin film layer.

8. The integrated circuit of clause 2, wherein a calibration measurement is performed by: applying one or more solutions with known salinities to determine a known double layer thickness; and calibrating responses of selected 2D FETs used to perform the calibration measurement to the known double layer thicknesses determined by applying the one or more solutions.

9. The integrated circuit of clause 2, wherein thickness of a selected thin film layer is determinable by performing one or more of: determining a ratio of a maximum transconductance measurement of a predeposition transfer curve to a maximum transconductance measurement of a deposition transfer curve; and determining a ratio of a predeposition fitted capacitance to a deposition fitted capacitance.

10. The integrated circuit of clause 2, wherein a relative porosity of the thin film layer is determinable by comparing a first deposition measurement vector generated using a full strength buffer with a second deposition measurement vector generated using a diluted buffer.

11. The integrated circuit of clause 2, wherein determining a first predeposition measurement vector for the one or more selected 2D FETs comprises determining measurement vector parameters for 2D FET comprising unmodified 2D nanomaterial that forms the channels of the one or more selected 2D FETs prior to deposition of the one or more thin film layers.

12. The integrated circuit of clause 2, wherein the one or more thin film layers comprise: an immobilization layer with a first moiety that binds to a top surface of the channels of the selected 2D FETs; and a nucleic acid layer comprising nucleotide strands immobilized to the channels of the selected 2D FETs by the immobilization layer, wherein the nucleic acid includes a target site comprising a predetermined nucleotide sequence, wherein the integrated circuit is configured to detect a sequence-specific interaction between the nucleic acid and a ribonucleoprotein in a sample liquid based on a reduction in thickness of the nucleic acid layer in response to cleavage of the nucleic acid at the target site by the ribonucleoprotein in the sample liquid.

13. A method of manufacturing an integrated circuit with 2D field-effect transistor (FET) array and on-chip thin film layer deposition with electrical characterization, the method comprising: patterning conductive sources and conductive drains in a metallization layer for each transistor in the 2D FET array, the metallization layer formed on substrate comprising a dielectric layer disposed on an IC substrate; patterning two or more environmentally non-reactive electrodes in a metallization layer deposited on the dielectric layer, wherein the two or more environmentally non-reactive electrodes are horizontally offset from the FETs in the 2D FET array and at least one environmentally non-reactive electrode is configured to impart a counter electrode voltage to a liquid received in a gate area such that the counter electrode voltage imparted to the liquid provides a gate voltage for the FETs in the array covered by the liquid and wherein at least one environmentally non-reactive electrode is configured to enable a reference electrode gate voltage of the liquid to be measured; transferring a 2D nanomaterial layer for patterning 2D FET channels between the conductive sources and the conductive drains; depositing an etchable inert masking layer that couples to a top surface of the 2D nanomaterial layer for forming hard masked channel regions over the 2D FET channels to be patterned; patterning hard masked channel regions comprising the 2D FET channels and corresponding regions covered by the etchable inert masking layer; depositing a ceramic coating layer that covers portions of a surface of the integrated circuit to be electrically insulated; removing areas of the ceramic coating layer corresponding to the hard masked channel regions and corresponding to the regions of the two or more environmentally non-reactive electrodes; etching away areas of the etchable inert masking layer to expose the 2D FET channels to the liquid received in the gate area; performing liquid mediated deposition of one or more thin film layers on channels of one or more selected 2D FETs; and making on-chip measurements comprising measurement vectors for the one or more selected 2D FETs of the FET array in connection with the liquid mediated deposition of the one or more thin film layers.

14. The method of clause 13, further comprising determining, based on the on-chip measurements, one or more thin film characteristics selected from thickness, relative thickness, porosity, relative porosity, and combinations thereof, for selected thin film layers of the one or more thin film layers.

15. The method of clause 13, further comprising controlling selected characteristics of the thin film by adjusting concentrations and/or incubation times of components used to form individual thin films of the one or more thin film layers based on the on-chip measurements made in connection with the liquid mediated deposition of the individual thin films.

16. The method of clause 13, further comprising selectively performing voltage-assisted deposition of the one or more thin film layers comprising one or more of the following actions: applying an electrophoretic voltage to both the conductive source and the conductive drain of the 2D FETs selected to receive the deposition of a predetermined thin film layer, the electrophoretic voltage configured to move components for forming the thin film layer closer to the channel of the selected 2D FETs; applying a repelling voltage to both the conductive source and the conductive drain of the 2D FETs selected to not receive the deposition of the predetermined thin film layer, the repelling voltage configured to move components for forming the thin film layer further from the channel of the selected 2D FETs; and combinations thereof.

17. The method of clause 13, wherein the measurement vectors comprise one or more transfer curve parameters selected from maximum transconductance magnitudes for p-type and/or n-type branches of a transfer curve, a charge neutrality point voltage of the transfer curve, resistance at the charge neutrality point, curvature of the transfer curve in the region of the charge neutrality point, curvature of the p-type and/or n-type branches of the transfer curve apart from the region of the charge neutrality point.

18. The method of clause 17, wherein one or more parameters comprising capacitance, mobility, charge density, and combinations thereof are extracted from the transfer curves parameters using a physical model of the selected 2D FETs.

19. The method of clause 13, further comprising determining a predeposition measurement vector for the one or more selected 2D FETs generated at a predeposition time period prior to deposition of a selected thin film layer of the one or more thin film layers as a reference for comparison with a deposition measurement vector for the one or more selected 2D FETs generated at a deposition time period during or after deposition of the selected thin film layer.

20. The method of clause 14, wherein determining the thickness of the thin film layer comprises determining a ratio of a maximum transconductance measurement of a predeposition transfer curve to a maximum transconductance measurement of a deposition transfer curve.

21. The method of clause 14, further comprising determining a relative porosity of the thin film layer by comparing a first deposition measurement vector generated using a full strength buffer with a second deposition measurement vector generated using a diluted buffer.

22. The method of clause 14, wherein determining first predeposition measurement vectors for the one or more selected 2D FETs comprises determining values for the measurement vectors for unmodified 2D nanomaterial that forms the channels of the one or more selected 2D FETs.

23. A system comprising: a data repository; and one or more biosignal processing instruments, each biosignal processing instruments comprising: an integrated circuit ("IC") with a 2D FET array, each 2D FET in the array including: a channel comprising 2D nanomaterial between a conductive source and a conductive drain, each disposed on an integrated circuit substrate; a gate area for receiving a volume of liquid; a ceramic coating layer disposed over the conductive source and the conductive drain; two or more environmentally non-reactive electrodes disposed on the substrate for biasing and/or measuring electrical characteristics of the liquid over gate areas of the array; a measurement controller operable to determine transfer curve information for the 2D FETs of the array by applying bias conditions including a drain-to-source voltage and a gate-to-source voltage, and measuring drain currents for the 2D FETs while varying the gate-to-source voltage; an analysis module operable to generate a set of application specific layer parameters for determining thin film layer thickness and/or porosity based on transfer curve information from the measurement controller fitted to a physical model of corresponding 2D FETs; communication circuitry configured to transmit the set of application specific layer parameters to the data repository; a thin film deposition controller that uses the transfer curve information to: determine on-chip measurements of thickness and/or porosity of one or more thin film layers deposited on the channels of the 2D FETs; and control selected characteristics of the one or more thin film layers during deposition by adjusting concentrations and/or incubation times of components used to form individual thin film layers based on the on-chip measurements made in connection with the deposition of the individual thin film layers.

What is claimed is:

1. A system comprising:

a data repository; and one or more biosignal processing instruments, each biosignal processing instrument comprising:

an integrated circuit ("IC") with an array of 2D field effect transistors (2D FETs), each 2D FET in the array including:

a channel comprising 2D nanomaterial between a conductive source and a conductive drain, each disposed on an integrated circuit substrate;

a gate area for receiving a volume of liquid;

a ceramic coating layer disposed over the conductive source and the conductive drain;

two or more environmentally non-reactive electrodes disposed on the substrate for biasing and/or measuring electrical characteristics of the liquid over gate areas of the array;

a measurement controller operable to determine transfer curve information for the 2D FETs of the array by applying bias conditions including a drain-to-source voltage and a gate-to-source voltage, and measuring drain currents for the 2D FETs while varying the gate-to-source voltage;

an analysis module comprising a processor and a memory that stores code executable by the processor to generate a set of application specific layer parameters for determining thin film layer thickness and/or porosity based on transfer curve information from the measurement controller fitted to a physical model of corresponding 2D FETs;

communication circuitry configured to transmit the set of application specific layer parameters to the data repository;

a thin film deposition controller that uses the transfer curve information to:

determine on-chip measurements of thickness and/or porosity of one or more thin film layers deposited on the channels of the 2D FETs; and control selected characteristics of the one or more thin film layers during deposition by adjusting concentrations and/or incubation times of components used to form individual thin film layers based on the on-chip measurements made in connection with the deposition of the individual thin film layers.

2. The system of claim 1, wherein:

the two or more environmentally non-reactive electrodes are horizontally offset from the 2D FETs in the array;

at least one environmentally non-reactive electrode is configured to impart a counter electrode voltage (VCE) to a liquid received in a gate area such that the counter electrode voltage imparted to the liquid provides a gate voltage for the FETs in the array covered by the liquid;

at least one environmentally non-reactive electrode is configured to enable a reference electrode measurement of a gate voltage (VG) of the liquid to be made.

3. The system of claim 1, wherein the integrated circuit further comprises:

one or more thin film layers deposited via liquid mediated deposition on channels of one or more selected instances of the 2D FETs of the array; and integrated circuit connections in a metallization layer that enable on-chip measurements comprising measurement vectors for the one or more selected instances of the 2D FETs of the array to be made in connection with the liquid mediated deposition of the one or more thin film layers.

4. The system of claim 3, wherein the measurement vectors comprise transfer curve parameters that enable on-chip electrical measurements to be made of thin film characteristics selected from thickness, relative thickness, porosity, relative porosity, and combinations thereof, for selected thin film layers of the one or more thin film layers.

5. The system of claim 3, wherein the measurement vectors comprise one or more transfer curve parameters selected from maximum transconductance magnitudes for p-type and/or n-type branches of a transfer curve, a charge neutrality point voltage of the transfer curve, resistance at the charge neutrality point, curvature of the transfer curve in the region of the charge neutrality point, curvature of the p-type and/or n-type branches of the transfer curve apart from the region of the charge neutrality point.

6. The system of claim 3, wherein thickness and/or porosity of individual thin film layers are controllably determined based on concentrations and/or incubation times of components used to form the individual thin films being set based on the on-chip measurements made in connection with the liquid mediated deposition of the individual thin films.

7. The system of claim 3, wherein the one or more thin film layers are selectively deposited using voltage-assisted deposition comprising one or more of the following actions:

applying an electrophoretic voltage to both the conductive source and the conductive drain of the 2D FETs selected to receive the deposition of a predetermined thin film layer, the electrophoretic voltage configured to move components for forming the thin film layer closer to the channel of the 2D FETs selected to receive the deposition of the predetermined thin film layer;

applying a repelling voltage to both the conductive source and the conductive drain of the 2D FETs selected to not receive the deposition of the predetermined thin film layer, the repelling voltage configured to move components for forming the thin film layer further from the channel of the 2D FETs selected to not receive the deposition of the predetermined thin film layer; and combinations thereof.

8. The system of claim 3, wherein thickness of a selected thin film layer is determinable by performing one or more of:

determining a ratio of a maximum transconductance measurement of a predeposition transfer curve to a maximum transconductance measurement of a deposition transfer curve; and determining a ratio of a predeposition fitted capacitance to a deposition fitted capacitance.

9. The system of claim 3, wherein a relative porosity of the thin film layer is determinable by comparing a first deposition measurement vector generated using a full strength buffer with a second deposition measurement vector generated using a diluted buffer.

10. The system of claim 3, wherein determining a first predeposition measurement vector for the one or more selected 2D FETs comprises determining measurement vector parameters for 2D FETs comprising unmodified 2D nanomaterial that forms the channels of the one or more selected 2D FETs prior to deposition of the one or more thin film layers.

* * * * *